US005574903A

United States Patent [19]
Szymanski et al.

[11] Patent Number: 5,574,903
[45] Date of Patent: Nov. 12, 1996

[54] METHOD AND APPARATUS FOR HANDLING REQUEST REGARDING INFORMATION STORED IN A FILE SYSTEM

[75] Inventors: Steven J. Szymanski; Bill M. Bruffey, both of Cupertino, Calif.

[73] Assignee: Apple Computer, Inc., Cupertino, Calif.

[21] Appl. No.: 245,141

[22] Filed: May 13, 1994

[51] Int. Cl.$^6$ .................................................. G06F 17/30
[52] U.S. Cl. .................... 395/601; 395/200.03; 395/561; 364/DIG. 1; 364/280.4; 364/282.4
[58] Field of Search ..................... 395/200.03, 200.10, 395/500, 600, 650

[56] References Cited

U.S. PATENT DOCUMENTS

| | | | |
|---|---|---|---|
| 4,589,063 | 5/1986 | Shah et al. | 395/884 |
| 5,218,697 | 6/1993 | Chung | 395/650 |
| 5,341,499 | 8/1994 | Doragh | 395/700 |
| 5,353,411 | 10/1994 | Nakaosa et al. | 395/700 |
| 5,363,487 | 11/1994 | Willman et al. | 395/600 |
| 5,371,885 | 12/1994 | Letwin | 395/600 |
| 5,421,001 | 5/1995 | Methe | 395/500 |

FOREIGN PATENT DOCUMENTS 415346  3/1991  European Pat. Off. .

OTHER PUBLICATIONS

Tetsuo Hasegawa et al., "The IDPS File System", *Proceedings of the InfoJapan'90 Computer Conference* (1990), vol. 1, pp. 119–125.

S. R. Kleiman, "Vnodes: An Architecture for Multiple File System Types in Sun UNIX", *USENIX Association Summer Conference Proceedings, Atlanta 1986* (1986), pp. 238–247.

Russel Sandberg et al., "Design and Implementation of the Sun Network Filesystem", *USENIX Association Conference Proceedings 1985* (1985) pp. 119–130.

*Primary Examiner*—Thomas G. Black
*Assistant Examiner*—John C. Loomis
*Attorney, Agent, or Firm*—Burns, Doane, Swecker & Mathis, L.L.P.

[57] ABSTRACT

In a computer including at least one caller adapted to request access to a storage media, the storage media being organized according to one of at least one file system format, a system for handling requests for access to the storage media. The system includes interface modules for receiving a request for information from a caller, determining an appropriate one of a plurality of destinations to which to send the request based at least in part on a subject for the received request, and sending the request to the appropriate destination, format agent modules, corresponding to the file system format, for processing requests to access the storage media, a store for storing at least one first identifier for identifying the format agent modules, second identifiers for identifying the plurality of destinations, and mapping information for mapping between the second and first identifiers, and a dispatch module for receiving the request from the interface modules and forwarding the request to the format agent modules responsive to the mapping information. A method for handling requests for access to the storage media is also provided.

46 Claims, 20 Drawing Sheets

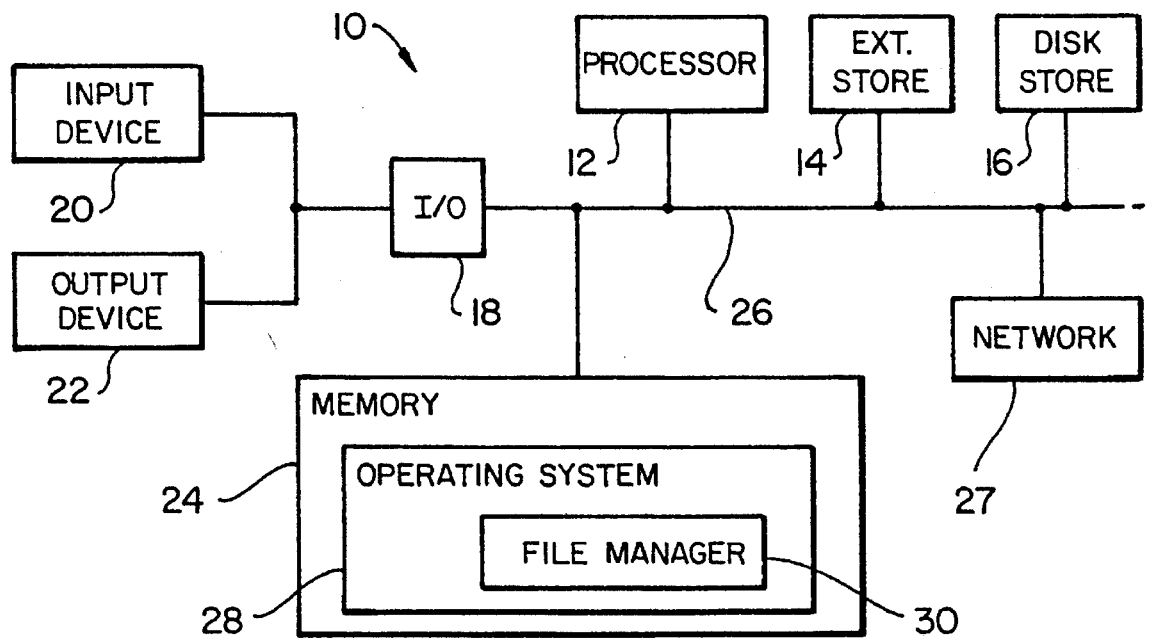
FIG_1
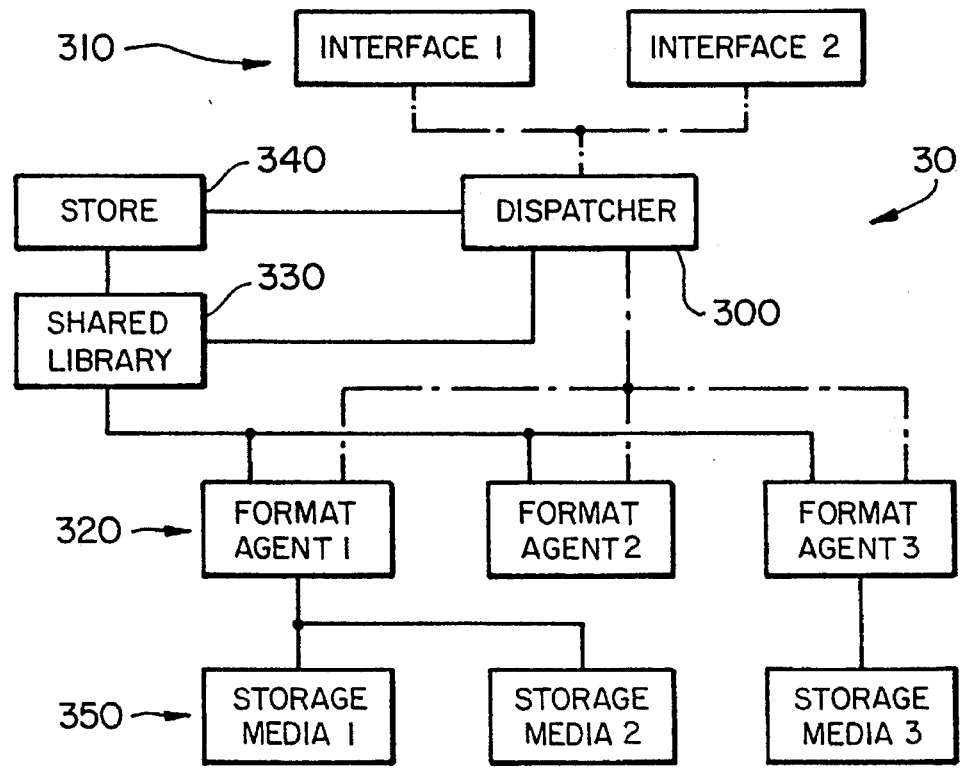
FIG_2

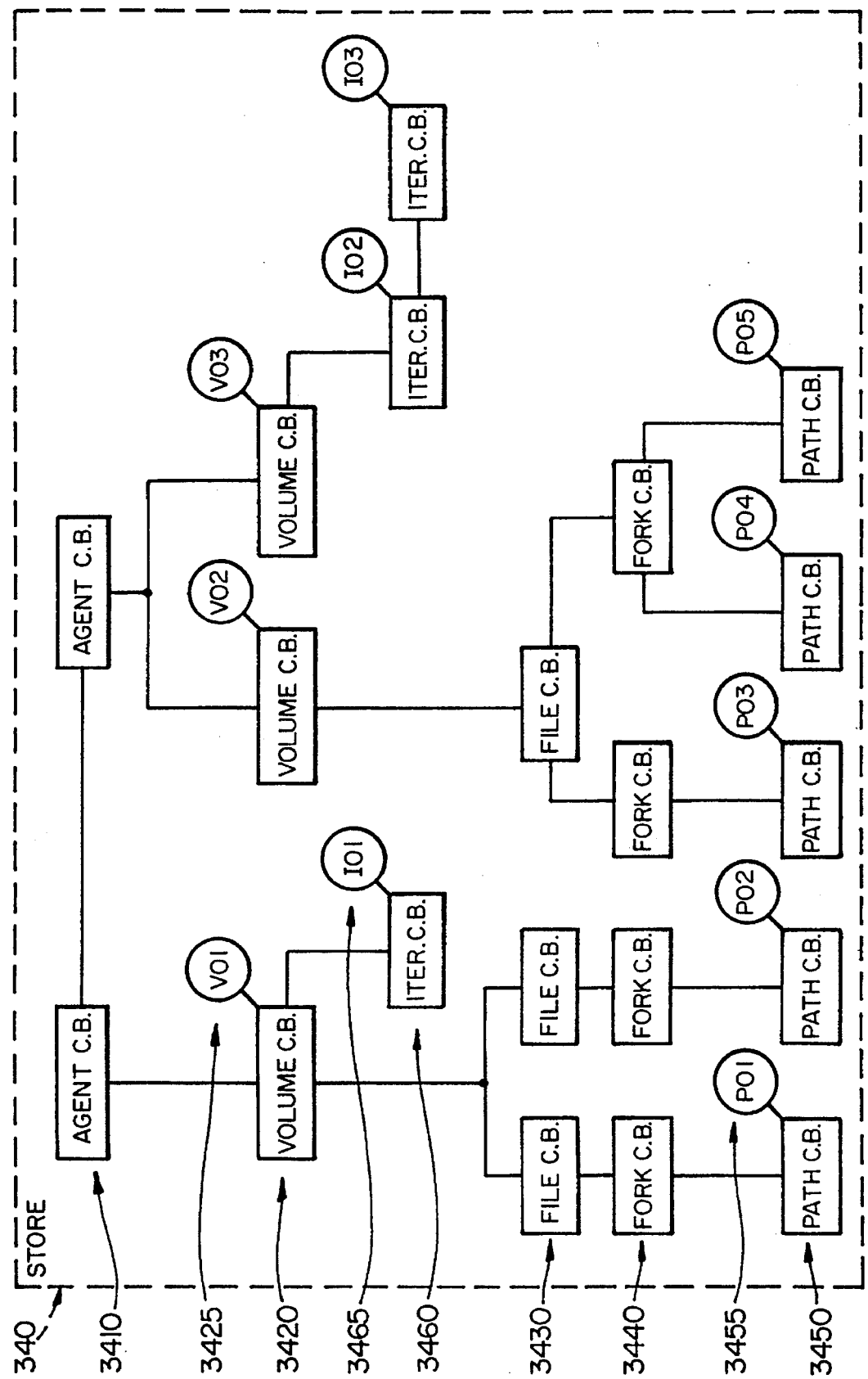
FIG_3a

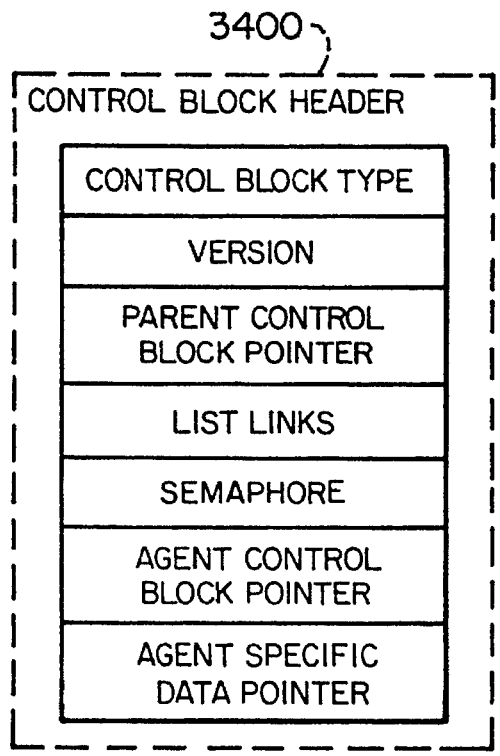
FIG_3b
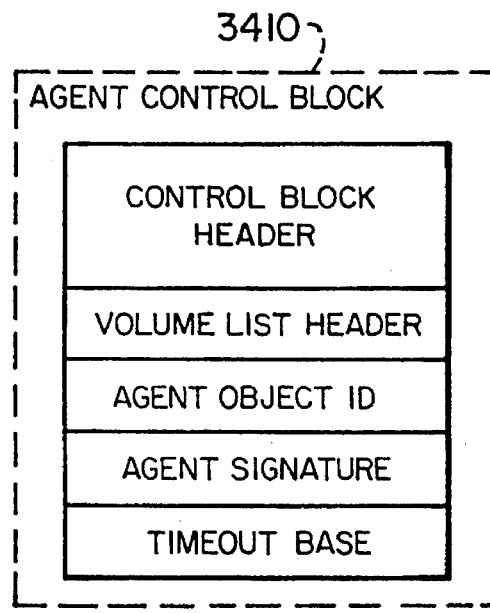
FIG_3c
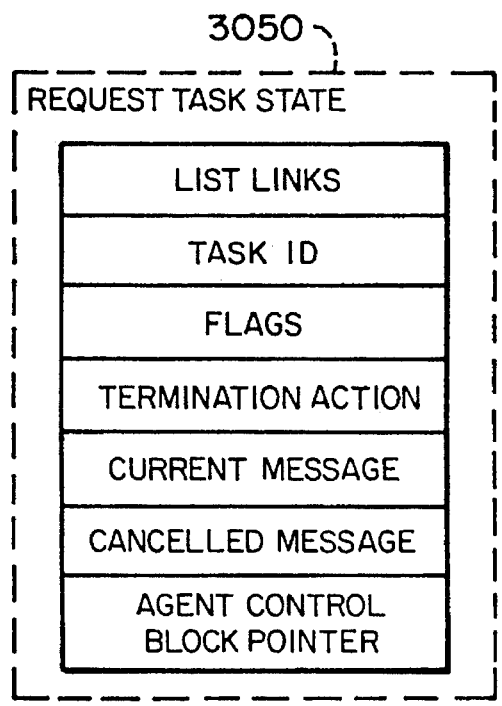
FIG_5b

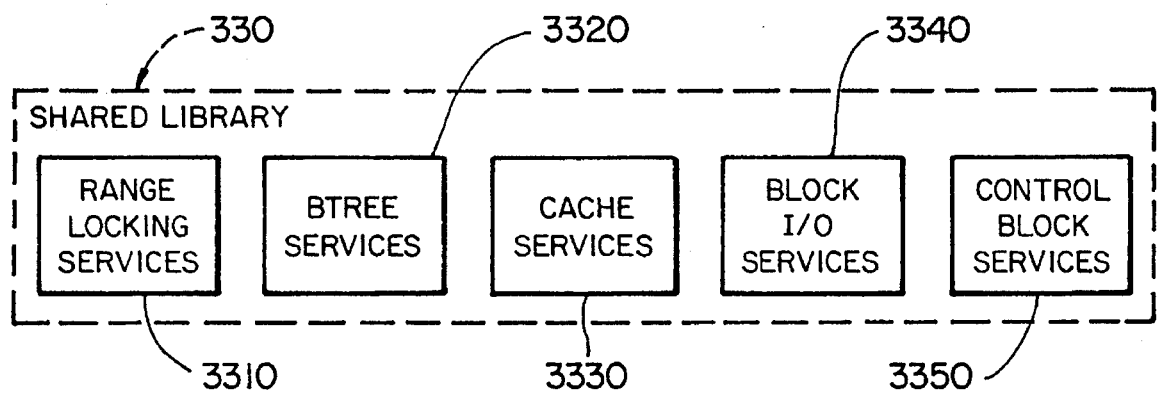
FIG_4
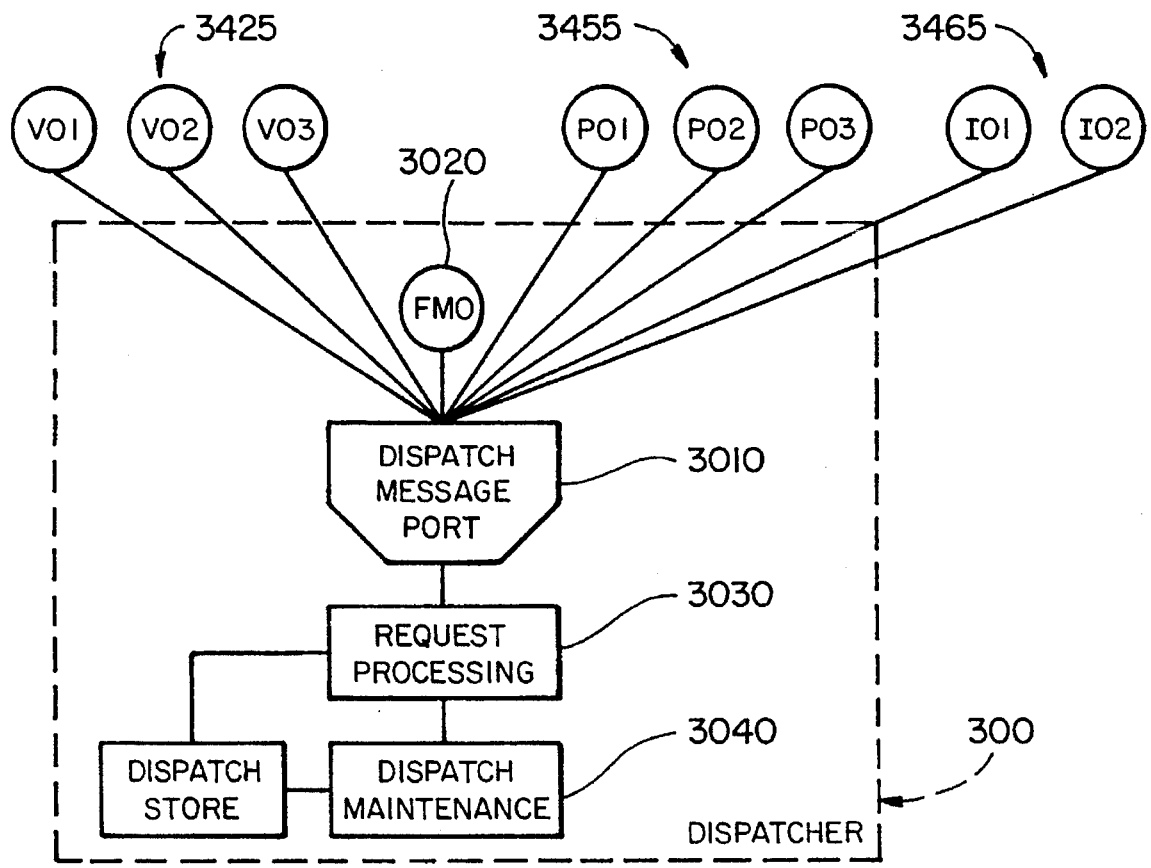
FIG_5a

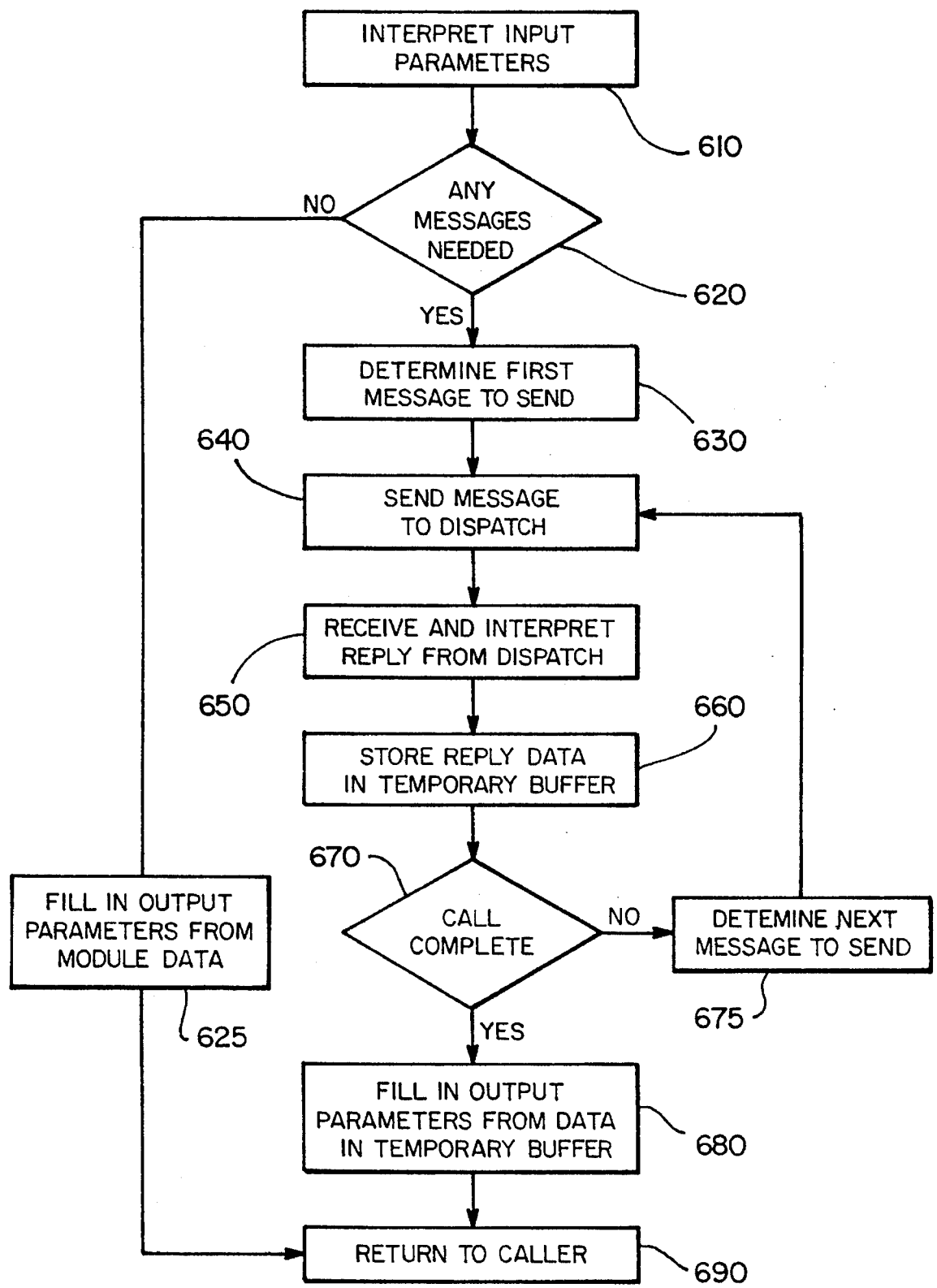
FIG_6

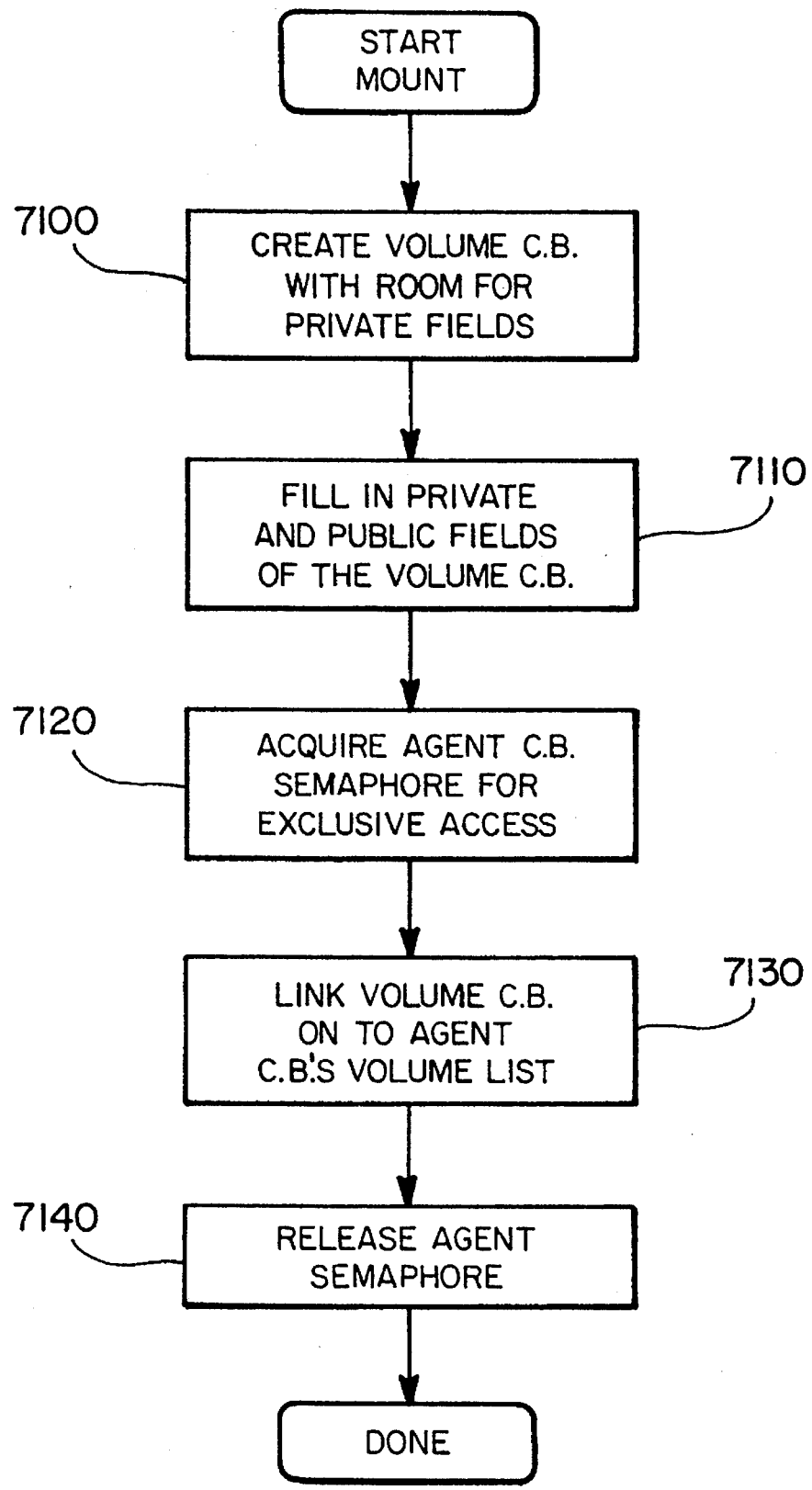
FIG_7a

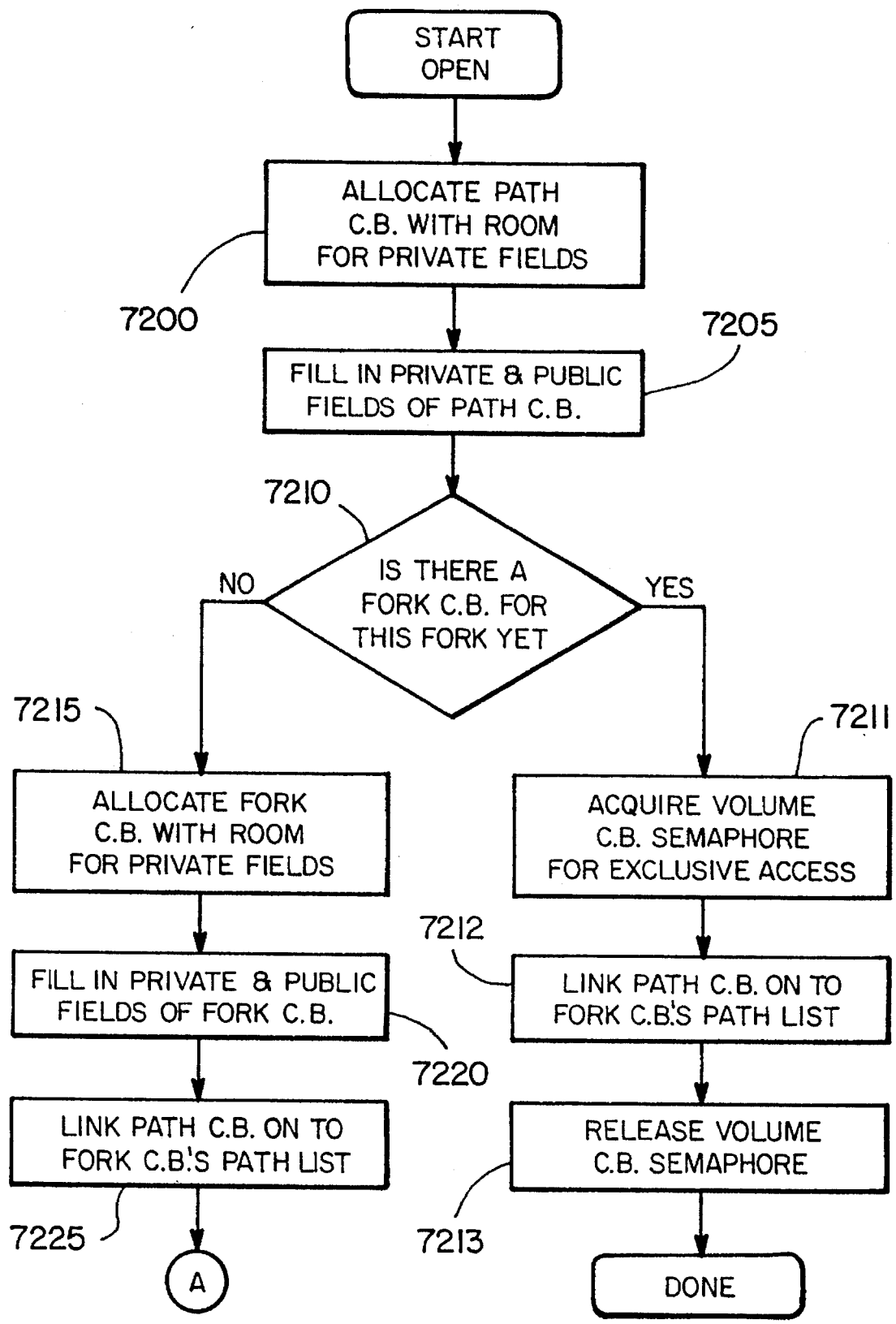
FIG_7b

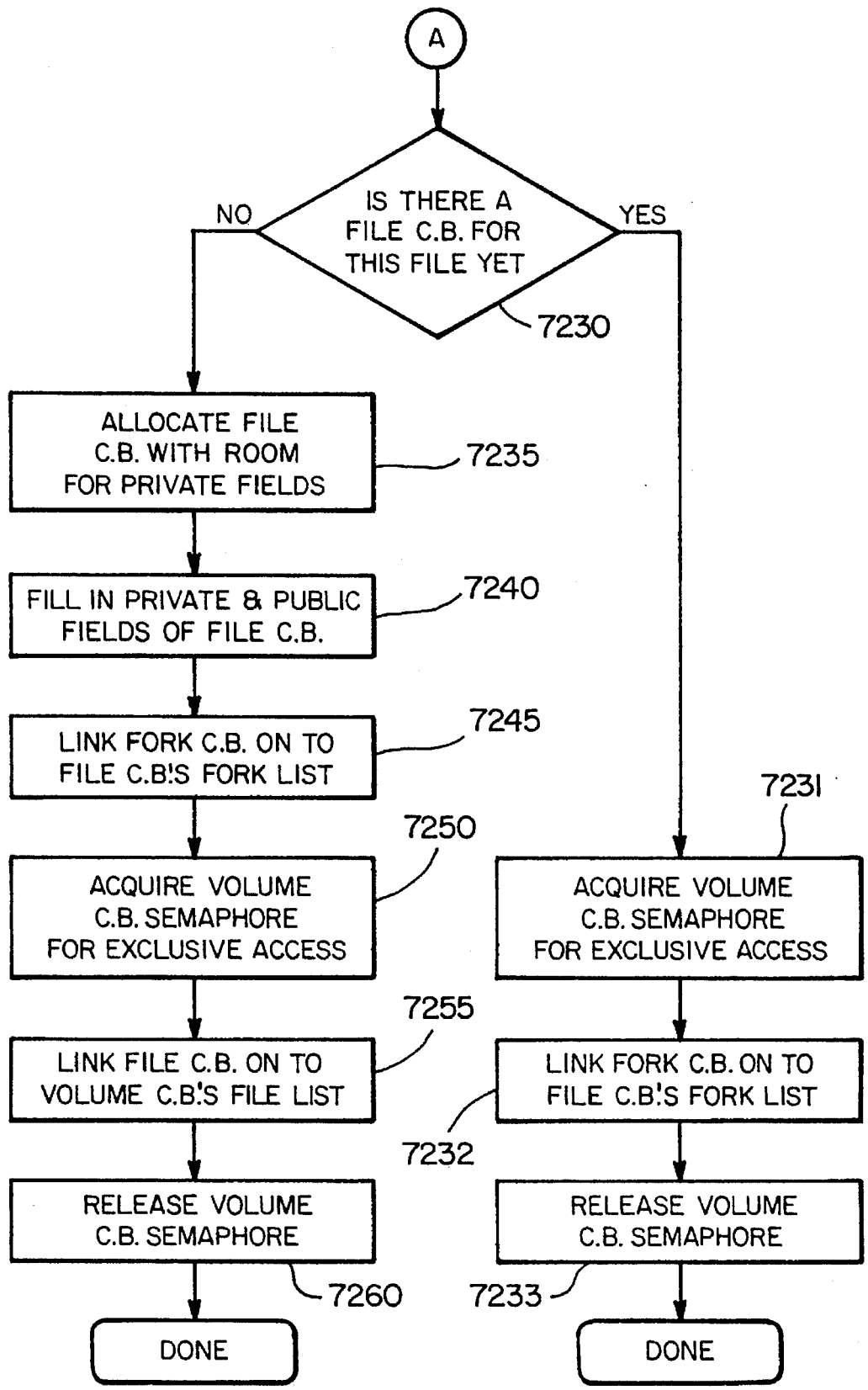
FIG_7c

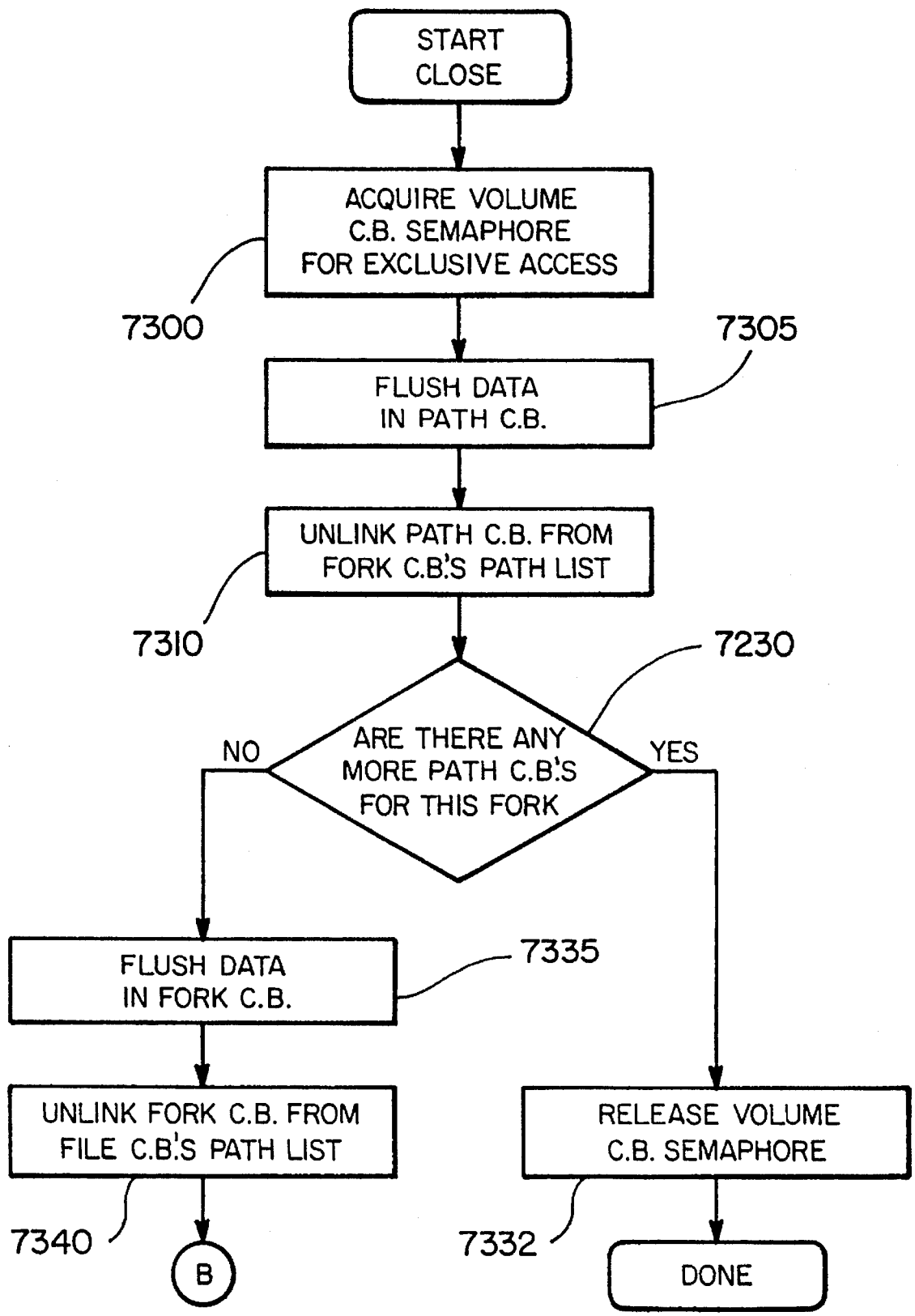
FIG_7d

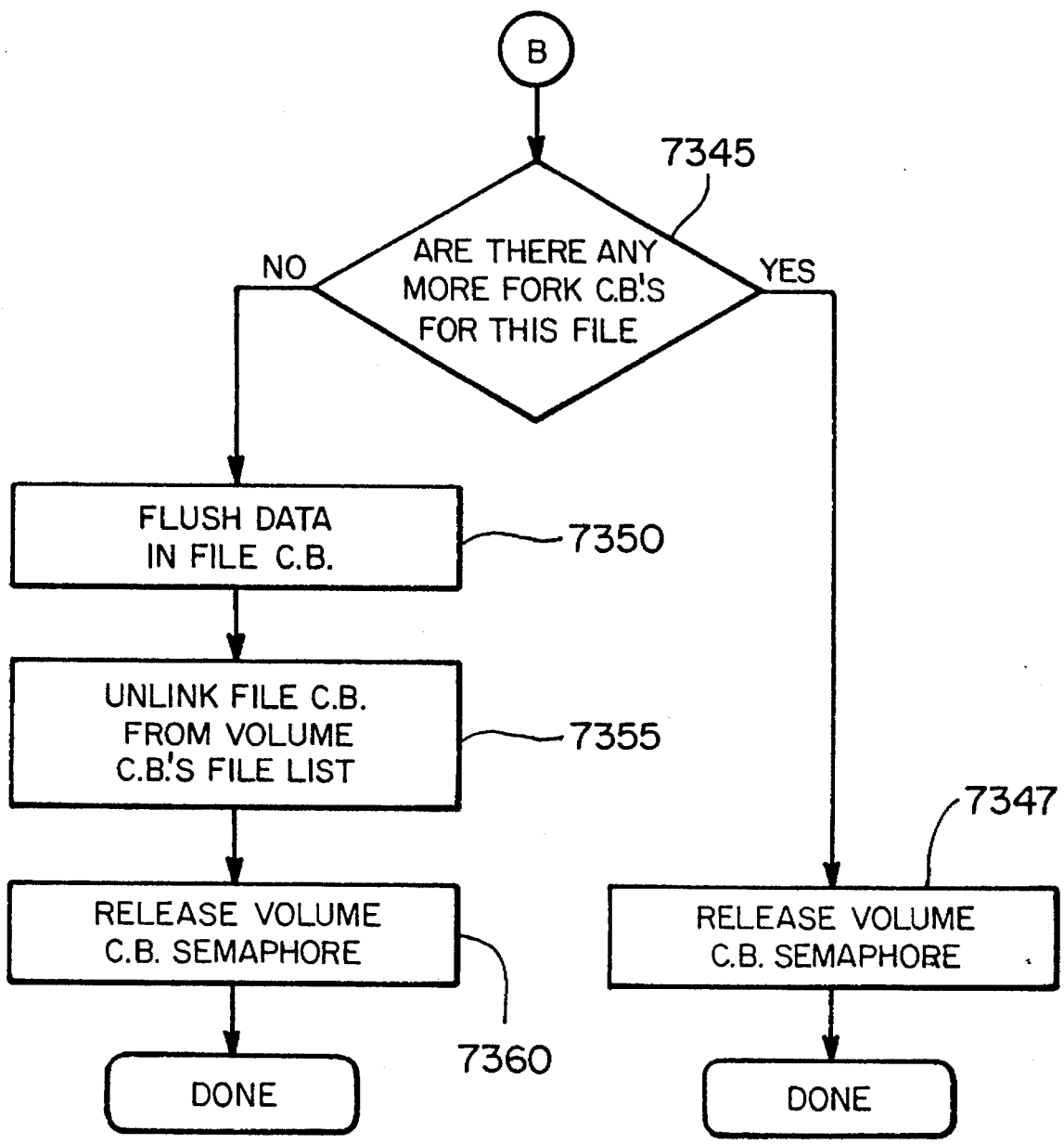
FIG_7e

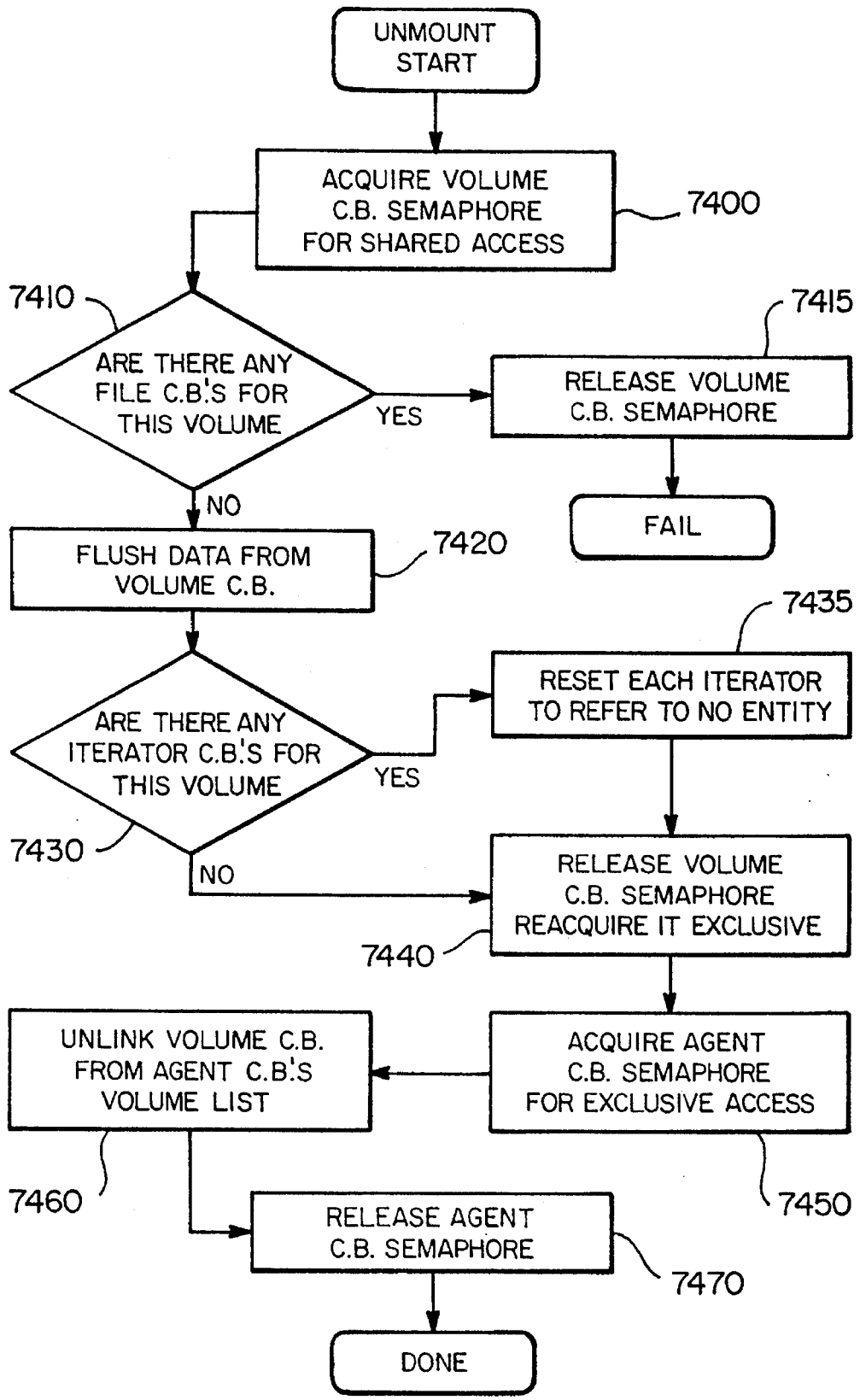
FIG_7f

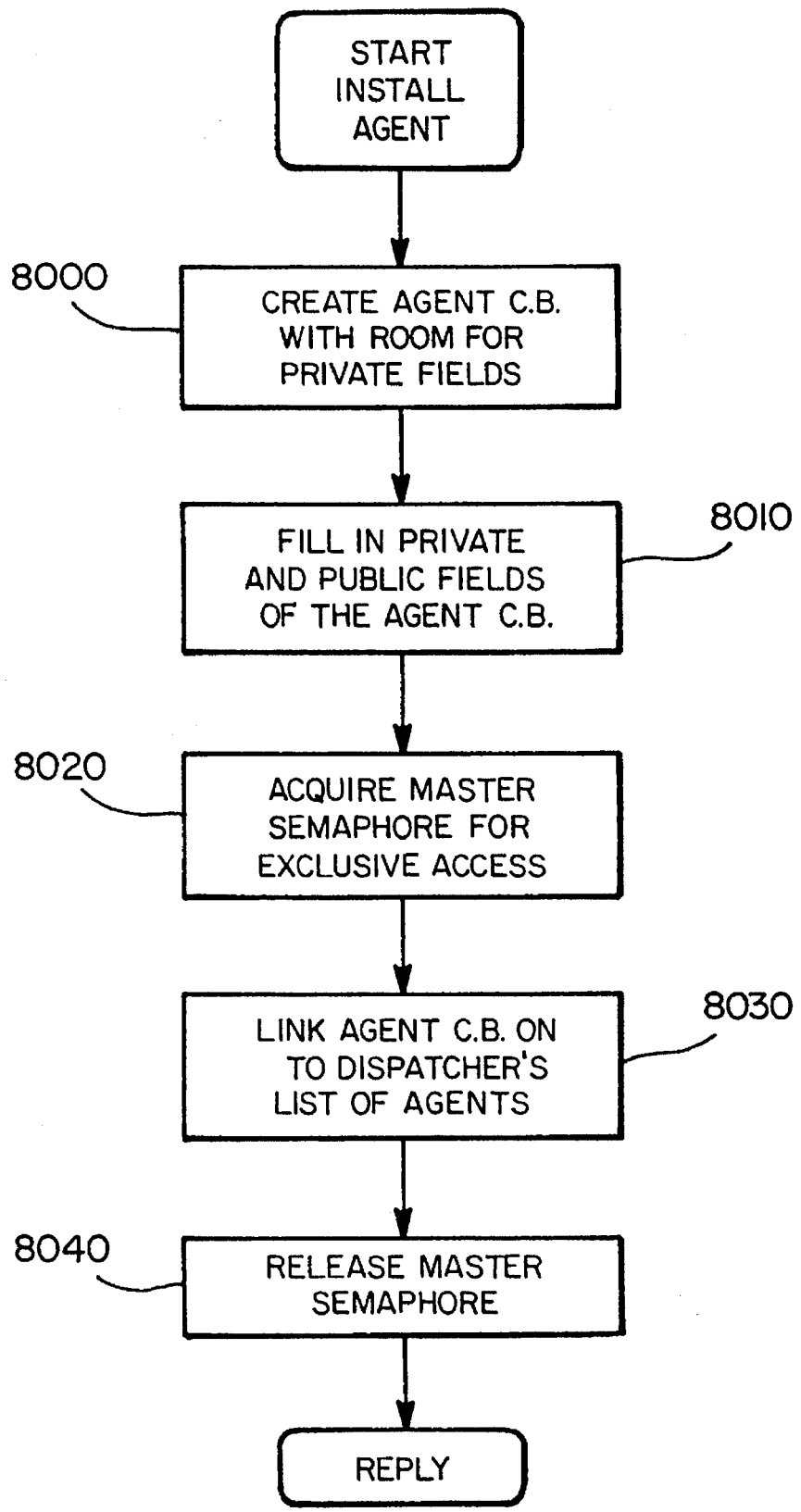
FIG_8a

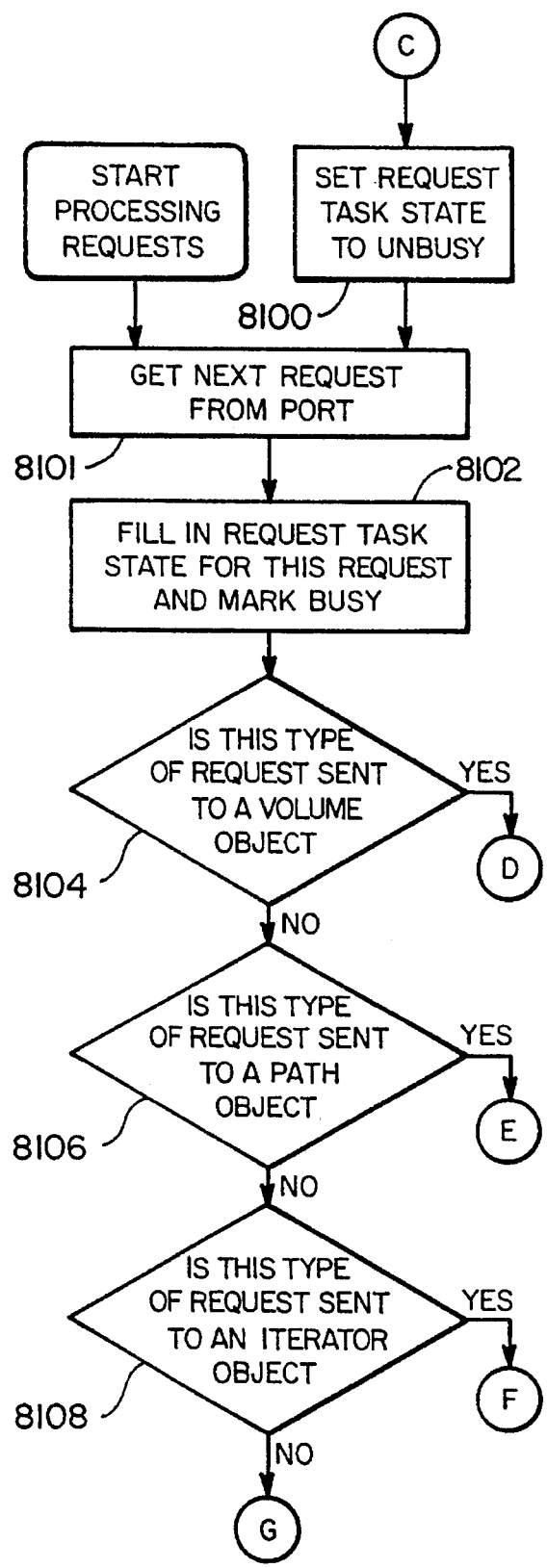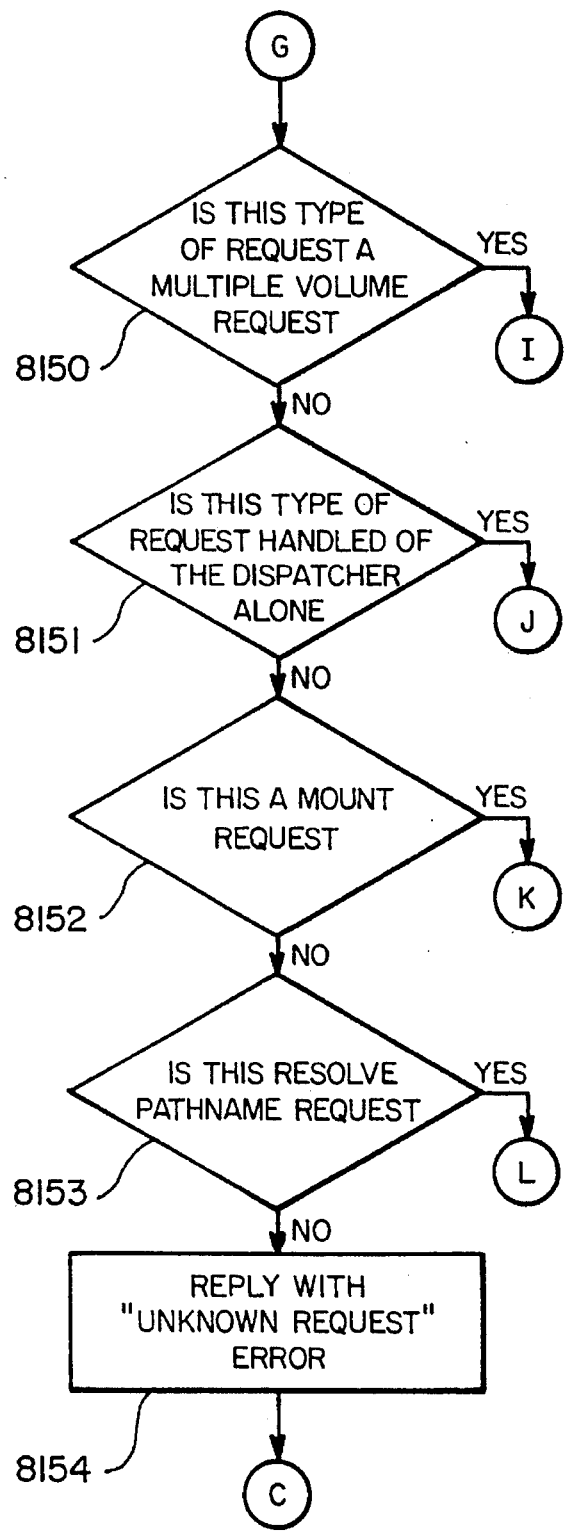
FIG_8b    FIG_8c

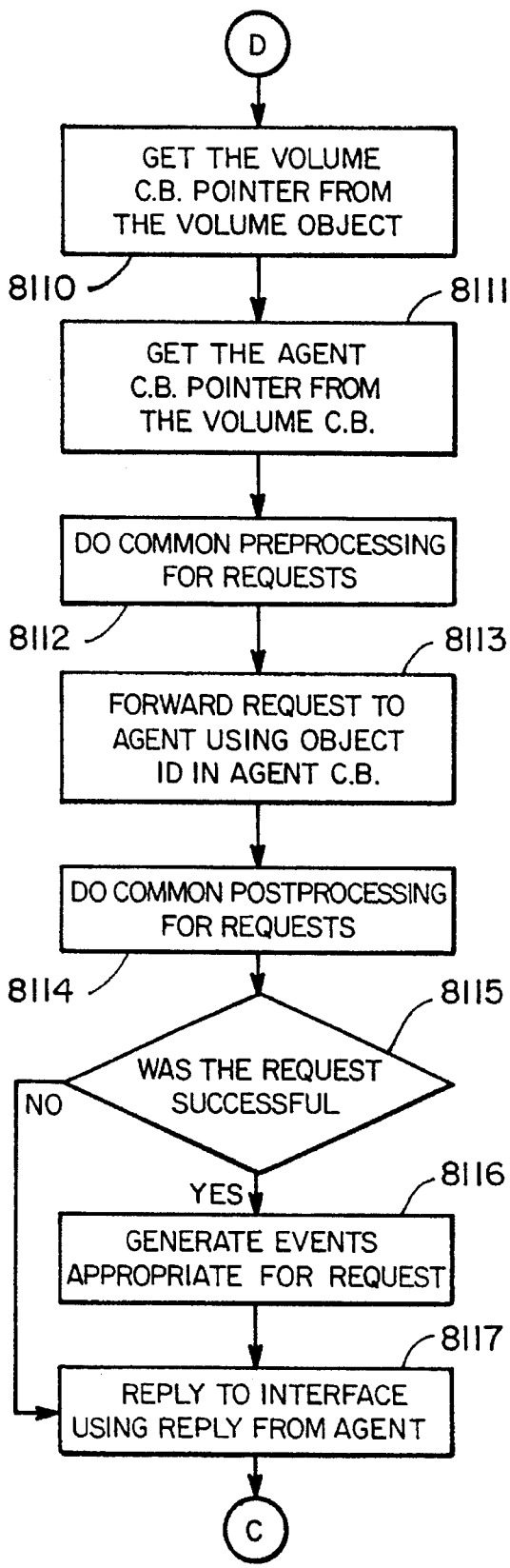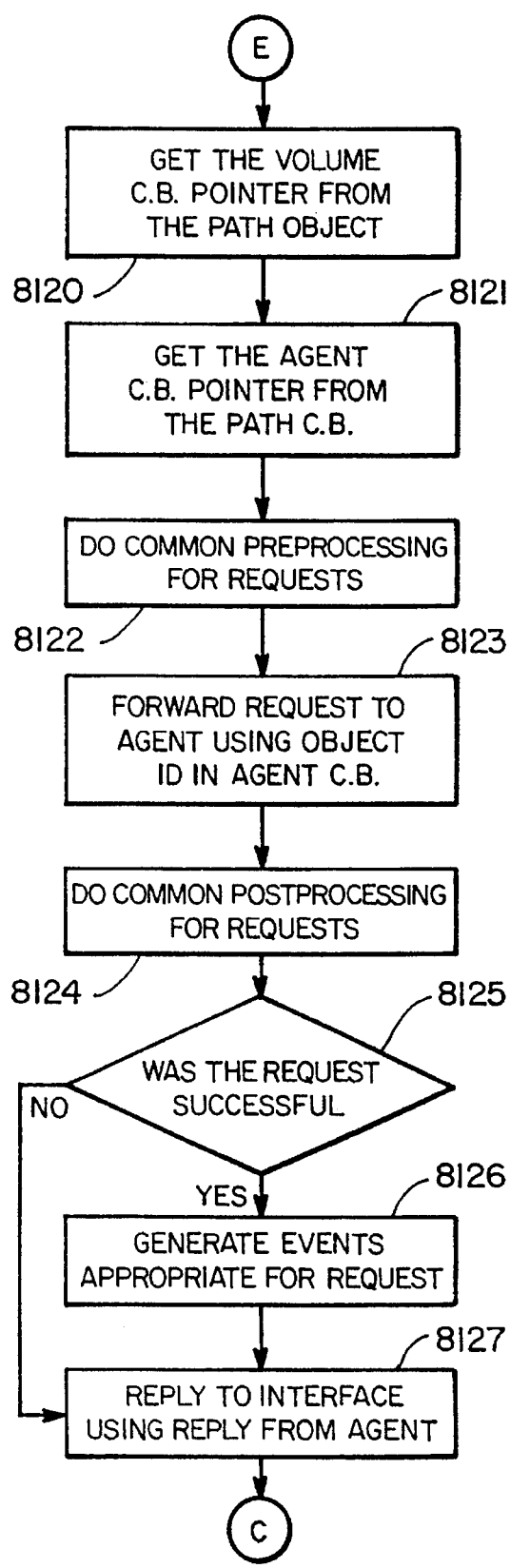
FIG_8d  FIG_8e

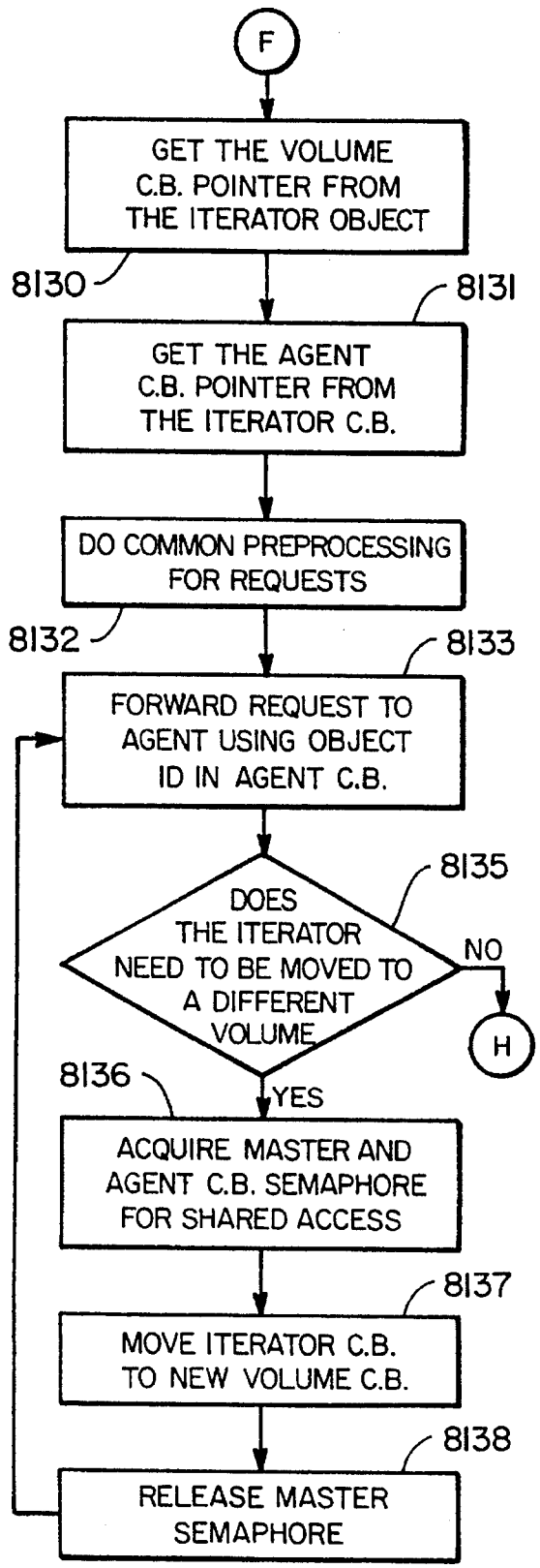
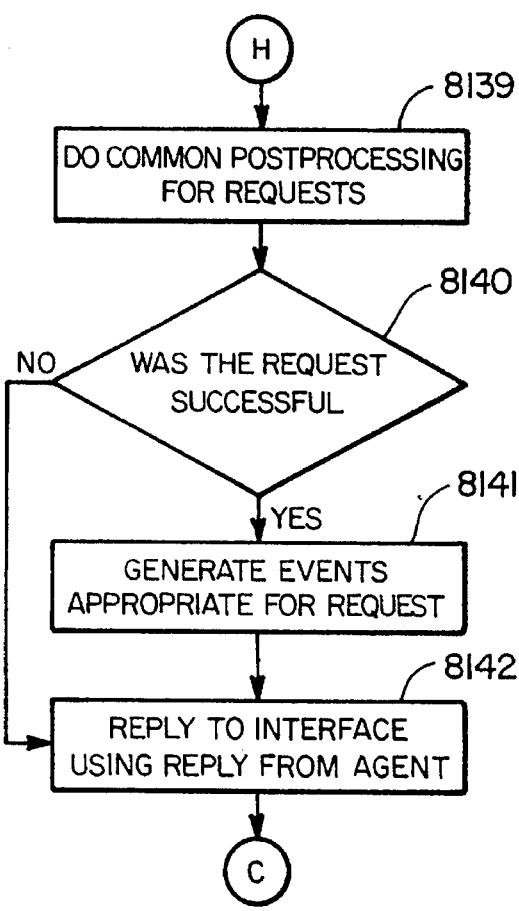
FIG_8f                FIG_8g

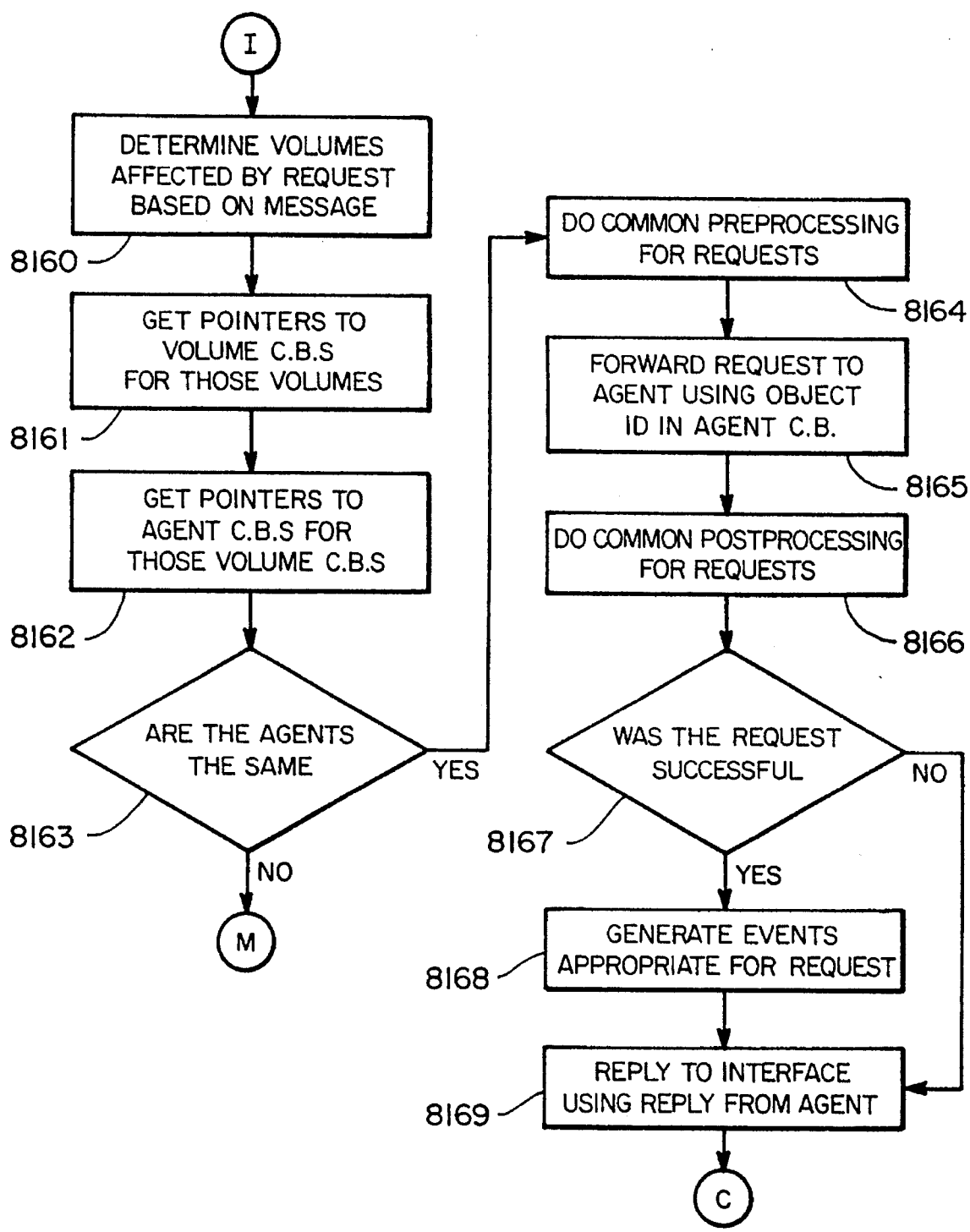
FIG_8h

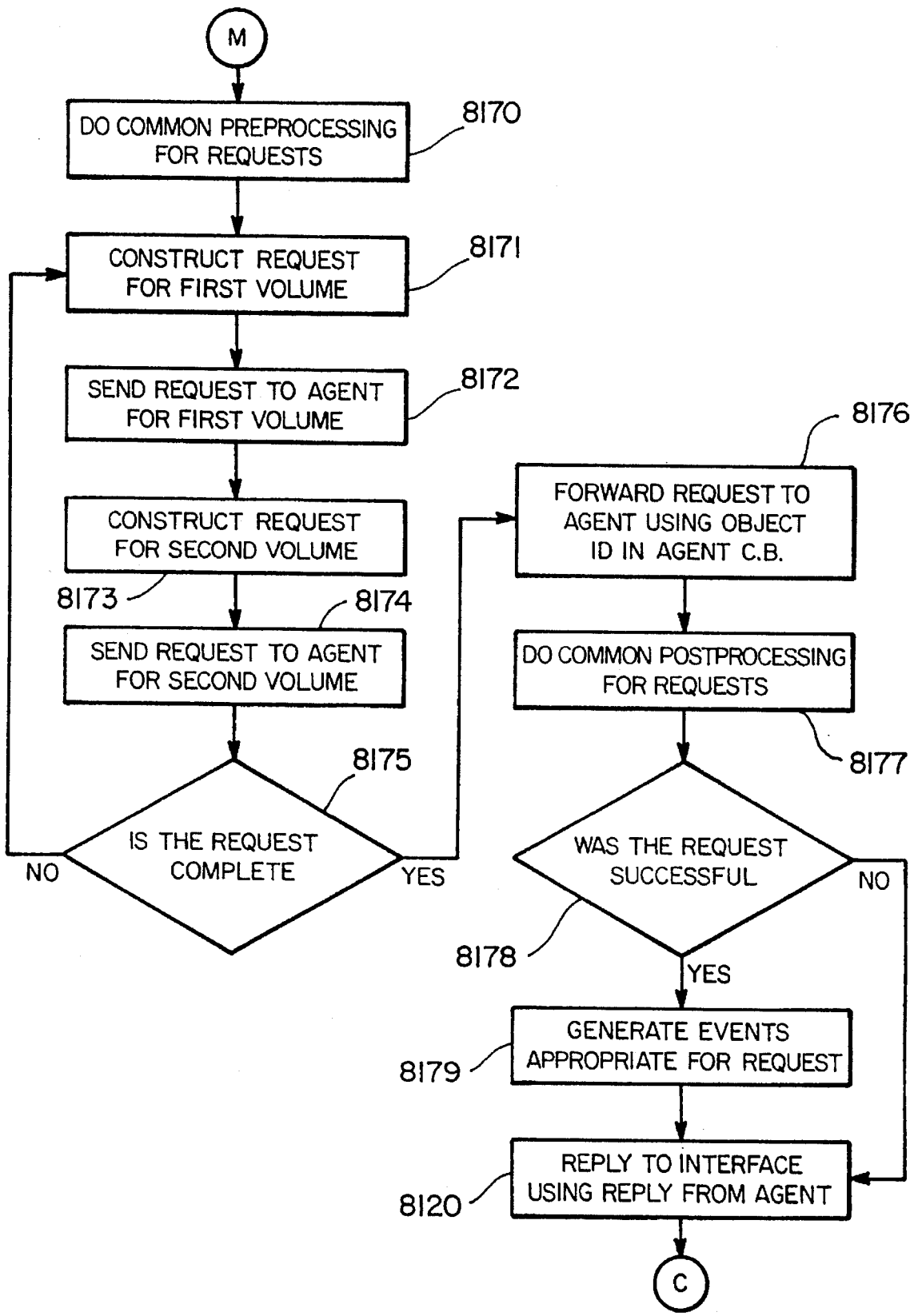
FIG_8i

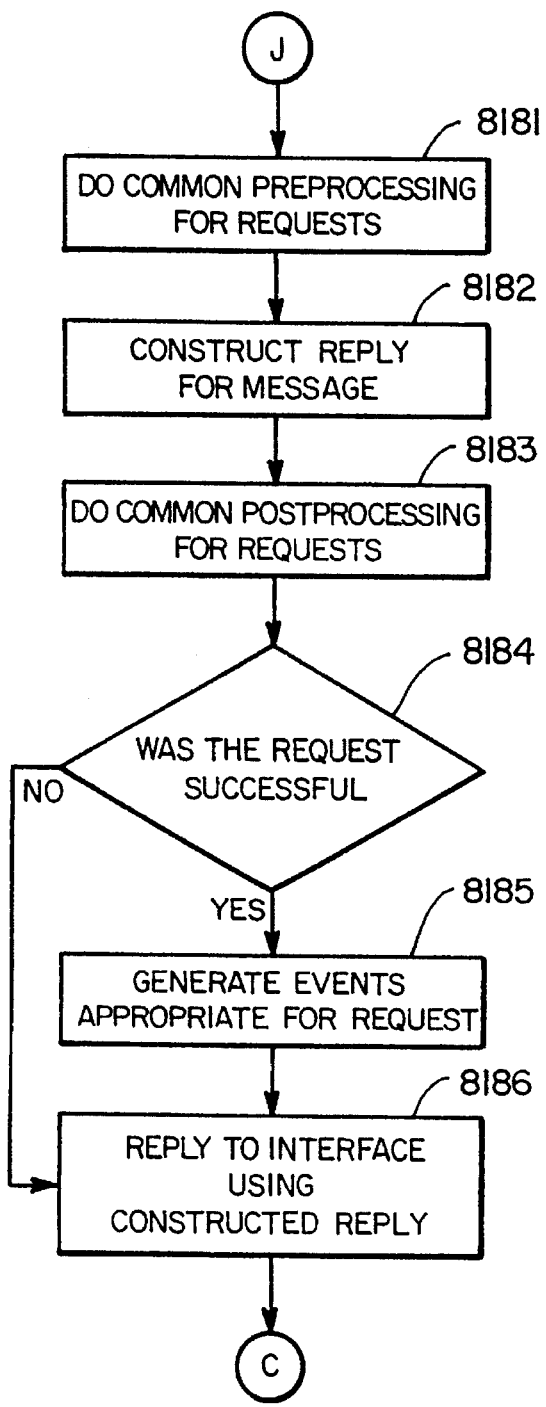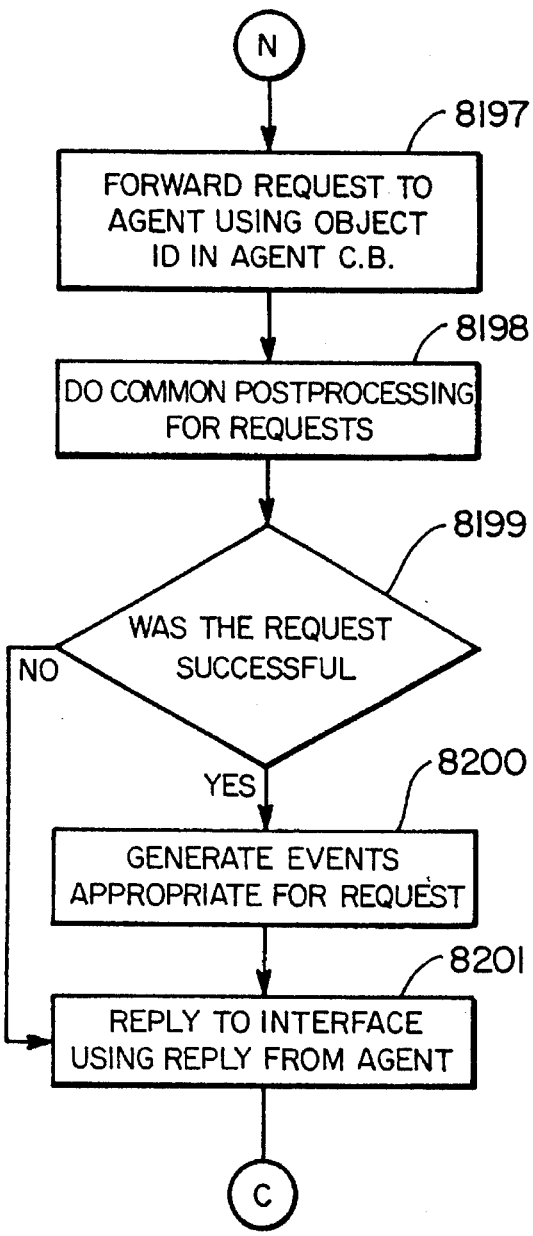
FIG_8j          FIG_8l

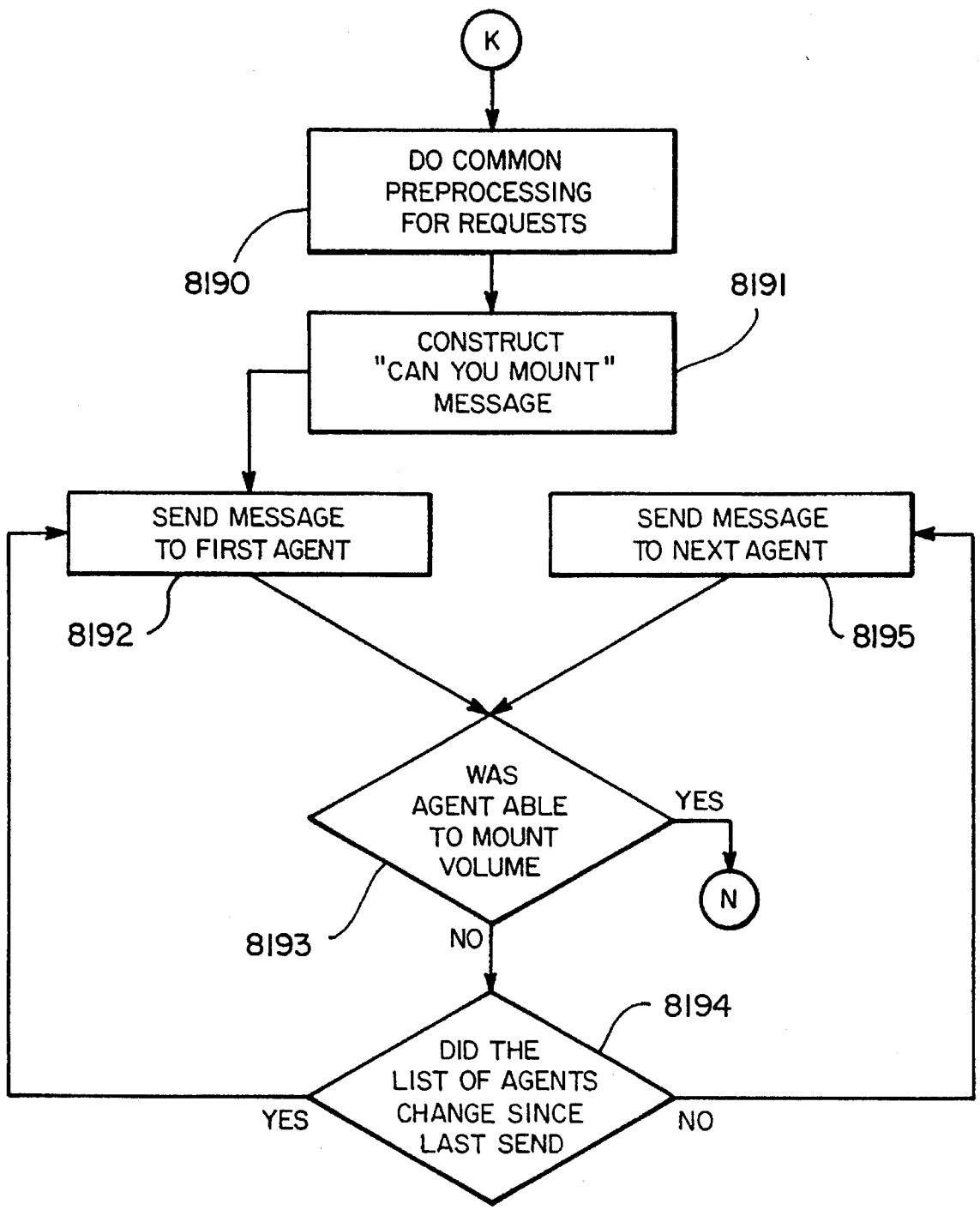
FIG_8k

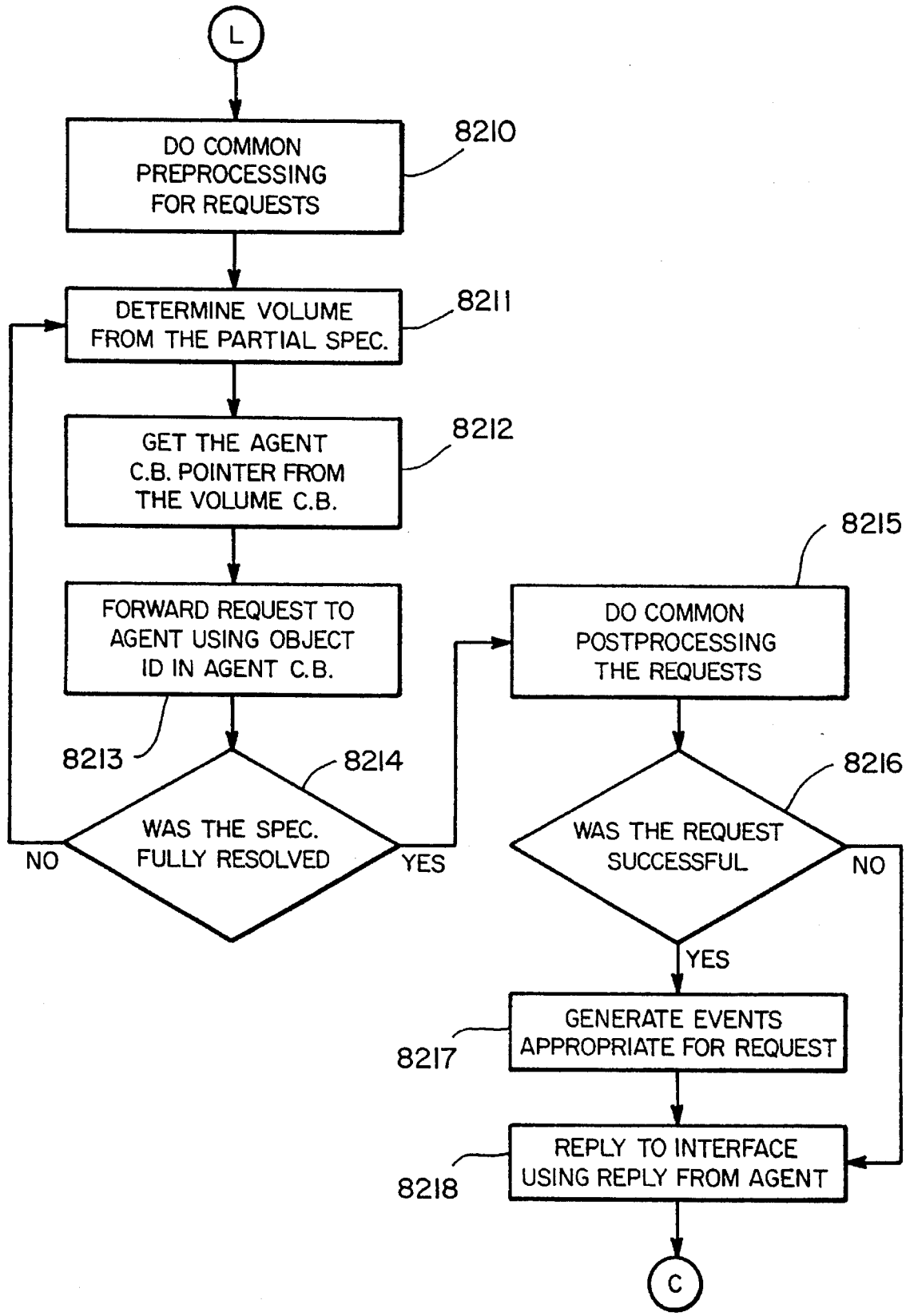
FIG_8m

METHOD AND APPARATUS FOR HANDLING REQUEST REGARDING INFORMATION STORED IN A FILE SYSTEM

A portion of the disclosure of the patent document contains material which is subject to copyright protection. The copyright owner does not object to the reproduction of the patent document or portions of the disclosure, as it appears in the records of the Patent and Trademark Office, but otherwise reserves all copyright rights whatsoever.

CROSS-REFERENCE TO RELATED APPLICATIONS

The present application is related to a patent application entitled "Method and Apparatus for Distributing Information About Events in an Operating System", in the name of Steven James Szymanski, Thomas Eugene Saulpaugh, and William John Keenan, filed on or about the filing date of the present application, on May 13, 1994, assigned Ser. No. 08/242,204 herein incorporated by reference.

BACKGROUND

The present invention is directed to a method and apparatus for handling requests regarding information stored in a file system as part of an operating system, and in particular, to provide a method and apparatus for handling such requests for multiple file systems.

Computer operating systems include several different operational modules. One such module is the file manager. The file manager manages the organization, reading, and writing of data located on data storage media, such as hard disk and removable disk drives. Each storage media has its own associated format for accessing the data on the storage media. Examples of such formats are HFS, MS-DOS FAT, ProDOS, High Sierra, ISO 9660, Unix, etc. Formats encompass both physical disk formats and network server access protocols.

Until recently, computers have been able to access storage media organized under only one format. However, them has been a move to allow computers to access data using multiple formats. At least two systems are currently available which can access storage media using multiple formats.

European Patent Application 0 415 346 to Willman et al. discloses a system adapted for use in a Microsoft™ OS/2 operating system for automatically and dynamically mounting a file system which recognizes the media. In the Willman et al. computer system, one or more data storage devices and a plurality of file system drivers are provided including a default file system wherein the file systems are organized in a linked sequence. Each file system driver is able to access file systems of a particular format. The computer system continuously monitors all peripheral devices to detect any change in media in the peripheral storage devices. Whenever media in a data storage device is changed, or the first time the computer system accesses a data storage device, the first file system driver identified in the list of file system drivers is loaded and a volume identifier is read from the media wherein the location of the volume identifier is specified by the loaded file system driver. The volume identifier read from the media is then compared with the identifier associated with the file system driver and the file system driver is mounted if the identifiers match. Otherwise, the next file system driver identified in the linked list of file system drivers is loaded. The process is then repeated until each file system driver in the linked list of file system drivers has been tested or until a match is found. A default file system is mounted if no match is found.

This system lacks flexibility. In particular, the identifier must be in a common known location for all volume formats which can be used by the system. Instead, it is desirable to allow each file system driver to use it's own method of identifying the volume to provide increased flexibility in the volume format.

Another system for accessing multiple file systems is found in the Microsoft™ WINDOWS™ NT operating system. In this system, messages are sent to a plurality of objects that are maintained by each file system driver, the objects corresponding to the subject of the requests. Thus, if modifications to the processing of particular kinds of messages are necessary, they must be made at each file system driver.

Other file managers are known, such as the System 7 file manager used on Macintosh™ brand computers manufactured by Apple Computer, Inc. When a request is received in System 7, the file manager assumes it is a request for access to an HFS (Hierarchical File System) volume used by Apple Macintosh™. If the storage media is not HFS, an error is generated and the file manager passes the request to a piece of code that tries to perform the requested access.

It is desirable to provide a file manager which is a portable version which would be able to run on a variety of processors, and be able to take advantage of the concurrent, asynchronous device managers available in many operating systems. It is also desirable to provide a file manager which provides downward compatibility with the application programmer interface (API) of prior art file managers. By way of explanation, an application programmer interface (API) is defined to provide a specification which allows third parties to communicate with the operating system. For example, in the context of the present invention, an API is defined to provide a specification which allows third parties to communicate with the file manager.

Prior operating systems were built using a monolithic code structure which did not include separate modules for performing specific tasks. Problems developed because it became difficult to make improvements to the system since the entire system had to be rebuilt to make each change. In addition, the entire code ran in privileged mode, causing problems because any component of the systems could interfere with any component causing a error.

The solution to this was to cast as much functionality as possible out of the system into separate services (e.g., the file manager, input/output manager, screen manager, etc.) which ran in less privileged modes, leaving a kernel of code to perform the most privileged functions. Since the kernel was providing an absolute minimum of services, it was rare that it had to be revised. Since each of the other services was independently built, it was easier to revise them. Because most of the system code ran with reduce privileges, the system was more stable. And, because the system was more easily modified, a lot of new features were added because it suddenly became easier to innovate. Thus, modern operating systems typically are designed according to this kernel structure.

Prior APIs, for the monolithic operating systems, rely heavily on global states. It is desirable therefore in such an environment, to develop a new API for the file manager which assumed that all file manager data was in a separate, protected address space, and which allows programmers to migrate towards a secure system in the future.

SUMMARY

The present invention relates to a system for handling requests regarding information stored in a file system that employs a central dispatcher, multiple interfaces that serve as sources of requests, multiple loadable format agent modules or file system drivers, a store, and a common shared library.

The system according to the present invention employs a set of common message structures that can represent requests regarding information stored in a file system in a way that is both independent of the implementation of that file system and independent of the public interfaces provided. These message structures are then used as a common language for communication between the components of the mechanism.

A plurality of interface modules (of which there can be any number), present different public interfaces to other components of the system. Thus software that is written for specific environments can use the interfaces that am standard in that environment. Calling programs send requests for access to various storage media to the interface modules. These interface modules send those requests to the dispatcher for processing.

The dispatcher receives the requests and forwards them to one of a plurality of format agents based on information about the requests retrieved from a store. Each of the format agents is adapted to access storage media using a particular file system format. The format agents, communicating with the storage media, receive the requests from the dispatcher and process the requests. When the request processing is completed, the format agents reply to the dispatcher with any information that needs to be returned to the original caller. Once all the format agents involved with fulfilling the request have completed and replied to the dispatcher, the dispatcher replies to the interface module that was used to initiate the request, sending any information that needs to be returned to the caller. The interface module then translates that information into a form that is appropriate to the interface, and returns it to the caller.

Since parts of the internal mechanisms of the format agents will be very similar between different modules, the system according to the present invention provides a common shared library that can be used by all the format agents. This library includes implementations of common mechanisms that can be shared between implementation modules, therefore making it easier to develop these modules.

According to one embodiment of the present invention, in a computer including at least one caller adapted to request access to a storage media, the storage media being organized according to one of at least one file system format, a system is provided for handling requests for access to the storage media. The system comprises interface means for receiving a request from a caller, determining an appropriate one of a plurality of destinations to which to send the request based at least in part on a subject for the received request, and sending the request to the appropriate destination, format agent means, corresponding to the file system format, for processing requests to access the storage media, storing means for storing at least one first identifier for identifying the format agent means, second identifiers for identifying the plurality of destinations, and means for mapping between the second and first identifiers, and dispatch means for receiving the request from the interface means and forwarding the request to the format agent means responsive to the mapping means.

According to another embodiment of the present invention, a file manager is provided which comprises at least one caller which requests access to a storage media, the storage media being organized according to one of at least one file system format, a plurality of interface modules for receiving a request from a caller, determining an appropriate one of a plurality of destinations to which to send the request based at least in part on a subject for the received request, and sending the request to the appropriate destination, at least one format agent module, corresponding to the file system format, for processing requests to access the storage media, a store for storing at least one first identifier for identifying the at least one format agent module, second identifiers for identifying the plurality of destinations, and means for mapping between the second and first identifiers, and a dispatch module for receiving the request from the interface modules and forwarding the request to the at least one format agent module responsive to the mapping means.

According to another embodiment of the present invention, in a computer, a dispatcher is provided for handling requests for access to at least one storage media, the computer including an operating system, interface means for interfacing between callers sending the requests and the operating system, and a plurality of agent modules for interfacing between the operating system and the storage media, each agent modules corresponding to one of at least one file system formats. The dispatcher comprises a store for storing at least one first identifier for identifying the at least one agent module, second identifiers for identifying a plurality of objects to which requests can be sent, and means for mapping between the second and first identifiers, and a request processing module for receiving the request from the interface modules and forwarding the request to the at least one agent module responsive to the mapping means.

According to another embodiment of the present invention, in a computer, a method is provided for handling requests for access to at least one storage media, the computer including an operating system, interface means for interfacing between callers sending the requests and the operating system, and a plurality of agent modules for interfacing between the operating system and the storage media, each agent modules corresponding to one of at least one file system formats. The method comprises the steps of storing, in a store, at least one first identifier for identifying the plurality of agent modules, second identifiers for identifying a plurality of objects to which requests can be sent, and mapping information for mapping between the second and first identifiers, and receiving the request from the interface modules at a request processing module, and forwarding the request to the at least one agent module responsive to the mapping information in the store.

According to another embodiment of the present invention, in a computer including at least one caller which requests access to a storage media, each of the storage media being organized according to one of at least one file system format, a method is provided for handling requests for access to the storage media. The method comprises the steps of storing, in a storing means at least one first identifier for identifying at least one format agent means, second identifiers for identifying a plurality of destinations, and mapping information for mapping between the second and first identifiers, receiving a request from a caller at an interface means, determining an appropriate one of the plurality of destinations to which to send the request based at least in part on a subject for the received request, sending the request to the appropriate destination, receiving the request from the interface means in a dispatch means, forwarding the request to an appropriate one of the format agent means responsive to the mapping information in the storing means, and processing requests to access the storage media via one of the format agent means corresponding to the file system format.

Still other objects, features and attendant advantages of the present invention will become apparent to those skilled in the art from a reading of the following derailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIG. 1 is a block diagram of an exemplary computer system on which the present invention may be implemented;

FIG. 2 is a general block diagram of the architecture of the file manager for handling requests regarding information stored in a file system according to the present invention;

FIG. 3a is a block diagram of the store according to one embodiment of the present invention;

FIGS. 3b and 3c illustrate a control block header and agent control block, respectively, according to one embodiment of the present invention;

FIG. 4 is a block diagram illustrating the shared library according to one embodiment of the present invention;

FIG. 5a is a block diagram of the dispatcher according to one embodiment of the present invention;

FIG. 5b illustrates a request task state structure according to one embodiment of the present invention;

FIG. 6 is a flowchart illustrating the process by which an interface module processes a request from a caller according to one embodiment of the present invention;

FIGS. 7a through 7f are flowcharts illustrating the process by which format agents maintains the existence of the control blocks that form the store according to one embodiment of the present invention; and FIGS. 8a through 8m are flowcharts illustrating the dispatcher processing according to one embodiment of the present invention.

DETAILED DESCRIPTION

For purposes of this description, a user is the person using a particular piece of software and a caller is a piece of software which is calling the file manager according to the present invention.

The present invention is directed to a file manager for handling requests regarding information stored in a file system that employs a central dispatcher, multiple interfaces that serve as interfaces between the callers and the dispatcher, multiple loadable format agents for accessing storage media organized according to a file system format, a store for storing information relating to the format agents and the file system, and a common shared library. This file manager provides a means to isolate the external interface to a file system from the internal implementation such that multiple public interfaces can be provided with no effect on the internal implementations of the file system. It also provides a means to isolate the implementations of individual file systems from the public interfaces such that multiple implementations can be supported with no visible effect on the external interfaces. Additionally, it provides a means which reduces the effort required to implement individual file systems.

According to one embodiment, all of the data in a file system is stored in one of two kinds of structures: attributes or forks.

According to one embodiment, attributes are descriptive data which are associated with a particular system unit, i.e., volume, directory, file, fork, or file class. All such descriptive information is accessed as attributes, regardless of how it is actually stored. Thus, names, privileges, a file's type and creator, a fork's length in bytes, etc. can all be accessed as attributes. The interpretation of certain attributes may be defined, and individual file systems may place restrictions on what attributes may be associated with what kinds of objects.

Attributes provide information about the unit which may be useful to other software accessing the unit, such as, the author, type of document, size of the unit, key words associated with the unit, etc. Attributes are available to the software without opening or accessing the units themselves. According to one embodiment, attributes can be defined by programmers as necessary. In particular, attributes are used to store small data items which need to be accessed by software other than the program which created the attribute (or owns the thing to which the attribute is attached). Attributes can be associated with any of the persistent structures in a file system: volumes, file classes, directories, files, and forks; and it is assumed that there can be a large number of attributes associated with each structure.

Specific attributes are identified by an identifier. In one embodiment, this might be a 4 character code known as an OSType. Alternatively, a pair of identifiers may be used. The first identifies the service which owns the attribute. According to one embodiment, for example, 'fmgr' is used for file manager attributes, 'fndr' is used for finder attributes, 'hfs' for HFS volume specific attributes, the application signature for application generated attributes. The second identifier is used to distinguish between different attributes owned by the same service. The value of an attribute is an uninterpreted sequence of one or more bytes (zero length attributes need not be supported), with no fixed maximum size (the API encourages but does not require small values). Attribute values have no type associated with them. It is assumed that anyone who knows the name of an attribute, also knows the format of the value. For the cases where a given attribute can have a value in more than one format, the developers are free to develop their own protocol for handling this.

In one embodiment, attributes are used to provide access to all of the system-maintained information in the file manager. Everything the operating system knows about the persistent structures in a file system, other than the fork data, can be accessed by way of attributes. This includes information, such as the name of the file or the length of a fork, which can be accessed through other means as well. An alternative embodiment would make the fork data accessible as well by defining a service name 'fork', and using the fork name as the second OSType in the attribute name.

Forks are an ordered sequence of bytes and the fundamental unit on which input/output is performed. Forks are used to store large data items which are primarily accessed by the software which created the fork. Forks are associated only with files and it is assumed that there are relatively few forks for each file. According to one embodiment, a fork's data can be from 0 to $2^{63}$ bytes long, and may be allocated sparsely.

In one embodiment, forks within a file are identified by a single OSType. The data in a fork may be sparsely allocated.

There is an OSType associated with each fork which defines the format of the fork (on standard HFS volumes, this will default to 'rsrc' for the resource fork, and the file's type for the data fork). All privilege restrictions on concurrent access are controlled at the fork level. Every fork has an ID and its data.

In one embodiment, applications files may have one fork, a resource fork, which contains the structure of dialog boxes, menus, etc. Data files may have only data forks containing the text of the data. According to one embodiment of the invention, more than two forks may be defined. Other forks may include information which the software which created the file can use. For example, if a word processing program allow translation of the document into a second language as it was being typed, the two versions of the document would be stored in two different forks. The existence of the forks themselves would be unknown to the user, but the word processing program would know which fork to access to retrieve which version of the document. Other uses for multiple forks are believed to be within the skill of the ordinary artisan once in possession of the present disclosure.

In one embodiment, data within a fork is accessed through an open path. Paths are runtime constructs which are created for a specific fork, and are defined to use a specific access method. More than one path can be created for a given fork and the different paths may use different access methods; but the earlier paths created may place limits on what can be done using the later paths.

In one embodiment, files are collections of forks and attributes which can be copied, moved, deleted, and renamed atomically in a file system. Every file has a name (a sequence of characters), a single directory which serves as its parent directory, and a specific volume on which its data is stored. Files may also be identified by a value which is unique within a volume.

According to one embodiment, a file can have any number of forks, and each fork in a file is distinguished by a four byte code. Every file has a name, a type code, a creator code, and a set of privileges.

According to one embodiment, files represent the largest collection of information which can be easily dealt with as a unit. The propose of files is to provide the basis on which the user experience can build a concept of an atomic bundle of information. While finer grain information can be accessed and manipulated through the file manager API within a program, the intent is for the user and caller to view a file as a unit which is manipulated as a whole.

According to one embodiment, a file class is a logical grouping of files across volumes which share the same type, creator or both. Certain file system behaviors are associated with file classes.

According to one embodiment, directories are collections of files and directories. Every directory has a name (a sequence of characters), a single directory which serves as its parent directory, and a specific volume on which its data is stored. Since directories can contain other directories, there can be a hierarchy of directories containing files on a volume. Directories may also be identified by a value which is unique within a volume.

According to one embodiment, the purpose of directories is to provide a context for finding and using files. Files are put into a context of a directory which can be used to group related files and to provide some context for interpreting the name of a file.

According to one embodiment, there is one special directory which is managed by the file manager, and which has special characteristics. Starting at any entity in a file system (any file, directory, or volume), and moving to the parent directory of that entity, and the parent directory of that parent, and so on, the meta-root directory is eventually reached. The meta-root directory has no parent directory, but is indirectly the patent of everything else in the file system. The meta-root does not exist on a volume, but it is created and maintained by the file manager itself. According to one embodiment, every time the file manager mounts a volume (see below), it mounts it such that the root directory of that volume has the meta-root as its parent. Since the meta-root is not actually stored on any volume, the file manager places heavy restrictions on what callers can do in a or with the meta-root. Only a limited (and non-extensible) set of attributes may be manipulated on the meta-root and file and directories may not be created in the meta-root.

Volumes are also collections of files and directories. Every volume has a name (a sequence of characters), and is associated with some form of storage media (either local or remote). Volumes serve as the unit of availability for the file manager. According to one embodiment, volumes represent the smallest collections of files and directories which are made available or not available as a unit. Units such as a single removable disk, partitions within a disk drive, or a set of disks, etc. can be defined as volumes. Note that the contents of a volume may be available to the computer, but the current user may not have permission to actually access the data.

According to one embodiment, every volume has at least one directory on it, known as the root directory, which may in turn contain other directories and files. For every entity in that volume; if you find its parent directory, and the parent directory of that parent, and so on; you will always eventually get to the root directory of that volume. Currently, whenever a volume is mounted by the file manager, it sets the parent directory of the volume's root to be the meta-root.

According to one embodiment, every request of the file manager is performed on behalf of some user or group of users of the system. As far as the file manager is concerned, all such users and groups are identified by persistent values (known as identifies).

According to one embodiment, an access method is the model by which data in a fork is accessed through a path. According to one embodiment, two access methods are defined: stream, which allows random access to variable amounts of data on the fork; and BTree which allows insertion, deletion, and search for structured records in the fork.

FIG. 1 is a block diagram showing an exemplary computer on which the software according to the present invention may be implemented. The computer 10 includes a processing unit (CPU) 12, an external storage device 14, a disk storage device 16, input/output (I/O) controller 18, at least one input device 20, at least one output device 22, a random access memory (RAM) 24, and a common system bus 26 connecting each of the above elements. The computer 10 is also connected through the bus 26 and I/O controller 18 to the input and output devices 20 and 22. In addition, the computer 10 can also be adapted for communicating with a network 27.

The computer 10 includes a number of pieces of software which can be executed by the processor 12. One of those pieces of software is an operating system 28. In one embodiment, the operating system 28 is a microkernel operating system capable of maintaining multiple address spaces. A file manager 30 resides within the operating system. In an exemplary embodiment, the computer 10 of the present invention is an Apple Macintosh™ computer system made by Apple Computer, Inc., of Cupertino, Calif., and having a microprocessor and memory wherein a microkernel operating system 28 that includes the file manager 30 resides. The components of the computer can be changed within the skill of the ordinary artisan once in possession of the instant disclosure. Although the present invention is described in a Macintosh™ environment, it is within the scope of the invention, and within the skill of the ordinarily skilled artisan, to implement the invention in a DOS, Unix, or other computer environment.

According to one embodiment, the present invention is part of an operating system with a microkernel architecture and assumes that the kernel will provide the following services. The kernel addresses space management such that all the file system's shared data structures are mapped into all the address spaces in which the file system's code exists. This can be provided by mapping all the code and data into a single address space. The kernel should also provide task creation and notification of task termination, a semaphore synchronization mechanism and a messaging system that provides multiple objects to which messages may be sent. The messaging system allows a creator defined value to be associated with each object, multiple objects to be mapped to the same port, messages to be either received from a port or have a function be called when a message of an appropriate type is sent to that port, and allows the receiver of the message to determine to which object the message was originally sent and to derive the creator defined value for that object. One example of such a microkernel architecture is provided by NuKERNEL™, used in Apple Macintosh™ computers. The NuKERNEL™ system is described in copending U.S. patent application Ser. No. 08/128,706, filed on Sep. 30, 1993, for a "System For Decentralizing Backing Store Control Of Virtual Memory In A Computer", application Ser. No. 08/220,043, filed on Mar. 30, 1994, for an "Object Oriented Message Passing System And Method", and application Ser. No. 08/242,204, filed May 13, 1994, for a "System and Method Of Object Oriented Message Filtering". These three patent applications are incorporated by reference herein.

According to the messaging system, a service is provided by a server and software wishing to make use of the service is called a client of the server. Messages are sent to a target by clients and received by servers. The message directs the server to perform a function on behalf of the client. Message objects are abstract entities that represent various resources to messaging system clients. These objects may represent, for example, volumes, forks, or files, managed by a server. Clients send messages to objects, which objects are identified by ObjectID.

Message ports am abstract entities that represent a service. These ports may represent, for example, a device driver, a file manager, or a window manager. Servers receive messages from ports, which ports are identified by PortID. Objects are assigned to a port. A message sent to an object is received from that object's port. Ports and objects are created by the messaging system on behalf of a server. The creation of an object requires designating a port from which messages sent to the object will be retrieved. The objects and ports are used in one embodiment of the present invention to establish communication between the various components of the file manager.

One embodiment of the present invention utilizes kernel synchronization services to provide support for semaphores which are used to protect critical sections, kernel memory management services to allocate logical memory, and kernel tasking services to provide multiple threads of execution.

A general block diagram of the architecture of the file manager 30 according to one embodiment of the present invention is shown in FIG. 2. According to one embodiment, the file manager can be viewed as a collection of independently loadable modules including the interface modules 310, the dispatcher (or dispatch module) 300, the store 340, the shared library 330, and the format agent modules 320.

The interface modules #1, #2 . . . (310) present different public interfaces to other modules of the system. Two such interface modules are shown in FIG. 2, although any number of such modules may be provided. Software that is written for specific environments can use the interfaces that are standard in that environment. These interface modules 310 interface between the calling software and the operating system, in particular the file manager, by translating a request acquired through their interfaces into the message structures, and sending those messages to the dispatcher 300.

The store 340 includes storage structures that store an identifier to identify each format agent, an identifier to identify the objects assigned to the dispatcher port, and mapping information for mapping between the format agent identifiers and the object identifiers. According to one embodiment, the store 340 is conceptually part of the dispatcher 300. The dispatcher 300 receives the messages from the interface modules 310 and uses the mapping information contained in the store 340 to determine which format agent is able to satisfy the request. It then forwards the messages on to the appropriate format agent #1, #2 . . . (320). Although three format agents #1, #2, #3 are shown, it is appreciated that any number of format agents can be included. According to one embodiment, each format agent can access storage media according to a particular file system format.

The appropriate format agent 320 receives the messages from the dispatcher 300 and process the requests, thereby interfacing between the operating system, in particular the file manager, and the storage media being accessed. When the request is completed, the format agents 320 reply to the dispatcher 300 with any information that needs to be returned to the original caller. Once all the format agents 320 involved with fulfilling the request have completed and replied to the dispatcher 300, the dispatcher 300 replies to the interface module 310 that was used to initiate the request, sending any information that needs to be returned to the caller. The interface module 310 translates that information into a form that is appropriate to the interface, and returns it to the caller.

Since parts of the internal mechanisms of the format agents 320 are similar between different modules, the file manager according to the present invention can include a shared library 330 that can be used by all the format agents 320. This library includes implementations of common mechanisms that can be shared between format agents 320, therefore making it easier to develop these modules. The shared library 330 also includes the software routines required by the format agents 320 to allow the agents to build the storage structures which form the store 340.

According to one embodiment, one interface module interfaces the file manager according to the present invention with previous implementations of the file manager API and another interface module provides the interface between a current operating system and the file manager according to the present invention. Other interface modules can be provided within the skill of the ordinary artisan once in possession of the present disclosure.

According to one embodiment, the store 340 comprises a plurality of control blocks as illustrated in FIG. 3. The control blocks include agent control blocks (agent C.B.) 3410, volume control blocks (volume C.B.) 3420, file control blocks (file C.B.) 3430, fork control blocks (fork C.B.) 3440, path control blocks (path C.B.) 3450, and iterator control blocks (iter. C.B.) 3460.

The file manager according to one embodiment of the present invention uses control block structures stored in memory to maintain the runtime state for the file system entities it manages (e.g., volume formats, volumes, files, forks, paths, and iterators) and to maintain in memory copies of frequently accessed information relating to these file system entities. In addition, each of these control blocks includes a semaphore which is used to coordinate the activities of the request processing tasks (RPTs).

According to one embodiment, these control blocks are stored as follows. There is a list of agent control blocks 3410, each agent control block in the list corresponding to a format agent 320. Each agent control block 3410 can have a list of volume control blocks 3420 for volumes which have that format. Each volume control block 3420 can have a list of file control blocks 3430 for files which have opened forks, and a list of iterator control blocks 3460 for the iterators which currently point to something on that volume. Each file control block 3430 can have a list of fork control blocks 3440 for forks which are opened for that file. Each fork control block 3440 can have a list of path control blocks 3450 for each access path which is opened for that file.

Each control block, regardless of type, has a header 3400 which contains some common fields: control block type; version; parent control block pointer; list links; semaphore; agent control block pointer; and agent specific data pointer. This structure is illustrated in FIG. 3b. The control block type field is the type of the control block (volume, file, etc.). The version field is the version of the control block structure used. The parent control block pointer field is the pointer to the control block which is the parent of this one. For example, for the file control block 3430, this field is a pointer to the volume control block which has it in its list. The list links field are pointers to the next and previous control blocks which have the same parent. The semaphore field is the semaphore used to coordinate access to the control block. The agent control block pointer field is a pointer to the agent control block pointer which owns the structure (that is, if you follow the parent pointers up, you eventually get to this pointer). The agent specific data pointer field is a pointer to the agent specific extension to the control block. This field is included because while the different implementations of the file manager may define certain public fields which are to be included in the control blocks, every volume format is likely to want additional private fields to keep track of format specific data and states. The control block services module 3350 (FIG. 4) allows the format agents 320 to allocate control blocks with extra room to hold these additional fields. The agent specific data pointer then is a pointer to this extra space. It is appreciated that the definition of the fields to be included within the control blocks am within the skill of the ordinary artisan once in possession of the present disclosure.

One embodiment of the agent control block 3410 has the structure illustrated in FIG. 3c, including the following fields: control block header; volume list header; agent Objectid; agent signature; and timeout base. The control block header contains the fields described above with reference to FIG. 3b. The volume list header is a pointer to the list of volumes for this volume format. The agent ObjectID is the ObjectID to which messages are sent for the format agent for this volume format. The agent signature is a unique identifier for the volume format. The timeout base is a time duration which is used as the basis for estimating the time a request will take for this volume format, and therefore the length of timeout which should be used.

FIG. 4 is a block diagram of the shared library 330 according to one embodiment of the present :invention. The shared library 330 contains five logical code modules: range locking services module 3310, BTree services module 3320, cache services module 225, block input/output (I/O) services module 3340, and control block services module 3350.

The range locking services module 3310 is responsible for providing a standard mechanism for all format agents to use to provide range locking functionality. It is still up to individual format agents as to whether they use this mechanism or provide their own. This decision is described in more detail below. The BTree services module 3320 contains the common BTree code which can be used by the format agents. The architecture according to one embodiment also permits the same code to be used to support both the internal and public BTree interfaces. The cache services module 3330 is responsible for managing the file manager cache. It allocates and maintains the cache storage and maintains a database of how the various cache blocks are used. According to one embodiment, the design permits fast detection of cache hits, even with larger caches and handles multiple sizes of buffers, and supports read-extend operations. The block I/O services module 3340 provides a common interface for the disk based format agents to perform driver I/O.

The control block services module 3350 contains the code which actually allocates, accesses, manipulates, and releases the various kinds of control blocks used internally by the file manager according to the present invention. The control block services module 3350 is responsible for providing services which enable concurrent processing of requests in multiple threads of execution such that all critical sections are protected. In particular, if there are multiple threads of execution using the same data, a method is requited to prevent them from stepping on each other.

According to one embodiment, this is accomplished by acquiring and then releasing control blocks. For instance, to read information from a volume (but not change it), the volume's control block is acquired for shared access so that other people can read at the same time, and it is released when the access is complete. Or, to modify the information about an access path, the path's control block is acquired for exclusive access so that only one thread is allowed to have exclusive access at a time. If a second thread of execution tries to get access while the first thread has acquired the control block for exclusive access and has not yet released it, the second thread of execution will be forced to wait until the first thread releases it. In this way, the various threads of execution cooperate with each other. According to one embodiment, the actual data for these structures is allocated in the kernel band, and is referenced through globals, but the code for manipulating them is included in the shared library to make them accessible to all of the format agents 320.

FIG. 5a is a block diagram of the dispatcher 300 according to one embodiment of the present invention. The dispatcher 300 comprises two task modules: the dispatch maintenance module 3040 and the request processing module 3030. The dispatcher 300 also includes a dispatch store 3050 and the dispatch message port 3010. The volume control block objects 3425, path objects 3455, and iterator objects 3465 are assigned to the dispatch message port 3010 as described above. The dispatch message port 3010 also includes a file manager object (FMO) 3020 to receive requests not directed at a volume, path, or iterator.

According to one embodiment, the dispatch maintenance module 3040 has a thread of execution which performs maintenance activities including initializing the file manager, shutting it down, and performing periodic maintenance chores such as handling kernel messages, cancellation of requests, maintain the number of request processing tasks, and flushing the cache. Other maintenance procedures may be implemented in alternative embodiments by an ordinarily skilled artisan once in possession of the instant disclosure.

According to one embodiment, the request processing module 3030 has a plurality of threads of execution which are known as request processing tasks (RPT) which are used to actually process file manager requests which are sent to the dispatcher. At any point in time, each of these tasks is either processing a request, or waiting for a new message to come into the file manager port. As each new request message comes in, the messaging system gives it to the next RPT which is waiting.

According to one embodiment, to keep track of the RPTs, the dispatcher 300 maintains the dispatch store 3050 which includes a set of RequestTaskState structures, one for each running RPT. In one embodiment, these structures are maintained in a doubly linked list. This structure keeps track of a task identifier, a message identifier of the request it is currently processing (if it is processing one), and the format agent to which the request has been forwarded (if it has).

In one embodiment, this structure has a format illustrated in FIG. 5b, including list links; task ID; flags; termination action; current message; canceled message; and agent control block pointer. The list links field are pointers to the next and previous RequestTaskState structures. The flags field are used to indicate if the RPT is currently processing a request, and if the request has been forwarded to a format agent. The termination action field, in one embodiment, is a software interrupt for the maintenance task which is invoked if the RPT terminates unexpectedly. The current message field is the message ID of the message which the RPT is currently processing. If the RPT is not currently processing a request, the current message field is reset to some known value. The canceled message field is the message ID of the message if it was canceled. The agent control block pointer is a pointer to the control block for the format agent to which the request was forwarded.

According to one embodiment, the dispatcher 300 defines the following additional globals: RequestTaskQueue is a header for list of RequestTaskState structures; AgentControlBlockList is a header for the list of agent control blocks; FileManagerPort is the file manager port FMO 3020; FileManagerObjID is the general ObjectID for file manager requests; RequestTaskCount is the number of running RPTs; RequestTaskDesire is the desired number of RPTs to have running at a given time; and MasterSemaphore is a semaphore which is used to coordinate access to the list of agent control blocks.

FIG. 6 is a flowchart illustrating the process by which an interface module processes a request from a caller according to one embodiment of the present invention. The request is received from the caller in the form of a call with designated input and output parameters. At step 610, the interface module interprets any input parameters of the call. A determination is made as to whether any messages are needed to fill in the output parameters (step 620). If the interface module has sufficient data to till in the output parameters for that call, the answer at step 620 is no and the output parameters are filled in at step 625.

If messages are required to fill in the output parameters, the interface module determines the first message it needs to send to obtain the output parameters (step 630). The message is sent to the dispatcher 300 (step 640). When a reply is received from the dispatcher 300, it is interpreted by the interface module (step 650). The replay data is stored in a temporary buffer at step 660. This enables the interface module to handle the situation where the call requires a number of messages to obtain the values to be returned as output parameters, and the situation where the call includes one output parameter, whose value is dependent on the reply data from a number of messages. At step 670, a determination is made whether the call is complete, that is, whether all the necessary messages have been sent to determine the output parameter values and perform all the actions required to satisfy the call. If not, the interface module determines the next message to send (step 675) and loops to step 640. If so, the output parameters are filled in from the temporary buffer (step 680) and the interface module returns to the caller (step 690).

In one embodiment, this process is implemented as a state machine. For such a state machine, the view is taken that the propose of any call to an interface module is to collect information, perform operations on a file system, or both. Therefore, states represent particular sets of information which have been collected and particular sets of operations which need not be performed (either because they have already been performed or they do not need to be performed based on the input parameters provided to the call). Likewise, transitions represent messages to be sent to the dispatcher to collect more information, to perform more operations, or both. The interface module continues to execute the state machine until all information indicated by the input parameters has been collected, and all actions indicated by the input parameters have been completed.

According to one embodiment, requests are processed concurrently. However, each volume is still only a single thing and there is only a single hierarchy of control blocks. Therefore the volumes and control blocks are shared resources to which access needs to be coordinated between the RPTs. In one embodiment, this is done by including semaphores in each control block and using those semaphores to coordinate access to the control blocks and the data in the file system which the control blocks represent.

In one embodiment, the policy for providing the coordination is:

1) to add or remove an agent control block, the master semaphore for the dispatcher and the semaphore for the control block being added or removed must be acquired for exclusive access;

2) to traverse the set of agent control blocks, the master semaphore for the dispatcher and the agent control block semaphore for the current agent must be acquired for shared access;

3) to change whether a volume is currently mounted, the semaphore for the volume's control block and the semaphore for that volume's agent control block must be acquired for exclusive access;

4) to traverse the set of volume control blocks, the master semaphore for the dispatcher and the agent control block semaphore related to the current volume must be acquired for shared access;

5) to change the structure of the control block hierarchy for a particular volume adding or removing file, fork or path control blocks, the semaphore of the volume control block and the semaphore for the control block being added or removed must be acquired for exclusive access;

6) to traverse the structure of the control block hierarchy for a particular volume (all of the file, fork, and path control blocks under that volume) or to change any of the meta-data for a volume (any shared structures on disk, for instance, the disk allocation map), the semaphore of the volume control block must be acquired for exclusive access;

7) to read information about a file, fork or path, the appropriate control block's semaphore must be acquired for shared access;

8) to modify information about a file, fork or path, the appropriate control block's semaphore must be acquired for exclusive access; and 9) multiple semaphores must be acquired in the order: master, path, fork, file, volume, volume format; and must be released in reverse order.

FORMAT AGENTS PROCESSING

FIGS. 7a through 7f are flowcharts illustrating the process by which format agents creates the control blocks that form the store 340 according to one embodiment of the present invention. FIGS. 7a through 7f refer to the control block constructs illustrated in FIG. 3. The remainder of the functions provided by the format agents, such as how an agent accesses the storage media organized in its format, will vary from agent to agent. The implementation of such functions within the skill of the ordinarily skilled artisan once in possession of the present disclosure.

FIG. 7a illustrates the process by which a volume control block is created in the store 340 in response to a mount request according to one embodiment of the present invention. First, a volume control block is create with room for private fields (step 7100). The private and public fields of the volume control block are filled in at step 7110. In one embodiment, private fields are those known only to the format agent, while public fields are fields which are required by the file manager. The agent control block semaphore is acquired for exclusive access (step 7120) and the volume control block is linked on to the agent control block's volume list (step 7130). The agent semaphore is then released (step 7140) and the format agent returns to the dispatcher.

FIGS. 7b and 7c illustrate the process by which a path control block is created in the store 340 in response to an open request according to one embodiment of the present invention. First, a path control block is allocated with room for private fields (step 7200). The private and public fields of the path control block are filled in (step 7205).

A determination is made at step 7210 whether a fork control block for the current fork exists. If a fork control block already exists, the volume control block semaphore for the volume on which the file exists is acquired for exclusive access (step 7211). The path control block is linked on to the fork control block's path list (step 7212) and the volume control block semaphore is released (step 7213). The process then ends.

If a fork control block does not exist at step 7210, a fork control block is allocated with room for private fields (step 7215). The private and public fields of the fork control block are filled in (step 7220) and the path control block is linked on to the fork control block's path list (step 7225).

Referring now to FIG. 7c, a determination is made whether there is a file control block exists for the file being processed (step 7230). If a file control block exists, the volume control block semaphore is acquired for exclusive access (step 7231). The fork control block is linked on to the file control block's path list (step 7232) and the volume control block semaphore is released (step 7233). The process then ends. If a file control block for the current file does not exist at step 7230, a file control block is allocated with room for private fields (step 7235). The private and public fields of the file control block are filled in (step 7240) and the fork control block is linked on to the file control block's fork list (step 7245). The volume control block semaphore is acquired for exclusive access (step 7250). The file control block is linked on to the volume control block's file list (step 7255) and the volume control block semaphore is released (step 7260). The process then ends.

FIGS. 7d and 7e illustrate the process by which a path control block is removed from the store 340 in response to a close request according to one embodiment of the present invention. The volume control block semaphore is acquired for exclusive access (step 7300). The data in the path control block is flushed (that is, data stored in the path control block is written to the storage media) at step 7305. The path control block is unlinked from the fork control block's path list (step 7310). At step 7230, a determination is made whether there are any more path control blocks for this fork. If there are more path control blocks, the volume control block semaphore is released (step 7332) to allow the other path control blocks to remain open and the process ends.

If there are no more path control blocks at step 7330, it is necessary to proceed back up the hierarchy (see FIG. 3). Accordingly, the data is flushed in the fork control block (step 7335) and the fork control block is unlinked from the file control block's file list (step 7330).

At step 7345 (FIG. 7e) a determination is made whether there are any more fork control blocks for the file being processed. If there are more fork control blocks, the volume control block semaphore is released (step 7347) to allow the other fork control blocks to remain open and the process ends. If there are no more fork control blocks at step 7345, it is necessary to proceed back up the hierarchy (see FIG. 3). Accordingly, the data is flushed in the file control block (step 7350), the file control block is unlinked from the volume control block's file list (step 7355) and the volume control block semaphore is released (step 7360). The process then ends.

FIG. 7f illustrates the process by which a volume control block is removed from the store 340 in response to an unmount request according to one embodiment of the present invention. First, the volume control block semaphore is acquired for shared access (step 7400). Additionally, new requests for the volume are blocked. In one embodiment, this is done using the lock object feature provided by the messaging system. At step 7410, a determination is made whether there are any file control blocks for this volume. If there are file control blocks, the volume control block semaphore is released (step 7415) and the process fails. If there are no file control blocks, the data is flushed from the volume control block (step 7420). At step 7430, a determination is made whether there are any iterator control blocks for this volume. If there are, each iterator is reset to refer to no entity (step 7415). In one embodiment this is accomplished by sending a message to the format agent which control the volume which is being unmounted. If there are no iterator control blocks for this volume, and after the step 7435, the volume control block semaphore is released and it is reacquired exclusively (step 7440). The agent control block semaphore is acquired for exclusive access (step 7450). The volume control block is unlinked from the agent control block's volume list (step 7460). The agent control block semaphore is released (step 7470) and the process ends.

The purpose of the format agent 320 is to receive requests from the dispatcher 300, process them, and reply with the results of the requests. In one embodiment, as discussed above, the format agent 320 may make use of a shared library 330 to perform operations which are common between several formats. Some requests may be able to be fulfilled using information which is either stored in the public or private fields of control blocks, while others will require reading and/or writing media or otherwise accessing devices through which the volume's data is obtained.

In one embodiment, if the volume is stored on a block oriented device, the format agent 320 may use the block I/O services module 3340 of the shared library 330 to read and write data on the media. If the format agent 320 expects certain data may be used repeatedly or if it wants to have the file manager allocate the buffer for the data it may use the cache services module 3330 of the shared library 330. If the agent 320 needs to access a BTree whose format can be handled by the BTree services module 3320 of the shared library 330, it make use that module as well.

In one embodiment, these three modules of the shared library 330 are dependant on each other. The BTree services module 3320 calls the cache services module 3330 to get buffers for the data it needs, and the cache services module 3330 calls the block I/O services module 3340 to actually read and write data in the cache.

It is however desirable to decouple the use of these modules. Therefore, according to an alternative embodiment, these modules make calls back to the format agent 320 to fulfill these needs. The format agent 320 has a procedural interface which the shared library modules can use in response to calls the format agent 320 makes on the shared library 330. The interface for these calls provides identical functionality to the calls which the BTree services module 3320 needs to make to the cache services module 3330 and the cache services module 3330 needs to make to the block I/O services module 3340.

According to this alternative embodiment, when the format agent 320 calls the BTree services module 3320 of the shared library 330, the BTree services module 3320 will call the format agent 320 for cache operations. The format agent 320 then can either choose to call the cache services module 3330 to fulfill these calls, or it can use some other mechanism (for example, a private cache, or direct reads and writes without cache). Likewise, when the format agent 320 calls the cache services module 3330 of the shared library 340, the cache will call the format agent 320 for block I/O operations. Again, the format agent 320 then can either choose to call the block I/O to fulfill these calls, or it can use some other mechanism (for example, calls to network drivers, or reading ram-disk buffers).

REQUEST PROCESSING BY THE DISPATCHER

The main function of the dispatcher 300 is to route requests to the correct format agents 320. How it does this depends on the type of request; but there are some general rules which cover most cases as follows.

1) If the request is directed at a specific volume, directory, file, or fork; part of the specification for that volume, directory, file, or fork is the volume ObjectID for the volume on which the entity exists. The message is sent to that ObjectID. Associated with that ObjectID is a pointer to the appropriate volume control block. The dispatcher gets that pointer, and from that control block, uses the agent control block pointer to get to the agent control block which has the ObjectID for the format agent. It can then forward the message to that format agent. These kinds of requests include FileCreate, Delete, PathOpen, VolumeFlush.

2) If the request is directed at a specific access path or an iterator, the message is sent to the ObjectID for that access path or iterator. Associated with that ObjectID is a pointer to the appropriate path control block or iterator control block. The dispatcher gets that pointer, and from that control block, uses the agent control block pointer m get to the agent control block which has the ObjectID for the format agent. It can then forward the message to that format agent. These kinds of requests include Read, Write, and Close for Access Paths, and Iterate for Iterators.

3) If the request involves more than one volume (and therefore may involve more than one volume format and more than one format agent, the message is directed to the file manager object's ObjectID. The dispatcher then breaks the request down into parts which involve only one format agent and sends those messages to the appropriate format agents. For example, a FileCopy request includes a specification of the existing file and the new file to be created. These specifications include the VolumeObjectID's for the volumes involved. From that, the ObjectID for the format agent can be derived (see case 1 above). The dispatcher then sends Read requests to the format agent which owns the existing file, and Write request to the format agent which owns the new file. These kinds of requests include FileCopyRename and FileMoveRename.

4) If the request does not involve any persistent file system structures but instead involves internal file manager dam, the request is sent to the file manager object's ObjectID and the dispatcher is able to resolve the request without forwarding it to any format agent. These kinds of requests include SetCurrentDirectory and GetFileManagerVersion.

Most kinds of requests fall into one of the previous four categories. There are however two requests which are special cases and are handled by special rules, Mount and PathNameResolve. All of these kinds of requests are sent to the file manager object's ObjectID.

5.a) Prior to mounting, the format of the volume is unknown, and therefore the mount request can not be directed at a specific format agent yet. Instead, the dispatcher sends a message to each format agent asking if it can mount that volume. The dispatcher then selects the format agent which says yes and forwards the mount message to it.

5.b) Many implementation of file managers have ways of specifying volumes, directories, or files which are indirect and therefore may not include the VolumeObjectID of the volume on which the entity exists. In one embodiment, this involves providing a partial or relative pathname specification (one which specifies a base entity, and then a route through the file system to get to the target). To resolve this, the dispatcher must parse the partial pathname, and use this information to determine the proper specification for the entity. It may need to send requests to the format agents to determine the parent directories of entities involved in the path and to determine if they are the root directories on the volume.

FIGS. 8a through 8m are flowcharts illustrating the dispatcher processing according to one embodiment of the present invention.

FIG. 8a illustrates the process by which the dispatcher 300 installs a new agent. An agent control block is created with room for private fields (step 8000). The private and public fields of the agent control block are filled in (step 8010). The master semaphore is acquired for exclusive access (step 8020). The agent control block is linked on to the dispatcher's list of agents (step 8030). The master semaphore is then released (step 8040).

FIG. 8b illustrates the request processing procedures performed by the dispatcher 300 according to one embodiment of the present invention. At the start of the routine, the request next in line in the dispatch message port 3010 (FIG. 5a) is retrieved by the dispatcher 300 (step 8101). The request task state structure 3050 (FIG. 5b) is filled in for the request being processed and the flag field for that structure is set to indicate that the structure is busy and a request is currently being processed. At step 8104, a determination is made whether this type of request is one which is sent to a volume object. This test (and succeeding tests 8106, 8108, 8150, 8151, 8152, and 8153) includes an error checking capability (not shown) that also determines if the request was sent to the object of the correct type. If it was not, an appropriate error message is generated. If the request is not of a type sent to a volume object, a determination is made whether the request is of a type sent to a path object (step 8106). If not, a determination is made as to whether the request is of a type sent to an iterator object (step 8108). If not, a determination is made as to whether the request is of a type which is a multiple volume request (FIG. 8c, step 8150). If not, a determination is made as to whether the request is of a type handled by the dispatcher alone (step 8151). If not, a determination is made as to whether the request is a mount request (step 8152). If not, a determination is made as to whether the request is a pathname resolve request (step 8153). If not, the dispatcher replies with an "unknown request" error (step 8154). The dispatcher then loops to C in FIG. 8b, sets the request task state flag to unbusy to indicate that a request is not being processed (step 8100), and gets the next request from the dispatch port (step 8101).

The determinations made at steps 8150, 8151, 8152, and 8153 are based on the content of the messages themselves. These messages are received by the dispatcher 300 at the file manager object FMO 3020.

If the request is of a type sent to a volume object at step 8104, the routine passes to step 8110 in FIG. 8d. In step 8110, the volume control block pointer from the volume object is retrieved. The agent control block pointer is retrieved from the volume control block (step 8111). In step 8112, common preprocessing is performed for the request. Preprocessing involves any operations which can be performed before the message is processed, and which is done the same way regardless of the individual implementation of the volume format, that is independent of the file system format. According to one embodiment, this includes verifying the validity of a few of the fields in the message, filling in the fields in the trailer part of the message structure and mapping any large buffers the caller or interface module provided into the current address space.

In step 8113, the request is forwarded to the appropriate format agent using the ObjectID in the agent control block. This includes setting the forwarded flag in the request task state structure 3050 to indicate that the request has been forwarded. At step 8114, common post processing operations are performed for the requests. Post processing involves any operations which can be performed after the request is processed, and which is done the same way regardless of the individual implementation of the volume format, that is independent of the file system format. This includes cleaning up any mappings which were done in the preprocessing step 8112, posting any events which occurred as a result of successfully processing the message, and collecting statistics about the performance of the file manager.

At step 8115, a determination is made whether the request was successful. If so, the dispatcher generates events appropriate for that request. The event manager which detects and handles these, and other, events is described in the above referenced copending application entitled "Method and Apparatus for Distributing Information About Events in an Operating System". If the request was not successful, the dispatcher sends a reply to the originating interface module using the reply received from the format agent. The routine then loops to C in FIG. 8b.

If the request is of a type sent to a path object at step 8106, the routine passes to step 8120 in FIG. 8e. At step 8120, the volume control block pointer is retrieved from the path object. The agent control block pointer is retrieved from the path control block (step 8122). Steps 8122–8127 are the same as described above at steps 8112–8117 in FIG. 8d and so will not be repeated.

If the request is of a type sent to a iterator object at step 8108, the routine passes to step 8130 in FIG. 8f. The volume control block pointer is retrieved from the iterator object (step 8130) and the agent control block pointer is retrieved from the iterator control block (step 8131). At step 8132, the common preprocessing operations are performed for the request and the request is forwarded to the agent (step 8133) as described above with respect to steps 8112 and 8113, respectfully.

At step 8135, a determination is made whether the iterator needs to be moved to a different volume. If so, the master and the agent control block semaphores are acquired for shared access (step 8136) and the iterator control block is moved to the new volume control block (step 8137). In one embodiment this is accomplished by sending a message first to the format agent which controls the volume to which the iterator was pointing before being moved and then sending a message to the agent which controls the volume to which the iterator is pointing after it is moved. The master semaphore is then released (step 8138) and the request is forwarded at step 8133. If the iterator does not need to be moved at step 8135, the dispatcher performs steps 8139–8142 in FIG. 8g which are the same as steps 8114–8117, respectively, in FIG. 8d.

If the request is a multiple volume request at step 8150, the routine passes to step 8160 in FIG. 8h. The volumes are determined which are affected by the request based on the message received by the dispatcher (step 8160). The pointers to the volume control blocks for those volumes are retrieved (step 8161) and the pointers to the agent control blocks for those volume control blocks are retrieved (step 8162).

At step 8163, a determination is made whether the format agents required to access those volumes are the same. If so, steps 8164–8169 corresponding to steps 8112–8117 are performed.

If the agents are not the same, the process passes to step 8170 in FIG. 8i. The common preprocessing operations are performed at step 8170. A request is constructed for the first volume (step 8171), the request is sent to the format agent for the first volume (step 8172), a request is constructed for the second volume (step 8173) and the request is sent to the format agent for the second volume (step 8174). At step 8175, a determination is made whether the request is complete. If not, the routine loops to step 8171. If the request is complete, steps 8176–8180 corresponding to steps 8165–8169 are performed.

If the request is of a type handled by the dispatcher alone at step 8151, the process passes to step 8181 in FIG. 8j. In particular, for certain requests, the dispatcher has available to it sufficient information to handle the request without receiving a reply from an agent. In this case, the preprocessing operations are performed (step 8181) and a reply is constructed for the message (step 8182). Steps 8183–8186 corresponding to steps 8114–8117 in FIG. 8d are performed.

If the request is a mount request at step 8152, the routine passes to step 8190 in FIG. 8k. The common preprocessing operations are performed at step 8190 and a "can you mount?" message is constructed (step 8191) to be sent to the format agents. At step 8192, the message is sent to the first format agent. At step 8193, a determination is made as to whether the format agent was able to mount the volume. If not, a determination is made as to whether the list of agents changed since the last message was sent (step 8194). This test is to handle the rare situation that may arise if an agent has been removed or added during the time the dispatcher has been processing the request. If the determination at step 8193 is positive, the routine loops back to step 8192 to start the polling again. If not, the routine loops to step 8195 to send the message to the next agent.

If the agent was able to mount the volume at step 8193, the step 8197 is executed. Steps 8197–8201 correspond to steps 8113–8117 in FIG. 8d.

If the request is a resolve pathname request at step 8153, the routine passes to step 8210 in FIG. 8m. The common preprocessing operations are performed at step 8210. In the case of a resolve pathname, an incomplete, partial specification has been received by the dispatcher for the volume being accessed. The dispatcher determines a volume from the partial specification (step 8211). The agent control block is retrieved from the volume control block (step 8212) and the request is forwarded to the agent using the ObjectID in the agent control block (step 8213). At step 8215, a determination is made whether the agent was able to successfully resolve the specification to create a valid specification for that volume. If not the routine loops to step 8211 for processing the next volume in the path which is determined from the specification returned in the reply from the format agent. If the specification was fully resolved by the agent, steps 8215–8218 corresponding to steps 8114–8117 in FIG. 8d are executed.

MESSAGE STRUCTURES

According to one embodiment of the present invention, messages are used to communicate between the Interface modules and the dispatcher and between the dispatcher and the format agents. The messages are created using predefined structures which vary according to the request being processed. One embodiment of the definition for the structures is provided in Appendix A ("FSRequests.h"). Additionally, a few of the structures will be discussed below. Appendix B ("FSTypes.h") contains the definitions of constants and types used in the message structures described in Appendix A.

Definitions

The following description provides definitions for some of the objects and concepts used in the message structures. These definitions are provided for exemplary purposes and may be changed within the skill of the ordinary artisan once in possession of the present disclosure.

FSSpecification is a specification of a specific volume, file, or directory. A FSSpecification contains a volume ID, a directory ID, and a name. With one exception, all file manager requests which need a volume, file, or directory specified make a reference to a FSSpecification in exactly this form (no pathnames). The one exception is the ResolvePathname request which accepts a specification for processing which does not conform to the validity requirements of FSSpecification.

FSIterator is a mechanism for iterating over objects, and in particular, over volumes, files, and directories. A FSIterator is a construct which can be positioned at any volume, file, or directory; and then repositioned at the parent, next sibling, previous sibling, first child, next child of the object to which it currently refers. FSIterators also contain a FSSpecification for the object they currently reference, and can be passed to any call which requires one.

While a FSIterator can be used as a more elaborate FS Specification where the pointer FSIterator is used to describe the FSSpecification structure, its real value comes from the fact that it can be moved around a file system based on the relationships between the entities to which it points. In its simplest form, it can be moved to the first and/or last entity in the file system which has some relationship with the entity to which it currently points. Thus, given a FSIterator which points at some directory, it can be moved to point at the first/last file or directory which has the current directory as its parent. Likewise, a FSIterator can be moved to point at the next or previous entity which has the same relationship with some other entity. Thus, given a FSIterator which points at some file or directory, it can be moved to point at the next/previous file or directory which has the same parent directory.

While moving a FSIterator step by step through a file system is often quite useful, the more powerful FSIterator calls can be used to move it through a pattern of moves with a single call, collecting information (in the form of attributes) from each entity it passes through in the process. Thus, with a single call, a FSIterator can be used to collect attributes from every file which has the same parent directory.

Identity is the subject of file manager privileges. An identity can either be an individual, or a set of individuals and other sets. Identities can be given permission to perform specific actions on specific files and directories.

Privileges specify what an identity can do to a file or a directory. Every file and directory has a list of identities and the privileges associated with those identities. PrivilegeIterator is mechanism for iterating over identity/privilege pairs for a file or directory. Every volume, directory and file has a list associated with it which defines what requests on that volume, directory or file are allowed to be performed on behalf of particular identifies. These access control lists define the privileges which have been granted to the identities for the file system.

The API assumes the caller is always getting and setting attribute values in groups, several attributes at a time; getting and setting a single attribute is just a degenerate case. Whenever the caller is required to identify a group of attributes to get or set, they are asked to provide a BufferDescriptor (to hold the data); and a pointer to an array of FSAttributeDescriptors that specifies both the attributes to be transferred, and the locations in the given buffer where the data is or will be stored.

When the caller opens an access path using the standard stream I/O access method, it is asked to provide an AccessConstraint structure that describes what kinds of operations will be performed with the created access path, and what kinds of operations are allowed to be performed by other access paths while the new one remains open. Other access methods may use this or equivalent structures, or sometimes the access constraints are implied by the access method itself.

Requests

This section describes all of the requests according to one embodiment of the present invention. According to one embodiment, all of these requests have synchronous and asynchronous forms.

File System Entity Requests

The following requests are used to manipulate entities that can be identified by FSSpecifications: files, directories, and volumes. FileCreate creates a new file, and DirectoryCreate creates a new directory. AttributesGet, AttributesSet, and AttributesGetSize are used to manipulate attributes that have been associated with files, directories and volumes. FileFlush is used to force all information about a file that has been buffered in memory to be written out to the volume on which it resides. This includes all meta information such as its attributes, storage allocation, and the like. TestEntity takes a FSSpecification and a FSSearchCriteria and returns a boolean indication of whether or not the thing referred to by the specification meets the criteria. EntityType just returns what kind of thing is referred to by a FSSpecification (file, directory, or volume) as well as some flags to indicate if the thing has some special significant to the system.

Volume Requests

The following requests are used to manipulate volumes. VolumeMount is the usual request to mount a volume that is on a known device. Volumes that were previously mounted may also be mounted again using the VolumeRemount request. To use VolumeRemount, the caller must have previously called VolumeGetRemountData to collect the information necessary to do the remount, and VolumeGetRemountSize is used to find the size of the data which VolumeGetRemountData will return. VolumeRemount is particularly useful since it makes to assumptions about the relationship of the volume to a device.

Volumes are usually unmounted using the VolumeUnmount request that eliminates all knowledge of the volume from the file manager. VolumeEject is similar, but it also causes the device to be ejected from the system as well. VolumeOffiine is slightly different in that the file manager remembers the existence of the volume (files on it may stay open, etc.); but the file manager prepares for the volume to be unavailable for a period of time. When an off-line volume is accessed, the file manager attempts to make the volume available again.

VolumeFlush is used to force all meta information (directory structures, etc.) about a volume that has been buffered in memory to be written out to the device on which it resides. VolumeCreate is used to initialize a device with an empty volume. VolumeGetCapability is used to find out what requests a particular volume can support.

Fork Requests

The following requests are used to manipulate forks in files. ForkCreate is used to add a fork to a file, and ForkDelete is used to remove a fork. ForkAttributesGet, ForkAttributesSet, and ForkAttfibutesGetSize are used to manipulate attributes that have been associated with forks. Lastly, ForkFlush can be used to force all information from the fork that has been buffered in memory to be written out to the volume on which it resides.

File System Iterator Requests

The following requests are used to manipulate file system iterators so as to find and collect information on the files, directories, and volumes in the file system. FSIteratorCreate is used to create an iterator, and FSIteratorDispose is used to dispose of one. Iterate is used to move the FSIterator around the file system one step at a time. Search is used to move the FSIterator through a pattern of steps looking for files, directories, or volumes that match a given criteria. AttributesGetBulk is used to move the FSIterator through a pattern of steps, collecting the values of a set of attribute for each file, directory, or volume it moves across. AttfibutesGetBulkFiltered is similar, but it only collects the attribute values from those entries that match a given criteria.

Stream Access Method Requests

The following requests are used to open, close and use access paths for the standard stream I/O access method. PathOpen is used to open the access path, and PathClose is used to close it. PathRead and PathWrite are used to read and write parts of the forks data.

Each access paths opened using the stream I/O access method includes in its state a current position in the fork. ForkPositionDescriptors can then be made relative to that location. This current position is implicitly set by PathRead and PathWrite to the end of the section read or written, or it can be explicitly set using the PathSetPosition call. The current value of this position can be obtained by using the PathGetPosition call.

The caller may also lock ranges in any fork that they have open using the stream I/O access method. Ranges may either be locked for exclusive access (which prevents any overlapping range from being locked), or for shared access (which only prevents overlapping ranges from being locked for exclusive access). The PathLockRange is used to lock the range, and PathUnlockRange is used to unlock it.

The last few requests am used to manipulate the storage allocated to the fork. PathGetEOF returns the current length of the fork in bytes, and PathSetEOF sets the length. Any storage allocated to the fork past the EOF is eligible for release and reuse as soon as all access paths to that fork are closed. PathAllocate is used to allocated storage to the fork, and PathRelease is used to deallocate storage. Both of these requests take ranges for arguments, and on file systems that support sparse allocation, can be used to form noncontiguous allocations. PathWrite will also cause storage to be allocated to the fork if the write is into unallocated areas, and storage can become released when all access paths to that fork are closed as described above.

Backing Store Access Method Requests

The following requests are used to manipulate access paths for the memory mapped file access method. BackingStoreCreate is used to open the access path, and BackingStoreDispose is used to close it. There are no requests to use memory mapped access path because they are manipulated by reading and writing memory, and by requests to the operating system kernel memory manager.

File Class Requests

The following requests are used to manipulate file class information for a volume. FileClassAttributesGet, FileClassAttributesSet, and FileClassAttributesGetSize are used to access the attributes that have been associated with a file class. FileClassIteratorCreate is used to create an iterator that can be moved through all of the file classes that are known to a volume, and FileClassIteratorDispose is used to dispose of such an iterator. FileClassIterate is used to actually move the iterator through the list of file classes known to the volume.

Privilege Requests

The following requests are used to manipulate the privileges associated with files, directories, and volumes in the file system. PrivilegeGet is a basic request that, given an identity, returns what privileges that identity has with respect to a given file, directory or volume. PrivilegeGet does not evaluate groups to see if the given identity is a member of a group identity that may have different privileges. PrivilegeGetNative is used to get a volume format dependent representation of the access control list for a particular file, directory or volume; and PrivilegeSetNative is used to apply that data to a different file, directory or volume.

PrivilegeIteratorCreate is used to create an iterator that can be moved through the access control list for a particular file, directory, or volume; and PrivilegeIteratorDispose disposes of the iterator. PrivilegesIterate is used to move the iterator through the access control list one step at a time, while PrivilegeSearch is used to move the iterator through the list looking for an entry that matches a particular identity. Given an iterator, PrivilegeAdd inserts a new entry in the access control list, PrivilegeDelete deletes an entry, and PrivilegeChange changes the current entry.

Miscellaneous Requests

The following requests are used to perform other miscellaneous actions on the file manager. GetFileSystemVersion returns the version number of the file manager that is running on the system. PathnameResolve takes a relative pathname and resolved it into a canonical FSSpecification. FSDelete deletes a file or directory. FSMoveRename changes the parent directory and name of a file or directory. FSCopyRename makes a copy of a file and optionally renames it in the process.

ADVANTAGES

The end user should see at least two major benefits from the file manager according to the present invention. First, they should see an improvement in perceived performance of the total system. Concurrency should improve the throughput of the file manager, particularly for those applications which take advantage of it; and background processes which call the file manager should have less impact on foreground performance.

Second, the overall system should be more robust. The file manager according to the present invention takes advantage of the messaging system to protect its data structures and to provide better isolation between its application and itself. In addition, there are architectural features provided to eliminate the current need for foreign fie systems and other code to do certain dangerous things to provide their functionality.

According to one embodiment, a new interface is provided to the file manager which uses messages to make file manager requests. This interface is advantageous in two ways: first, it uses messaging rather than traps; and second, the structure of the requests bear no resemblance to the prior art parameter blocks. A message protocol is defined according to the present invention which is used to communicate with the file manager. A shared library is provided of functions which will format and send these messages and handle the replies. The message interface is a service which will be used internally by the file manager according to the present invention and by other file manager related pieces of system software. In particular, the file manager according to the present invention will use this same interface to communicate with format agents which implement specific disk file system formats/server protocols.

According to one embodiment of the file manager, it can run in native mode on Power PC machines. According to this embodiment, the file manager contains almost no assembly language code, and makes no assumptions that it is running on a non-RISC processor. The code can be made byte-order independent.

Most of the internal interfaces/structures for which access is being removed according to one embodiment of the file manager, are inherently dangerous. Accordingly, one of the advantages of the file manager according to the present invention is that it replaces these interfaces with much safer interfaces for developers to use. Thus, the file manager according to the present invention is not reducing the available functionality of the system, but rather it is providing redesigned interfaces which can be used more safely and with less impact on other running software.

The file manager according to the present invention is built around a file system model which was designed to provide a rich abstract model which could be used to interface with a number of different file systems (present and future) and provide access to as much functionality from each of these file systems as is reasonably possible.

The file manager according to one embodiment of the present invention provides concurrency. Many of the known file managers can only process one file system request at a time. A file system request is a request to access data related to a file system. This usually requires accessing data on a storage media which is organized according to a particular volume format. Any other requests which are submitted while a previous request is being processed are queued and processed later, one at a time. This is particularly troublesome when the request they are waiting behind is for a slow media.

This approach was reasonable in earlier computer systems when only one application was run at a time and file manager requests were generally only made by the single foreground application. However, on many computers today there are many services such as applications and initialization routines running at the same time and many of these services issue file manager requests in the background. The complexity increases with the advent of a messaging system such as NuKERNEL™ which allows several tasks within the foreground application to submit file manager requests in parallel.

For these reasons, the file manager according to the present invention supports the concurrent processing of more than one request at a time. To accomplish this support the code is completely re-entrant and take advantage of multitasking.

The prior art file managers were designed to handle the relatively simple needs of early generation personal computers. However, the marketplace has changed considerably since then and it is difficult to implement certain features which are important now, but which were only of passing interest then. Disk drives are much larger, mounting competing file systems is more important, networking is critical, and the prior art APIs are cluttered and complex.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

Attorney Docket No. P1305:064

APPENDIX A

"FSRequests.h", May 1994

```
 1   /*
 2       File:       FSRequests.h
 3
 4       Contains:   Contains defintions for all request structures which
 5                   are part of the File Manager Request Interface
 6
 7       Copyright:  © 1992-1994 by Apple Computer, Inc., all rights reserved.
 8
 9   */
10
11   #ifndef __FSREQUESTS__
12   #define __FSREQUESTS__
13
14   #ifndef __FSTYPES__
15   #include <FSTypes.h>
16   #endif
17
18   #ifndef __FSREQUESTPRIV__
19   #include <FSRequestPriv.h>
20   #endif
21
22   /*--------------------------------------------------------------------*/
23   /* CONSTANTS:                                                         */
24   /*--------------------------------------------------------------------*/
25
26   /*
27    * FSRequestAttributes are used to specify variations
28    * or other attributes of requests. These values should be OR'ed
29    * into the prmCommandID field in the request's header.
30    */
31   enum {
32       kFRAAsynchronous            = 0x40000000,   // an asynchronous request
33                                                   // Applies to all requests
34
35       kFRAPathOpen_LoadMap        = 0x01000000,   // preload and lock in memory
36                                                   // all data for file to volume
37                                                   // block mapping.
38                                                   // Applies to kPathOpen requests,
39
40       kFSRequestVariantMask       = 0x00ffffff    // used to clear off the above bits.
41   };
42
43   /*
44    * The Message type(s) to use when sending a FileSystem request
45    */
46   enum {
47       kUserFSRequest              = 0x00000001    // requests from sources external to the filesystem
48   };
49
50
```

```
   /*
    * The actual list of request which can be made.
    */
   enum {
51     kPathOpen                      = 0x0001,
52     kPathClose                     = 0x0002,
53     kPathRead                      = 0x0011,
54     kPathWrite                     = 0x0012,
55     kPathLockRange                 = 0x0013,
56     kPathUnlockRange               = 0x0014,
57     kPathGetPosition               = 0x0015,
58     kPathSetPosition               = 0x0016,
59     kPathGetEOF                    = 0x0017,
60     kPathSetEOF                    = 0x0018,
61     kPathAllocate                  = 0x0019,
62     kPathRelease                   = 0x001A,
63     
64     kForkCreate                    = 0x0101,
65     kForkDelete                    = 0x0102,
66     kForkAttributesGet             = 0x0105,
67     kForkAttributesSet             = 0x0106,
68     kForkAttributesGetSize         = 0x0107,
69     kForkFlush                     = 0x0108,
70     
71     kFileCreate                    = 0x0201,
72     kDirectoryCreate               = 0x0202,
73     
74     kAttributesGet                 = 0x0305,
75     kAttributesSet                 = 0x0306,
76     kAttributesGetSize             = 0x0307,
77     kFileFlush                     = 0x0308,
78     kTestEntity                    = 0x0311,
79     kEntityType                    = 0x0312,
80     
81     kVolumeMount                   = 0x0401,
82     kVolumeUnmount                 = 0x0402,
83     kVolumeFlush                   = 0x0408,
84     kVolumeCreate                  = 0x0411,
85     kVolumeGetCapability           = 0x0412,
86     kVolumeEject                   = 0x0413,
87     kVolumeOffline                 = 0x0414,
88     kVolumeGetRemountSize          = 0x0415,
89     kVolumeGetRemountData          = 0x0416,
90     kVolumeRemount                 = 0x0417,
91     
92     kFileClassIteratorCreate       = 0x0501,
93     kFileClassIteratorDispose      = 0x0502,
94     kFileClassAttributesGet        = 0x0505,
95     kFileClassAttributesSet        = 0x0506,
```

```
101    kFileClassAttributesGetSize    = 0x0507,
102    kFileClassIterate              = 0x0509,
103
104    kFSIteratorCreate              = 0x0601,
105    kFSIteratorDispose             = 0x0602,
106    kIterate                       = 0x0609,
107    kSearch                        = 0x060A,
108    kAttributesGetBulk             = 0x0611,
109    kAttributesGetBulkFiltered     = 0x0612,
110
111    kPermissionIteratorCreate      = 0x0701,
112    kPermissionIteratorDispose     = 0x0702,
113    kPermissionsIterate            = 0x0709,
114    kPermissionSearch              = 0x070A,
115    kPermissionAdd                 = 0x0711,
116    kPermissionDelete              = 0x0712,
117    kPermissionChange              = 0x0713,
118    kPermissionGet                 = 0x0714,
119    kPermissionGetNative           = 0x0715,
120    kPermissionSetNative           = 0x0716,
121
122    kFSNotificationQueueCreate     = 0x0801,
123    kFSNotificationQueueDispose    = 0x0802,
124    kFSNotificationSubscribe       = 0x0811,
125    kFSNotificationUnsubscribe     = 0x0812,
126    kFSNotificationGetEvent        = 0x0813,
127
128    kExtendedVolumeMount           = 0x0901,
129    kExtendedVolumeUnmount         = 0x0902,
130    kExtendedVolumeRequest         = 0x090A,
131    kExtendedRequest               = 0x090B,
132    kExtendedPathOpen              = 0x0911,
133    kExtendedPathClose             = 0x0912,
134    kExtendedPathRequest           = 0x091A,
135
136    kBackingStoreCreate            = 0x0A01,
137    kBackingStoreDispose           = 0x0A02,
138
139    kFSDelete                      = 0x0F02,
140    kFSExchange                    = 0x0F11,
141    kFSMoveRename                  = 0x0F12,
142    kFSCopyRename                  = 0x0F13,
143    kDirectoryGetCurrent           = 0x0F14,
144    kDirectorySetCurrent           = 0x0F15,
145    kFileGetIDFromFSSpec           = 0x0F16,
146    kFileGetFSSpecFromID           = 0x0F17,
147    kPathnameResolve               = 0x0F18,
148
149    kGetFilesystemVersion          = 0x0FFF
150    };
```

```
151  typedef uint32 RequestCode;
152
153  #define kMaxRequestCode        (kGetFilesystemVersion)
154
155  /*----------------------------------------------------------------------
156  /* TYPES:
157  /*----------------------------------------------------------------------*/
158
159  /*
160   * Request Header
161   * The first 16 bytes of all File Manager Requests are taken up with the
162   * request header and have the same structure:
163   *
164   * The first 4 bytes are a message header which defines the version of the
165   * message structure used (essentially what these paragraphs describe); and
166   * the length of the entire message.
167   *
168   * The next 4 bytes are a header for the request specific parameter list which
169   * defines the version of the parameter list (the part of the message format
170   * which is different for each request) and the length of that list. The length
171   * is specified by the prmEnd field which gives the offset from the top of the
172   * message to the end of the parameter list (which is also the start of the
173   * Trailer structure).
174   *
175   * The third longword in the request header is the command ID for the request
176   * which indicates what the user wants to do and defines the structure of the
177   * following parameter list. The upper 8 bits of the CommandID are reserved
178   * for flags and variant indicators.
179   *
180   * The fourth longword is a pointer to a ProgressReport structure. If this value
181   * is not nil, the File Manager used the indicated ProgressReport to indicate
182   * its progress completing the request.
183   *
184   * The fifth longword is reserved for use by the File Manager. It essentially
185   * serves as a 'unique' identifier for the specific request within the system.
186   *
187   * Request Parameters
188   * The middle of each File Manager Request structure is taken up by the actual
189   * parameters for the request This list is different for each kind of request.
190   *
191   * Request Trailer
192   * At the end of every File Manager Requests is the Request Trailer which
193   * has the same format for every request. It consists of 16 bytes which are
194   * reserved for use by the File Manager, followed by a variable length array
195   * of bytes where all of the variable length parameters for the request are
196   * stored.
197   */
198
199  enum {
200      kRequestVersion           = 0x01,
```

```
201     kParameterVersion          = 0x01
202   );
203   /*
204    * The standard Request Header
205    */
206   typedef struct {
207       // the message header
208       uint8       msgReserved;        // reserved byte for message, MUST BE 0
209       uint8       msgVersion;         // format of the Header and Trailer structs
210       uint16      msgLength;          // total length of the message
211
212       // the parameter list header
213       uint8       prmReserved;        // reserved byte for parameters, MUST BE 0
214       uint8       prmVersion;         // format of the Parameters for this request
215       uint16      prmEnd;             // offset from the beginning of the MESSAGE
216                                       //   to the end of the parameter list
217       RequestCode prmCommandID;       // the command ID of the request
218   //* cannot be a pointer in multi-address space world
219       ProgressReportPtr prmProgress;  // if non-nil, how to report progress on request
220   //*
221       uint32      prmRequestID;       // reserved for internal use, MUST BE SET TO 0
222   } FSRequestHeader, *FSRequestHeaderPtr;
223
224   /*
225    * FSRequestPrivate is the private data in a request structure which is
226    * used by the File Manager to complete requests. All of these fields
227    * MUST BE SET TO 0 by the normal user.
228    */
229   typedef struct {
230       void*       privReserved1;
231       void*       privReserved2;
232       void*       privReserved3;
233       void*       privReserved4;
234       void*       privReserved5;
235       void*       privReserved6;
236       void*       privReserved7;
237   } FSRequestPrivate, *FSRequestPrivatePtr;
238
239   /*
240    * The standard Request Trailer
241    */
242   typedef struct {
243       FSRequestPrivate    msgPrivate;  // the private reserved space in the request
244   } FSRequestTrailer, *FSRequestTrailerPtr;
245
246   /*------------------------------------------------------------------*/
247   /* REQUESTS:                                                        */
248   /*------------------------------------------------------------------*/
```

```
251  /*
252   *  Some of our requests are variable length. The data in variable portion of
253   *  the message buffer is refered to by an input field in the static portion.
254   *  The input field contains an offset from the beginning of the variable portion
255   *  of the message buffer (i.e. the first datum in the variable portion has an
256   *  offset of 0. The macro M_VaribleDataPtr is used to compute a pointer to
257   *  a specific variable datum (the computed pointer is a Ref, so it needs to be
258   *  cast to the appropriate type.
259   */
260
261
262  /*------------------------------------------------------------------------
263   * Basic IO (Path Based Functions)
264   */
265
266  /*
267   * FSReqPathOpen opens a new Access Path to the specified Fork of the
268   * specified File, and return the RefNum of the Path. The Path will be
269   * constructed to have the indicated access rights.
270   */
271  typedef struct FSReqPathOpen {
272      FSRequestHeader    header;   // header.prmCommandID = kPathOpen
273      // the target & output
274      struct {
275          PathObjID           thePath;
276                              theReply;
277      }
278      // the outputs
279      // the inputs
280      FSSpecification    theFile;
281      ForkNum            theFork;
282      IOPermission       thePermissions;
283      //
284      FSRequestTrailer   trailer;
285  } FSReqPathOpen, *FSReqPathOpenPtr;
286
287  /*
288   * FSReqPathClose closes the given Access Path.
289   */
290  typedef struct FSReqPathClose {
291      FSRequestHeader    header;   // header.prmCommandID = kPathClose
292      // the target
293      PathObjID          thePath;
294      // the outputs
295      // the inputs
296      //
297      FSRequestTrailer   trailer;
298  } FSReqPathClose, *FSReqPathClosePtr;
299
300
```

```
301  /*
302   * FSReqPathRead reads data from a Fork into the supplied buffer. The number of
303   * bytes requested is indicated by the buffer description, and the number of
304   * bytes actually read is returned. The argument newPosition is filled in with
305   * the position in the Fork following the last byte read.
306   */
307  typedef struct FSReqPathRead {
308      FSRequestHeader         header;      // header.prmCommandID = kPathRead
309      // the target
310      PathObjID               thePath;
311      // the outputs
312      struct {
313          uint32              actualLength;
314          ForkPositionDescriptor newPosition;
315      }                       theReply;
316      BufferDescriptor        theBuffer;   // filled in with InterspaceBlockCopy and/or DMA from device
317      // the inputs
318      ForkPositionDescriptor  thePosition;
319      IOOptions               theOptions;
320      //
321      FSRequestTrailer        trailer;
322  } FSReqPathRead, *FSReqPathReadPtr;
323
324  /*
325   * FSReqPathWrite writes data to a Fork from the supplied buffer. The number of
326   * bytes requested is indicated by the buffer description, and the number of
327   * bytes actually written is returned. The argument newPosition is filled in
328   * with the position in the Fork following the last byte written.
329   */
330  typedef struct FSReqPathWrite {
331      FSRequestHeader         header;      // header.prmCommandID = kPathWrite
332      // the target
333      PathObjID               thePath;
334      // the outputs
335      struct {
336          uint32              actualLength;
337          ForkPositionDescriptor newPosition;
338      }                       theReply;
339      // the inputs
340      BufferDescriptor        theBuffer;   // moved with InterspaceBlockCopy and/or DMA to device
341      ForkPositionDescriptor  thePosition;
342      IOOptions               theOptions;
343      //
344      //
345      FSRequestTrailer        trailer;
346  } FSReqPathWrite, *FSReqPathWritePtr;
347
348  /*
349   * FSReqPathLockRange locks the range of bytes starting at the given position
350
```

```
351    * and running for the specified length. It fills in actualStart with the position
352    * at which the locked range starts.
353    */
354   typedef struct FSReqPathLockRange {
355     FSRequestHeader           header; // header.prmCommandID = kPathLockRange
356     // the target
357     PathObjID                 thePath;
358     // the outputs
359     struct {
360       ForkPositionDescriptor  theReply;
361     }
362     // the inputs
363     ForkPositionDescriptor    thePosition;
364     int64                     theLength;
365     uint32                    options;
366     //
367     FSRequestTrailer          trailer;
368   } FSReqPathLockRange, *FSReqPathLockRangePtr;
369
370   /*
371    * FSReqPathUnlockRange unlocks the range of bytes starting at the given position
372    * and running for the specified length.
373    */
374   typedef struct FSReqPathUnlockRange {
375     FSRequestHeader           header; // header.prmCommandID = kPathUnlockRange
376     // the target
377     PathObjID                 thePath;
378     // the inputs
379     ForkPositionDescriptor    thePosition;
380     int64                     theLength;
381     uint32                    options;
382     //
383     FSRequestTrailer          trailer;
384   } FSReqPathUnlockRange, *FSReqPathUnlockRangePtr;
385
386   /*
387    * FSReqPathGetPosition gets the current position of the Path in its Fork.
388    */
389   typedef struct FSReqPathGetPosition {
390     FSRequestHeader           header; // header.prmCommandID = kPathGetPosition
391     // the target
392     PathObjID                 thePath;
393     // the outputs
394     struct {
395       ForkPositionDescriptor  currentPosition;
396     }
397     // the inputs
```

```
401  //
402  FSRequestTrailer                    trailer;
403  } FSReqPathGetPosition, *FSReqPathGetPositionPtr;
404
405
406  /*
407   * FSReqPathSetPosition sets the current position of the Path in its Fork.
408   */
409
410  typedef struct FSReqPathSetPosition {
411    FSRequestHeader                   header;  // header.prmCommandID = kPathSetPosition
412    // the target
413    PathObjID                         thePath;
414    // the outputs
415    struct {
416      ForkPositionDescriptor          actualPosition;
417    } theReply;
418    // the inputs
419    ForkPositionDescriptor            newPosition;         // New position relative to start of file
420    //
421    FSRequestTrailer                  trailer;
422  } FSReqPathSetPosition, *FSReqPathSetPositionPtr;
423
424
425  /*
426   * FSReqPathGetEOF gets the logical length of the Fork.
427   */
428  typedef struct FSReqPathGetEOF {
429    FSRequestHeader                   header;  // header.prmCommandID = kPathGetEOF
430    // the target
431    PathObjID                         thePath;
432    // the outputs
433    struct {
434      ForkPositionDescriptor          theEOF;
435    } theReply;
436    //
437    // the inputs
438    //
439    FSRequestTrailer                  trailer;
440  } FSReqPathGetEOF, *FSReqPathGetEOFPtr;
441
442  /*
443   * FSReqPathSetEOF sets the logical length of the Fork. If the new length is longer
444   * than the old one, the new disk storage is allocated according to theMode.
445   */
446  typedef struct FSReqPathSetEOF {
447    FSRequestHeader                   header;  // header.prmCommandID = kPathSetEOF
448    // the target
449    PathObjID                         thePath;
450    // the outputs
```

```
451     // the inputs
452     ForkPositionDescriptor      theEOF;
453     AllocationMode              theMode;
454     uint16                      filler1;    //** because AllocationMode is a uint16
455     //
456     FSRequestTrailer            trailer;
457   } FSReqPathSetEOF, *FSReqPathSetEOFPtr;
458
459
460   /*
461    * FSReqPathAllocate Allocates storage for the Fork access by thePath starting at
462    * theStart and running for at least theLength bytes. The storage is allocated based
463    * on the given allocation mode. This call does not changes the end of the fork, even
464    * if the space allocated in beyond the current end. However any excess storage beyond
465    * the end of the fork is automatically released when the last path on the fork is
466    * closed. The user may also manually release excess storage using the PathRelease request.
467    */
468   typedef struct FSReqPathAllocate {
469     FSRequestHeader             header;     // header.prmCommandID = kPathAllocate
470     // the target
471     PathObjID                   thePath;
472     // the outputs
473     struct {
474         int64                   actualLength;   // actually amount of storage allocated
475     }                           theReply;
476     // the inputs
477     ForkPositionDescriptor      theStart;
478     int64                       theLength;
479     AllocationMode              theMode;
480     uint16                      filler1;    //** because AllocationMode is a uint16
481     //
482     FSRequestTrailer            trailer;
483   } FSReqPathAllocate, *FSReqPathAllocatePtr;
484
485   /*
486    * FSReqPathRelease allows the system to releases storage allocated to the given
487    * range of a fork. This is only an advisory call, the system may on fact release
488    * less, or even no storage, depending on the actually allocation structure. Note
489    * that while this call is in some respects an inverse of the PathAllocate request,
490    * the two are NOT symetrical. PathAllocate will tend to round allocation up (if they
491    * are not aligned on convenient boundaries), while PathRelease will tend to round
492    * things down under the same circumstances. Therefore it is advisable that
493    * PathRelease requests NOT be made piecemeal, always release the largest range
494    * possible, even if you have already released parts of it on previous calls.
495    */
496   typedef struct FSReqPathRelease {
497     FSRequestHeader             header;     // header.prmCommandID = kPathRelease
498     // the target
499     PathObjID                   thePath;
500     // the outputs
```

```
501        // the inputs
502        ForkPositionDescriptor        theStart;
503        int64                         theLength;
504        //
505        //                            trailer;
506        FSRequestTrailer
507    } FSReqPathRelease, *FSReqPathReleasePtr;
508
509    /*------------------------------------------------------------
510     * Cache Manipulation
511     */
512
513    /*
514     * FSReqForkFlush writes out any cache entries associated with the given
515     * Path's Fork. This include block which contain Filesystem structural
516     * information about the fork (Catalog and Extent Blocks, etc).
517     */
518    typedef struct FSReqForkFlush {
519        FSRequestHeader               header; // header.prmCommandID = kForkFlush
520        // the target
521        PathObjID                     thePath;
522        // the outputs
523        // the inputs
524        //
525        FSRequestTrailer              trailer;
526    } FSReqForkFlush, *FSReqForkFlushPtr;
527
528    /*
529     * FSReqFileFlush writes out any cache entries associated with the given File.
530     */
531    typedef struct FSReqFileFlush {
532        FSRequestHeader               header; // header.prmCommandID = kFileFlush
533        // the target
534        FSSpecification               theFile;
535        // the outputs
536        // the inputs
537        //
538        FSRequestTrailer              trailer;
539    } FSReqFileFlush, *FSReqFileFlushPtr;
540
541    /*
542     * FSReqVolumeFlush writes out any cache entries associated with the given Volume.
543     */
544    typedef struct FSReqVolumeFlush {
545        FSRequestHeader               header; // header.prmCommandID = kVolumeFlush
546        // the target
547        FSSpecification               theVolume;
548        // the outputs
549        // the inputs
550
```

```
551     //
552     FSRequestTrailer               trailer;
553   } FSReqVolumeFlush, *FSReqVolumeFlushPtr;
554
555
556   #if 0           //** kFSCacheAdvise is not defined, is this still a request?
557   /*
558    * FSReqCacheAdvise performs the specified operation on any cache entries
559    * which are associated with the portion of the Fork indicated by the given
560    * range.
561    */
562   typedef struct FSReqCacheAdvise {
563     FSRequestHeader                header;  // header.prmCommandID = kFSCacheAdvise
564     // the target
565     PathObjID                      thePath;
566     // the outputs
567     // the inputs
568     ForkPositionDescriptor         thePosition;
569     int64                          theLength;
570     CacheOperation                 theOperation;
571     uint16                         filler1;     //** CacheOperation is a uint16
572     //
573     FSRequestTrailer               trailer;
574   } FSReqCacheAdvise, *FSReqCacheAdvisePtr;
575   #endif
576
577   /*-------------------------------------------------------------
578    * Filesystem Browsing
579    */
580
581   /*
582    * FSReqIteratorCreate initializes theIterator. If theSymbolicEntity is equal to
583    * one of the 'absolute' iteration operations, theIterator will be created such
584    * that it points to the symbolic entity. For symbolic entities which can reside
585    * on any volume, the volume object ID in theEntity is used if provided,
586    * otherwise the boot volume's object ID is used. For symbolic entities which
587    * only occur once in a system (e.g. kFSIterFontsFolder), theEntity is ignored.
588    * When theSymbolicEntity is NULL, theIterator will be created when both
589    * points to theEntity. E_MissingParameter is returned when
590    * theSymbolicEntity and theEntity are NULL. E_ParamErr is returned when
591    * theSymbolicEntity is neither NULL nor an 'absolute' iteration operation.
592    */
593   typedef struct FSReqIteratorCreate {
594     FSRequestHeader                header;  // header.prmCommandID = kFSIteratorCreate
595     // the target & output
596     struct {
597       FSIterator                   theIterator;
598     } theReply;
599   }
600   // the outputs
```

```
601        // the inputs
602        FSSpecification        theEntity;
603        FSIterationOperation   theSymbolicEntity;
604        uint16                 filler1;         //** FSIterationOperation is a uint16
605        //
606        } FSRequestTrailer      trailer;
607        } FSReqIteratorCreate, *FSReqIteratorCreatePtr;
608
609
610   /*
611    * FSReqIteratorDispose disposes of any internal storage associated with
612    * the given FSIterator.
613    */
614   typedef struct FSReqIteratorDispose {
615        FSRequestHeader        header;   // header.prmCommandID = kFSIteratorDispose
616        // the target
617        FSIterator             theIterator;
618        // the outputs
619        //
620        // the inputs
621        //
622        FSRequestTrailer       trailer;
623        } FSReqIteratorDispose, *FSReqIteratorDisposePtr;
624
625   /*
626    * FSReqIterate moves from oldPosition according to operation.
627    *
628    * When the new position is valid, newPosition is set to the new entity;
629    * otherwise, oldPosition is copied to newPosition. NewPosition can point at the
630    * same iterator passed as oldPosition.
631    */
632   typedef struct FSReqIterate {
633        FSRequestHeader        header;   // header.prmCommandID = kIterate
634        // the target
635        FSIterator             oldPosition;
636        // the outputs
637        struct {
638             FSIterator        newPosition;
639             } theReply;
640        // the inputs
641        FSIterationOperation   operation;
642        uint16                 filler1;         //** FSIterationOperation is a uint16
643        //
644        FSRequestTrailer       trailer;
645        } FSReqIterate, *FSReqIteratePtr;
646
647   /*
648    *
649    * FSReqSearch, starting at oldPosition searches for the next entity
650    * which matches the given criteria. The exact route throught the
```

```
651   * filesystem (and spoce of that route) is defined by the operation
652   * parameter. The enity refered to by oldPosition is included in the
653   * search unless the operation is kFSIterContinue, in which case it is
654   * skipped (and the route is specified by the previous call with the
655   * same iterator). Absolute operations are meaningless do to the iterative
656   * nature of search, so an error is returned.
657   *
658   * When the new position is valid (i.e. a match), newPosition is set to the new
659   * entity; otherwise, oldPosition is copied to newPosition. NewPosition can
660   * point at the same iterator passed as oldPosition.
661   */
662   typedef struct FSReqSearch {
663       FSRequestHeader         header;  // header.prmCommandID = kSearch
664       // the target
665       FSIterator              oldPosition;
666       // the outputs
667       struct {
668           FSIterator          newPosition;
669       }                       theReply;
670       // the inputs
671       FSSearchCriteriaPtr     criteria;       // actually an offset into variable portion of message buffer
672       FSIterationOperation    operation;
673       uint16                  filler1;        //.. FSIterationOperation is a uint16
674       //
675       FSRequestTrailer        trailer;
676   } FSReqSearch, *FSReqSearchPtr;
677
678
679   /*
680    * FSReqAttributesGet gets a list of attributes of a Filesystem entity.
681    * The field theAttributes is a pointer to a nul terminated array of
682    * FSAttributeDescriptor's. The values of each listed attribute are
683    * copied into the buffer as indicated by the FSAttributeDescriptor
684    * If a value is longer than the give length, a leading subset of the
685    * value is copied and an error is flagged. If the value is sorter,
686    * it is 0-padded at the end and a different error is logged. Locations
687    * in the buffer intented for Attributes which do not exist are left
688    * unchanged by the operation, but an appropriate error is logged.
689    */
690
691   typedef struct FSReqAttributesGet {
692       FSRequestHeader         header;  // header.prmCommandID = kAttributesGet
693       // the target
694       FSSpecification         theEntity;
695       // the outputs
696       BufferDescriptor        theBuffer;      // FSDispatch does CreateAreaForRange and DeleteArea
697       // the inputs
698       FSAttributeDescriptorPtr theAttributes; // actually an offset into variable portion of message
699       //
700       FSRequestTrailer        trailer;
```

```
701      } FSReqAttributesGet, *FSReqAttributesGetPtr;
702
703      /*
704       * FSReqAttributesSet sets a list of attributes for a Filesystem entity.
705       * The field theAttributes is a pointer to a nul terminated array of
706       * FSAttributeDescriptor's. The values of each listed attribute are
707       * copied from the buffer as indicated by the FSAttributeDescriptor
708       */
709      typedef struct FSReqAttributesSet {
710          FSRequestHeader         header;         // header.prmCommandID = kAttributesSet
711          FSSpecification         theEntity;
712          // the target
713          FSSpecification
714          // the outputs
715          BufferDescriptor        theBuffer;      // FSDispatch does CreateAreaForRange and DeleteArea
716          FSAttributeDescriptor   theAttributes;  // actually an offset into variable portion of message
717          FSAttributeDescriptorPtr
718          //
719          FSRequestTrailer        trailer;
720      } FSReqAttributesSet, *FSReqAttributesSetPtr;
721
722      /*
723       * FSReqAttributesGetSize gets the sizes of a list of attributes for a particular
724       * Filesystem entity. theAttributes, describes what attributes to get the sizes of,
725       * where in theBuffer to put the values, and how many bytes are allocated to the
726       * values. Any attributes which don't exist are considered to have a size of 0.
727       */
728      typedef struct FSReqAttributesGetSize {
729          FSRequestHeader         header;         // header.prmCommandID = kAttributesGetSize
730          FSSpecification         theEntity;
731          // the target
732          FSSpecification
733          // the outputs
734          BufferDescriptor        theBuffer;      // FSDispatch does CreateAreaForRange and DeleteArea
735          // the inputs
736          FSAttributeDescriptor   theAttributes;  // actually an offset into variable portion of message
737          FSAttributeDescriptorPtr
738          //
739          FSRequestTrailer        trailer;
740      } FSReqAttributesGetSize, *FSReqAttributesGetSizePtr;
741      /*
742       * FSReqAttributesGetBulk sequences through the filesystem, starting at
743       * oldPosition, collecting attributes from each filesystem entity
744       * encountered until there are no more entities along the specified route.
745       * The exact route throught the filesystem used is defined
746       * by the operation parameter.
747       *
748       * The count parameter is filled in with the number of entities from which
749       * Attributes were collected before the request either ran out of room in
750       * theBuffer or ran out of entities.
```

```
751   *
752   * This is equivalent to iteratively calling either AttributesGet followed
753   * by a call to Iterate(oldPosition, newPosition, operation). The advantage
754   * is that it saves a lot of overhead work, so throughput is higher.
755   *
756   * TheAttributes is a list of FSAttributeDescriptor's which is terminated with
757   * a descriptor of the form: theAttribute == NULL, theOffset == NUL, and
758   * theLength == sizeof( yourAttributeStructure ). TheBuffer is viewed as an
759   * array of elements. Each element is the size of yourAttributeStructure. This
760   * allows space at the end of yourAttributeStructure which is not described in
761   * theAttributes.
762   *
763   * NewPosition is set to the last entity which was added to theBuffer, or
764   * oldPosition if no entities were found.
765   * NewPosition can point at the same iterator passed as oldPosition.
766   */
767  typedef struct FSReqAttributesGetBulk {
768     FSRequestHeader    header;       // header.prmCommandID = kAttributesGetBulk
769     // the target
770     FSIterator         oldPosition;
771     // the inputs
772     FSAttributeDescriptorPtr  theAttributes;
773     struct {
774        FSIterator       newPosition;
775        int32            count;       //... should there be an end of iteration flag
776     }
777     BufferDescriptor   theBuffer;     // FSDispatch does CreateAreaForRange and DeleteArea
778     // the inputs
779     FSAttributeDescriptorPtr  theAttributes;
780     FSIterationOperation      operation;   // actually an offset into variable portion of message
781     uint16             filler1;      //... FSIterationOperation is a uint16
782     //
783     FSRequestTrailer   trailer;
784  } FSReqAttributesGetBulk, *FSReqAttributesGetBulkPtr;
785
786
787  /*
788   * FSReqAttributesGetBulkFiltered sequences through the filesystem, starting
789   * at oldPosition, collecting attributes from each filesystem entity
790   * encountered which meet the given criteria until ther are no more entities
791   * along the specified route. The exact route through the
792   * filesystem used is defined by the operation parameter.
793   *
794   * The count parameter is filled in with the number of entities from which
795   * Attributes were collected before the request either ran out of room in
796   * theBuffer or ran out of entities.
797   *
798   * This is equivalent to iteratively calling either AttributesGet followed
799   * by a call to Search(oldPosition, newPosition, criteria, operation). The
800   * advantage is that it saves a lot of overhead work, so throughput is higher.
```

```
801   /*
802    * TheAttributes is a list of FSAttributeDescriptor's which is terminated with
803    * a descriptor of the form: theAttribute == NULL, theOffset == NULL, and
804    * theLength == sizeof( yourAttributesStructure ). TheBuffer is viewed as an
805    * array of elements. Each element is the size of yourAttributesStructure. This
806    * allows space at the end of yourAttributesStructure which is not described in
807    * theAttributes.
808    *
809    * NewPosition is set to the last entity which was added to theBuffer, or
810    * oldPosition if no entities were found.
811    * NewPosition can point at the same iterator passed as oldPosition.
812    */
813   typedef struct FSReqAttributesGetBulkFiltered {
814       FSRequestHeader         header;        // header.prmCommandID = kAttributesGetBulkFiltered
815       // the target
816       FSIterator              oldPosition;
817       // the outputs
818       struct {
819           FSIterator          newPosition;
820           int32               count;          //** should there be an end of iteration flag
821       }
822       BufferDescriptor        theBuffer;      // FSDispatch does CreateAreaForRange and DeleteArea
823       // the inputs
824       FSSearchCriteriaPtr     criteria;       // actually an offset into variable portion of message
825       FSAttributeDescriptorPtr theAttributes; // actually an offset into variable portion of message
826       FSIterationOperation    operation;
827       uint16                  filler1;        //** FSIterationOperation is a uint16
828       //
829       FSRequestTrailer        trailer;
830   } FSReqAttributesGetBulkFiltered, *FSReqAttributesGetBulkFilteredPtr;
831
832   /*
833    * FSReqTestEntity compares theEntity against criteria. E_NoError is returned
834    * for a match; otherwise, an appropriate error is returned. This is
835    * essentially a non-iterative version of what is performed by Search and
836    * AttributesGetBulkFiltered
837    */
838   typedef struct FSReqTestEntity {
839       FSRequestHeader         header;        // header.prmCommandID = kTestEntity
840       // the target
841       FSSpecification         theEntity;
842       // the outputs
843       // the inputs
844       FSSearchCriteriaPtr     criteria;       // actually an offset into variable portion of message
845       //
846       FSRequestTrailer        trailer;
847   } FSReqTestEntity, *FSReqTestEntityPtr;
848
849   /*
850
```

```
851    * FSReqEntityType returns what kind of entity the given FSSpecification refers
852    * to.
853    */
854   typedef struct FSReqEntityType {
855       FSRequestHeader     header;      // header.prmCommandID = kEntityType
856       // the target
857       FSSpecification                  theEntity;
858       // the outputs
859       struct {
860           FSObjectInfo                 theInfo;
861                                        theReply;
862       }
863       // the inputs
864       //
865       FSRequestTrailer                 trailer;
866   } FSReqEntityType, *FSReqEntityTypePtr;
867
868   /*------------------------------------------------------------------
869    * Volume Manipulation
870    */
871
872   /*
873    * FSReqVolumeMount mounts the volume on the logical DeviceID, theDevice.
874    */
875   typedef struct FSReqVolumeMount {
876       FSRequestHeader     header;      // header.prmCommandID = kVolumeMount
877       // the target & output
878       FSSpecification                  theVolume;
879       // the outputs
880       FSObjectInfo                     theReply;
881                                        theInfo;
882       }
883       // the inputs
884       ObjectID                         theDevice;   //** type this when DeviceInterface.h/DeviceTypes.h are stable
885       MountPermission                  thePermissions;
886       //** remove theDrive and partitionIndex when we switch to NuIO
887       int16                            driveNum;
888       uint32                           driverRefNum;
889       int16                            theDrive;
890       uint32                           partitionIndex;
891       FSRequestTrailer                 trailer;
892   } FSReqVolumeMount, *FSReqVolumeMountPtr;
893
894   /*
895    * FSReqVolumeUnmount unmounts the given volume.
896    */
897   typedef struct FSReqVolumeUnmount {
898       FSRequestHeader     header;      // header.prmCommandID = kVolumeUnmount
```

```
901     // the target
902     FSSpecification                theVolume;
903     // the outputs
904     // the inputs
905     //
906                    trailer;
907  } FSRequestTrailer
908  } FSReqVolumeUnmount, *FSReqVolumeUnmountPtr;
909
910  /*
911   * FSReqVolumeCreate initializes a new Volume. The amount of work
912   * which is done is controlled by the operationMask field. The
913   * parameter kind indicate the type of filesystem to be created
914   * on the volume, and variant indicates which sub-choice of
915   * filesystem is to be used. The new volume is mounted after it is
916   * created.
917   */
918  typedef struct FSReqVolumeCreate {
919      FSRequestHeader          header;    //** header.prmCommandID = kVolumeCreate
920      struct {
921          // the target & output
922          FSSpecification         theVolume;
923          // the outputs
924          FSObjectInfo            theInfo;
925                                  theReply;
926          // the inputs
927          ObjectID                theDevice; //** type this when DeviceInterface.h/DeviceTypes.h are stable
928          FileSystemKind          kind;
929          int32                   variant;
930          FSName                  volName;
931          FormatOperationMask     OperationMask;    //** FormatOperationMask is a uint16
932          uint16                  filler1;
933          MountPermission         thePermissions;
934          //** remove theDrive and partitionIndex when we switch to NuIO
935          uint32                  theDrive;
936          uint32                  partitionIndex;
937          //
938                                  trailer;
939  } FSRequestTrailer
940  } FSReqVolumeCreate, *FSReqVolumeCreatePtr;
941
942  /*
943   * FSReqVolumeGetCapability fills in the provided structure with
944   * a description of what functionality is actually supported by
945   * the given volume.
946   */
947  typedef struct FSReqVolumeGetCapability {
948      FSRequestHeader          header;    // header.prmCommandID = kVolumeGetCapability
949      // the target
950      FSSpecification                theVolume;
```

```
951        // the outputs
952        struct {
953            VolumeFunctionality       theInfo;
954                                      theReply;
955        }
956        // the inputs
957        FSRequestTrailer              trailer;
958   }FSReqVolumeGetCapability, *FSReqVolumeGetCapabilityPtr;
959
960   /*
961   * FSReqVolumeEject ejects the given volume.
962   */
963   typedef struct FSReqVolumeEject {
964       FSRequestHeader       header; // header.prmCommandID = kVolumeEject
965       // the target
966       FSSpecification       theVolume;
967       // the outputs
968       // the inputs
969       //
970       FSRequestTrailer      trailer;
971   } FSReqVolumeEject, *FSReqVolumeEjectPtr;
972
973   /*
974   * FSReqVolumeOffline puts the given volume off-line.
975   */
976   typedef struct FSReqVolumeOffline {
977       FSRequestHeader       header; // header.prmCommandID = kVolumeOffline
978       // the target
979       FSSpecification       theVolume;
980       // the outputs
981       // the inputs
982       //
983       FSRequestTrailer      trailer;
984   } FSReqVolumeOffline, *FSReqVolumeOfflinePtr;
985
986   /*
987   * FSReqVolumeGetRemountSize returns the size of the data block which is
988   * required to store enough information to mount the given volume
989   * again in the future. This call is primarily used to enable
990   * remounting of network volumes.
991   */
992   typedef struct FSReqVolumeGetRemountSize {
993       FSRequestHeader       header; // header.prmCommandID = kVolumeGetRemountSize
994       // the target
995       FSSpecification       theVolume;
996       // the outputs
997       struct {
```

```
1001        uint32                  theSize;
1002                                theReply;
1003    // the inputs
1004    }
1005    FSRequestTrailer            trailer;
1006    } FSReqVolumeGetRemountSize, *FSReqVolumeGetRemountSizePtr;
1007
1008
1009    /*
1010    * FSReqVolumeGetRemountData fills in the provided buffer with the data
1011    * which is required to mount the given volume again in the future.
1012    */
1013    typedef struct FSReqVolumeGetRemountData {
1014        FSRequestHeader         header; // header.prmCommandID = kVolumeGetRemountData
1015        // the target
1016        FSSpecification
1017        // the outputs
1018        BufferDescriptor
1019        // the inputs
1020        //
1021        FSRequestTrailer            trailer;
1022    } FSReqVolumeGetRemountData, *FSReqVolumeGetRemountDataPtr;
1023
1024
1025    /*
1026    * FSReqVolumeRemount remounts a volume based on information which
1027    * was previously obtained by a GetRemountData call.
1028    */
1029    typedef struct FSReqVolumeRemount {
1030        FSRequestHeader         header; // header.prmCommandID = kVolumeRemount
1031        struct {
1032            // the target & output
1033            FSSpecification         theVolume;
1034            // the outputs
.035            FSObjectInfo            theInfo;
1036                                    theReply;
1037        }
1038        // the inputs
1039        BufferDescriptor        remountData;    // FSDispatch does CreateAreaForRange and DeleteArea
1040        //
1041        FSRequestTrailer            trailer;
1042    } FSReqVolumeRemount, *FSReqVolumeRemountPtr;
1043
1044    /*------------------------------------------------------------------
1045    * Directory Manipulation
1046    * These calls are used to manipulate and control Directories. They can also
1047    * be used on Volumes, in which case they act on the root directory of the
1048    * Volume.
1049    */
1050
```

```
1051  /*
1052   * FSReqDirectoryCreate creates a new Directory whose name and location
1053   * are described by the given FSSpecification.
1054   */
1055  typedef struct FSReqDirectoryCreate {
1056      FSRequestHeader      header;  // header.prmCommandID = kDirectoryCreate
1057      // the target
1058      FSSpecification      theDirectory;
1059      // the outputs
1060      struct {
1061          DirectoryNum     theDirectoryNum;
1062      } theReply;
1063      // the inputs
1064      //
1065      FSRequestTrailer     trailer;
1066  } FSReqDirectoryCreate, *FSReqDirectoryCreatePtr;
1067
1068
1069  /*----------------------------------------------------------------
1070   * File Manipulation
1071   */
1072
1073  /*
1074   * FSReqFileCreate creates a new File whose name and location are
1075   * described by the given FSSpecification.
1076   */
1077  typedef struct FSReqFileCreate {
1078      FSRequestHeader      header;  // header.prmCommandID = kFileCreate
1079      // the target
1080      FSSpecification      theFile;
1081      // the outputs
1082      //
1083      OSType               fileType;
1084      OSType               fileCreator;
1085      //
1086      FSRequestTrailer     trailer;
1087  } FSReqFileCreate, *FSReqFileCreatePtr;
1088
1089
1090  /*----------------------------------------------------------------
1091   * Fork Manipulation
1092   */
1093
1094  /*
1095   * FSReqForkCreate create a new fork with the given ID in the indicated File.
1096   */
1097  typedef struct FSReqForkCreate {
1098      FSRequestHeader      header;  // header.prmCommandID = kForkCreate
1099      // the target
1100      FSSpecification      theFile;
```

```
1101                ForkNum            theFork;
1102        //  the outputs
1103        //
1104        //  the inputs
1105        //
1106        FSRequestTrailer           trailer;
1107    } FSReqForkCreate, *FSReqForkCreatePtr;
1108
1109    /*
1110     * FSReqForkDelete disposes of the indicated Fork in the File
1111     */
1112    typedef struct FSReqForkDelete {
1113        FSRequestHeader            header;   // header.prmCommandID = kForkDelete
1114        //  the target
1115        FSSpecification            theFile;
1116        ForkNum                    theFork;
1117        //  the outputs
1118        //
1119        //  the inputs
1120        //
1121        FSRequestTrailer           trailer;
1122    } FSReqForkDelete, *FSReqForkDeletePtr;
1123
1124    /*
1125     * FSReqForkAttributesGet gets a list of attributes of a fork.
1126     * The field theAttributes is a pointer to a nul terminated array of
1127     * FSAttributeDescriptor's. The values of each listed attribute are
1128     * copied into the buffer as indicated by the FSAttributeDescriptor
1129     * If a value is longer than the give length, a leading subset of the
1130     * value is copied and an error is flagged. If the value is sorter,
1131     * it is 0-padded at the end and a different error is logged. Locations
1132     * in the buffer intented for Attributes which do not exist are left
1133     * unchanged by the operation, but an appropriate error is logged.
1134     */
1135    typedef struct FSReqForkAttributesGet {
1136        FSRequestHeader            header;   // header.prmCommandID = kForkAttributesGet
1137        //  the target
1138        FSSpecification            theFile;
1139        ForkNum                    theFork;
1140        //  the outputs
1141        BufferDescriptor           theBuffer;   // FSDispatch does CreateAreaForRange and DeleteArea
1142        //  the inputs
1143        FSAttributeDescriptor      theAttributes;   // actually an offset into variable portion of message
1144        //
1145        FSRequestTrailer           trailer;
1146    } FSReqForkAttributesGet, *FSReqForkAttributesGetPtr;
1147
1148
1149    /*
1150     * FSReqForkAttributesSet sets a list of attributes for a fork.
```

```
1151    * The field theAttributes is a pointer to a null terminated array of
1152    * FSAttributeDescriptor's. The values of each listed attribute are
1153    * copied from the buffer as indicated by the FSAttributeDescriptor
1154    */
1155   typedef struct FSReqForkAttributesSet {
1156     FSRequestHeader           header;              // header.prmCommandID = kForkAttributesSet
1157     // the target
1158     FSSpecification           theFile;
1159     ForkNum                   theFork;
1160     // the inputs
1161     BufferDescriptor          theBuffer;
1162     FSAttributeDescriptorPtr  theAttributes;
1163     // the outputs
1164     FSAttributeDescriptorPtr  theAttributes;
1165     //
1166     FSRequestTrailer          trailer;
1167   } FSReqForkAttributesSet, *FSReqForkAttributesSetPtr;
1168
1169   /*
1170    * FSReqForkAttributesGetSize gets the sizes of a list of attributes for a
1171    * particular fork. ttheAttributes, describes what attributes to get the sizes of,
1172    * where in theBuffer to put the values, and how many bytes are allocated to the
1173    * values. Any attributes which don't exist are considered to have a size of 0.
1174    */
1175   typedef struct FSReqForkAttributesGetSize {
1176     FSRequestHeader           header;              // header.prmCommandID = kForkAttributesGetSize
1177     // the target
1178     FSSpecification           theFile;
1179     ForkNum                   theFork;
1180     // the inputs
1181     BufferDescriptor          theBuffer;           // FSDispatch does CreateAreaForRange and DeleteArea
1182     // the inputs
1183     FSAttributeDescriptorPtr  theAttributes;       // actually an offset into variable portion of message
1184     //
1185     FSRequestTrailer          trailer;
1186   } FSReqForkAttributesGetSize, *FSReqForkAttributesGetSizePtr;
1187
1188   /*---------------------------------------------------------
1189    * File Class requests
1190    */
1191
1192   /*
1193    * FSReqFileClassIteratorCreate fills in the referenced FileClassIterator
1194    * with a valid iterator.
1195    */
1196   typedef struct FSReqFileClassIteratorCreate {
1197     FSRequestHeader           header;              // header.prmCommandID = kFileClassIteratorCreate
1198   }
1199
1200
```

```
1201         // the target
1202         FSSpecification       theVolume;
1203         // the outputs
1204         struct {
1205             FileClassIterator   theIterator;
1206                                 theReply;
1207         }
1208         // the inputs
1209         FileClass               initialPoint;   // iterator set great than or equal to initial point
1210         //
1211         FSRequestTrailer        trailer;
1212     } FSReqFileClassIteratorCreate, *FSReqFileClassIteratorCreatePtr;
1213
1214     /*
1215      * FSReqFileClassIteratorDispose disposes of any internal storage associated with
1216      * the given FileClassIterator
1217      */
1218     typedef struct FSReqFileClassIteratorDispose {
1219         FSRequestHeader         header;         // header.prmCommandID = kFileClassIteratorDispose
1220         // the target
1221         FileClassIterator       theIterator;
1222         // the outputs
1223         // the inputs
1224         //
1225         FSRequestTrailer        trailer;
1226     } FSReqFileClassIteratorDispose, *FSReqFileClassIteratorDisposePtr;
1227
1228     /*
1229      * FSReqFileClassAttributesGet gets a list of attributes of a file class.
1230      * The field theAttributes is a pointer to a nul terminated array of
1231      * FSAttributeDescriptor's. The values of each listed attribute are
1232      * copied into the buffer as indicated by the FSAttributeDescriptor
1233      * If a value is longer than the give length, a leading subset of the
1234      * value is copied and an error is flagged. If the value is sorter,
1235      * it is 0-padded at the end and a different error is logged. Locations
1236      * in the buffer intented for Attributes which do not exist are left
1237      * unchanged by the operation, but an appropriate error is logged.
1238      */
1239     typedef struct FSReqFileClassAttributesGet {
1240         FSRequestHeader         header;         // header.prmCommandID = kFileClassAttributesGet
1241         // the target
1242         FSSpecification         theVolume;
1243         FileClass               theClass;
1244         // the outputs
1245         BufferDescriptor        theBuffer;      // FSDispatch does CreateAreaForRange and DeleteArea
1246         // the inputs
1247         FSAttributeDescriptorPtr theAttributes;
1248         //
1249         FSRequestTrailer        trailer;        // actually an offset into variable portion of message
1250
```

```
1251        } FSReqFileClassAttributesGet, *FSReqFileClassAttributesGetPtr;
1252
1253
1254
1255    /*
1256    * FSReqFileClassAttributesSet sets a list of attributes for a file class.
1257    * The field theAttributes is a pointer to a nul terminated array of
1258    * FSAttributeDescriptor's. The values of each listed attribute are
1259    * copied from the buffer as indicated by the FSAttributeDescriptor
1260    */
1261    typedef struct FSReqFileClassAttributesSet {
1262        FSRequestHeader         header;  // header.prmCommandID = kFileClassAttributesSet
1263        // the target
1264        FSSpecification         theVolume;
1265        FileClass               theClass;
1266        // the inputs
1267        BufferDescriptor        theBuffer;
1268        FSAttributeDescriptorPtr theAttributes;
1269        //
1270        FSRequestTrailer        trailer;
1271    } FSReqFileClassAttributesSet, *FSReqFileClassAttributesSetPtr;
1272
1273
1274
1275    /*
1276    * FSReqFileClassAttributesGetSize gets the sizes of a list of attributes for a
1277    * particular FileClass. theAttributes, describes what attributes to get the sizes of,
1278    * where in theBuffer to put the values, and how many bytes are allocated to the
1279    * values. Any attributes which don't exist are considered to have a size of 0.
1280    */
1281    typedef struct FSReqFileClassAttributesGetSize {
1282        FSRequestHeader         header; // header.prmCommandID = kFileClassAttributesGetSize
1283        // the target
1284        FSSpecification         theVolume;
1285        FileClass               theClass;
1286        // the outputs
1287        BufferDescriptor        theBuffer;      // FSDispatch does CreateAreaForRange and DeleteArea
1288        // the inputs
1289        FSAttributeDescriptorPtr theAttributes; // actually an offset into variable portion of message
1290        //
1291        FSRequestTrailer        trailer;
1292    } FSReqFileClassAttributesGetSize, *FSReqFileClassAttributesGetSizePtr;
1293
1294
1295    /*
1296    * FSReqFileClassIterate makes theNewClass refer to the same class as
1297    * theOldClass and then moves it according to whichWay. If whichWay
1298    * is equal to kFSClassOpThis, then theNewClass is positioned to refer
1299    * to the class indicated by initialPoint.
1300    *
```

```
 */
typedef struct FSReqFileClassIterate {
    FSRequestHeader     header;         // header.prmCommandID = kFileClassIterate
    // the target
    FileClassIterator                   theReply;
    // the outputs
    struct {
        FileClassIterator   newFileClass;
        theReply;
    }
    // the inputs
    ClassIterationOperation whichWay;
    uint16                  filler1;    //... ClassIterationOperation is a uint16
    FileClass               initialPoint; // only used for kFSClassOpThis
    //
    FSRequestTrailer        trailer;
} FSReqFileClassIterate, *FSReqFileClassIteratePtr;

/*------------------------------------------------------------
 * Miscellaneous Filesystem requests
 */

/*
 * FSReqDelete deletes a filesystem entity (file or directory).
 */
typedef struct FSReqDelete {
    FSRequestHeader     header;         // header.prmCommandID = kFSDelete
    // the target
    FSSpecification     theEntity;
    // the outputs
    //
    // the inputs
    //
    FSRequestTrailer    trailer;
} FSReqDelete, *FSReqDeletePtr;

/*
 * FSReqExchange exchanges the identity of two files.
 */
typedef struct FSReqExchange {
    FSRequestHeader     header;         // header.prmCommandID = kFSExchange
    // the target
    FSSpecification     File1;
    FSSpecification     File2;
    // the outputs
    //
    // the inputs
    //
    FSRequestTrailer    trailer;
} FSReqExchange, *FSReqExchangePtr;
```

```
/*
 * FSReqMoveRename moves and optionally rename a File or Directory.
 * If newName is the "empty" FSName, the old name is preserved.
 */
typedef struct FSReqMoveRename {
    FSRequestHeader     header;     // header.prmCommandID = kFSMoveRename
    // the target
    FSSpecification     source;
    // the outputs
    // the inputs
    FSSpecification     theNewDirectory;
    FSName              newName;
    //
    FSRequestTrailer    trailer;
} FSReqMoveRename, *FSReqMoveRenamePtr;

/*
 * FSReqCopyRename copies and optionally rename a File or Directory.
 * If newName is nil, the old name is preserved.
 */
typedef struct FSReqCopyRename {
    FSRequestHeader     header;     // header.prmCommandID = kFSCopyRename
    // the target
    FSSpecification     source;
    // the outputs
    // the inputs
    FSSpecification     theNewDirectory;
    FSName              newName;
    //
    FSRequestTrailer    trailer;
} FSReqCopyRename, *FSReqCopyRenamePtr;

/*
 * FSReqDirectoryGetCurrent gets the current default directory
 * for the application.
 */
typedef struct FSReqDirectoryGetCurrent {
    FSRequestHeader     header;     // header.prmCommandID = kDirectoryGetCurrent
    // the target & output
    FSSpecification     directory;
    // the outputs
    FSObjectInfo        theInfo;
    FSReply             theReply;
    }
    // the inputs
    FSRequestTrailer    trailer;
} FSReqDirectoryGetCurrent, *FSReqDirectoryGetCurrentPtr;
```

```
1401    /*
1402     * FSReqDirectorySetCurrent ets the current default directory
1403     * for the application.
1404     */
1405    typedef struct FSReqDirectorySetCurrent {
1406        FSRequestHeader     header;     // header.prmCommandID = kDirectorySetCurrent
1407        // the target
1408        FSSpecification     directory;
1409        // the outputs
1410        // the inputs
1411        FSRequestTrailer    trailer;
1412    } FSReqDirectorySetCurrent, *FSReqDirectorySetCurrentPtr;
1413
1414
1415
1416    /*
1417     * FSReqGetFilesystemVersion gets the version of the currently
1418     * operating filesystem.
1419     */
1420    //*
1421    //** Perhaps this message should be eliminated, and the version is put in the
1422    //** NameSpace as an attribute of FileManager, and each FileSystem.
1423    //**
1424    typedef struct FSReqGetFilesystemVersion {
1425        FSRequestHeader     header;     // header.prmCommandID = kGetFilesystemVersion
1426        // the target
1427        // the outputs
1428        struct {
1429            int32           version;    //** needs to be defined
1430        } theReply;
1431        // the inputs
1432        FSRequestTrailer    trailer;
1433    } FSReqGetFilesystemVersion, *FSReqGetFilesystemVersionPtr;
1434
1435    /*-----------------------------------------------------------------
1436     * Permissions
1437     * This section is probably the one which is the most radically different
1438     * from the current model. The problem is that we anticipate substantial
1439     * improvements to the Macintosh permissions model in the future; but we
1440     * don't want to take the time we would need to be able to commit to specific
1441     * changes now. Therefore we need to come up with an API which presents a
1442     * permissions model which covers the current functionality, as well as all
1443     * of the possible models we may employ in the future. This approach does
1444     * have one advantage: it will make integration with other foreign filesystem
1445     * more straightforward.
```

```
1451  * Since virtually any permissions scheme can be modeled by Access Control Lists,
1452  * we have chosen to use ACLs as the model used by the API. This does not mean
1453  * we are committed to providing ACLs in the future, just that we are sure we
1454  * can access whatever we do in the future underneath an ACL API.
1455  *
1456  * The current permission structure under AppleShare is easily modeled by a
1457  * list of two entries, one an individual (who has ChangePermissions access)
1458  * and a group; plus the usual default permissions entry to cover everyone else.
1459  * The Add and Delete Permission calls will not be functional on standard HFS
1460  * volumes.
1461  */
1462
1463  /*
1464   * FSReqPermissionIteratorCreate fills in theIterator with information
1465   * necessary to iterate over the permissions associated with the given
1466   * File or Directory. As a default, the iterator is left referring to
1467   * the default permissions (i.e. Everyone).
1468   */
1469  typedef struct FSReqPermissionIteratorCreate {
1470      FSRequestHeader         header; // header.prmCommandID = kPermissionIteratorCreate
1471      // the target & output
1472      struct {
1473          PermissionIterator  theIterator;
1474      }
1475      // the outputs                 theReply;
1476      // the inputs
1477      FSSpecification                 whosePermissions;
1478      //
1479      FSRequestTrailer                trailer;
1480  } FSReqPermissionIteratorCreate, *FSReqPermissionIteratorCreatePtr;
1481
1482  /*
1483   * FSReqPermissionIteratorDispose disposes of any internal storage associated
1484   * with the iterator.
1485   */
1486  typedef struct FSReqPermissionIteratorDispose {
1487      FSRequestHeader         header; // header.prmCommandID = kPermissionIteratorDispose
1488      // the target
1489      PermissionIterator              theIterator;
1490      // the outputs
1491      // the inputs
1492      //
1493      FSRequestTrailer                trailer;
1494  } FSReqPermissionIteratorDispose, *FSReqPermissionIteratorDisposePtr;
1495
1496  /*
1497   * FSReqPermissionsIterate iterates over the permissions based on the
1498   * give operation
1500
```

```
1501  */
1502  typedef struct FSReqPermissionsIterate {
1503      FSRequestHeader      header; // header.prmCommandID = kPermissionsIterate
1504      // the target
1505      PermissionIterator   oldIterator;
1506      // the outputs
1507      struct {
1508          PermissionIterator   newIterator;
1509      } theReply;
1510      // the inputs
1511      PermissionOperation  operation;
1512      uint16               filler1;         //** PermissionOperation is a uint16
1513      //
1514      FSRequestTrailer     trailer;
1515  } FSReqPermissionsIterate, *FSReqPermissionsIteratePtr;
1516
1517
1518  /*
1519   * FSReqPermissionSearch finds the permission entry which is associated
1520   * with the given identity.
1521   */
1522  typedef struct FSReqPermissionsSearch {
1523      FSRequestHeader      header; // header.prmCommandID = kPermissionsSearch
1524      // the target
1525      PermissionIterator   oldIterator;
1526      // the outputs
1527      struct {
1528          PermissionIterator   newIterator;
1529      } theReply;
1530      // the inputs
1531      FSAccessIdentity     identity;
1532      //
1533      FSRequestTrailer     trailer;
1534  } FSReqPermissionSearch, *FSReqPermissionSearchPtr;
1535
1536
1537  /*
1538   * FSReqPermissionAdd adds a permission specification to the File or Directory.
1539   */
1540  typedef struct FSReqPermissionAdd {
1541      FSRequestHeader      header; // header.prmCommandID = kPermissionAdd
1542      // the target
1543      PermissionIterator   oldIterator;
1544      // the outputs
1545      struct {
1546          PermissionIterator   newIterator;
1547      } theReply;
1548      // the inputs
1549      PermissionSpec       newPermission;
1550      //
```

```
1551            FSRequestTrailer    trailer;
1552       } FSReqPermissionAdd, *FSReqPermissionAddPtr;
1553
1554
1555    /*
1556     * FSReqPermissionChange changes the permission currently indicated by the iterator
1557     * to what is specified by the given PermissionSpec.
1558     */
1559    typedef struct FSRequestHeader {
1560       FSRequestHeader         header;   // header.prmCommandID = kPermissionChange
1561       // the target
1562       PermissionIterator       oldIterator;
1563       // the outputs
1564       struct {
1565          PermissionIterator    newIterator;
1566       }
1567       // the inputs
1568       PermissionSpec           newPermission;
1569       //
1570       FSRequestTrailer         trailer;
1571    } FSReqPermissionChange, *FSReqPermissionChangePtr;
1572
1573
1574    /*
1575     * FSReqPermissionDelete deletes the permission specification referred
1576     * to by the iterator from the File or Directory
1577     */
1578    typedef struct FSRequestHeader {
1579       FSRequestHeader         header;   // header.prmCommandID = kPermissionDelete
1580       // the target
1581       PermissionIterator       oldIterator;
1582       // the outputs
1583       struct {
1584          PermissionIterator    newIterator;
1585       }
1586       // the inputs
1587                               theReply;
1588       FSRequestTrailer         trailer;
1589    } FSReqPermissionDelete, *FSReqPermissionDeletePtr;
1590
1591
1592    /*
1593     * FSReqPermissionGet gets the permissions associated with the given
1594     * identity for the given File or Directory.
1595     */
1596    typedef struct FSReqPermissionGet {
1597       FSRequestHeader         header;   // header.prmCommandID = kPermissionGet
1598       // the target
1599       FSSpecification         theFileOrDirectory;
1600       // the outputs
```

```
1601   struct {
1602       FSPermission              thePermission;
1603       // the inputs
1604       FSAccessIdentity          identity;
1605       // the outputs
1606       //
1607       FSRequestTrailer          trailer;
1608   } FSReqPermissionGet, *FSReqPermissionGetPtr;
1609
1610
1611   /*
1612    * FSReqPermissionGetNative fills into PermissionBuffer a description
1613    * of the native permissions for the given File or Directory. The format
1614    * of this data is dependant on the type of filesystem supported by the
1615    * volume on which the file resides. The actualLength field will be updated
1616    * to give the actual amount of data returned back in theBuffer.
1617    */
1618   typedef struct FSReqPermissionGetNative {
1619       FSRequestHeader           header;  // header.prmCommandID = kPermissionGetNative
1620       // the target
1621       FSSpecification           theFileOrDirectory;
1622       // the outputs
1623       struct {
1624           uint32                actualLength;
1625       }                         theReply;
1626       BufferDescriptor          theBuffer;   // FSDispatch does CreateAreaForRange and DeleteArea
1627       // the inputs
1628       //
1629       FSRequestTrailer          trailer;
1630   } FSReqPermissionGetNative, *FSReqPermissionGetNativePtr;
1631
1632
1633   /*
1634    * FSReqPermissionSetNative gets the native permissions for the given
1635    * File or Directory based on the contents of PermissionBuffer.
1636    * The format of this data is dependant on the type of filesystem
1637    * supported by the volume on which the file resides.
1638    */
1639   typedef struct FSReqPermissionSetNative {
1640       FSRequestHeader           header;  // header.prmCommandID = kPermissionSetNative
1641       // the target
1642       FSSpecification           theFileOrDirectory;
1643       // the inputs
1644       BufferDescriptor          theBuffer;   // FSDispatch does CreateAreaForRange and DeleteArea
1645
1646
1647       FSRequestTrailer          trailer;
1648   } FSReqPermissionSetNative, *FSReqPermissionSetNativePtr;
1649
1650
```

```
1651  /*----------------------------------------------------------------
1652   * FSSpecification Utilities
1653   */
1654
1655  /*
1656   * FSReqFileGetIDFromFSSpec returns the FileNum for the indicated File.
1657   * If the Filesystem does not currently have a public ID for the file,
1658   * it creates one.
1659   */
1660  typedef struct FSReqFileGetIDFromFSSpec {
1661      FSRequestHeader         header;  // header.prmCommandID = kFileGetIDFromFSSpec
1662      // the target
1663      FSSpecification         theFile;
1664      // the outputs
1665      struct {
1666          FileNum             theID;
1667      }                       theReply;
1668      // the outputs
1669      //
1670      FSRequestTrailer        trailer;
1671  } FSReqFileGetIDFromFSSpec, *FSReqFileGetIDFromFSSpecPtr;
1672
1673  /*
1674   * FSReqFileGetFSSFromID resolves which File is referred to by the given
1675   * ID and Volume, and Fills in the FSSpecification so that it refers to
1676   * the file.
1677   */
1678  typedef struct FSReqFileGetFSSFromID {
1679      FSRequestHeader         header;  // header.prmCommandID = kFileGetFSSFromID
1680      struct {
1681          // the target & output
1682          FSSpecification     theFile;
1683          // the outputs
1684          FSObjectInfo        theInfo;
1685      }                       theReply;
1686      // the inputs
1687      FSSpecification         theVolume;
1688      FileNum                 theID;
1689      //
1690      FSRequestTrailer        trailer;
1691  } FSReqFileGetFSSFromID, *FSReqFileGetFSSFromIDPtr;
1692
1693  /*
1694   * FSReqPathnameResolve fills in theFile with an FSSpecification for the file
1695   * referred to by the given path. This call also validates the existence of
1696   * such a File. */
1697
1698  typedef struct FSReqPathnameResolve {
1699      FSRequestHeader         header;  // header.prmCommandID = kPathnameResolve
1700
```

```
1701    struct {
1702            // the target & output
1703            FSSpecification        theFile;
1704            // the outputs
1705            FSObjectInfo           theInfo;
1706            // the inputs
1707                                   theReply;
1708            PathSpecification      thePath;      //.tname is actually an offset into variable portion of message
1709            //
1710            FSRequestTrailer       trailer;
1711    } FSReqPathnameResolve, *FSReqPathnameResolvePtr;
1712
1713    /*----------------------------------------------------------------
1714     * Notification
1715     *
1716     * This section describes a mechanism to allow applications to be notified
1717     * when objects in the filesystem change. It is intended for use by the Finder
1718     * and by applications like OnLocation which need to know what other
1719     * applications are doing to the filesystem.
1720     */
1721
1722    /*
1723     * FSReqNotificationQueueCreate creates a new Notification Queue with no
1724     * subscriptions. The parameter maxQueueLength defines the maximum number
1725     * of NTChangeReport's which will be stored for the Queue. The overrunAction
1726     * parameter is evoked whenever the queue is full.
1727     */
1728    typedef struct FSReqNotificationQueueCreate {
1729            FSRequestHeader        header; // header.prmCommandID = kFSNotificationQueueCreate
1730            // the target & output
1731            struct {
1732                    NotificationObjID    theQueue;
1733            }                      theReply;
1734            // the outputs
1735            // the inputs
1736            uint32                 maxQueueLength;
1737                                   overrunAction;
1738            EventNotification
1739            //
1740            FSRequestTrailer       trailer;
1741    } FSReqNotificationQueueCreate, *FSReqNotificationQueueCreatePtr;
1742
1743    /*
1744     * FSReqNotificationQueueDispose removes all of the given Notification
1745     * Queue's subscriptions and then disposes of the Queue itself.
1746     */
1747    typedef struct FSReqNotificationQueueDispose {
1748            FSRequestHeader        header; // header.prmCommandID = kFSNotificationQueueDispose
1749            // the target
1750            NotificationObjID      theQueue;
```

```
1751        // the outputs
1752        // the inputs
1753        //
1754        FSRequestTrailer                trailer;
1755    } FSReqNotificationQueueDispose, *FSReqNotificationQueueDisposePtr;
1756
1757
1758    /*
1759     * FSReqNotificationSubscribe subscribes the given Notification Queue to the type of
1760     * change indicated, and queue the reports with the given scope. If collapse
1761     * is true, then identical reports on the queue are collapsed together into
1762     * a single report Thus if theChange equals NTFileCreated and theScope
1763     * equals NTReportOnDirectory and collapse is true, multiple reports of files
1764     * being created in the samedirectory will be collapsed into a single report
1765     * if they appear on the queue at the same time. All events are filtered by
1766     * the given volume and directory ID's.
1767     */
1768    typedef struct FSReqNotificationSubscribe {
1769        FSRequestHeader                 header;  // header.prmCommandID = kFSNotificationSubscribe
1770        // the target
1771        NotificationObjID               theQueue;
1772        // the outputs
1773        // the inputs
1774        FSChangeEvent                   theChange;
1775        FSChangeReportScope             theScope;
1776        VolumeObjID                     theVolume;
1777        DirectoryNum                    theDirectory;
1778        uint32                          options;
1779        //
1780        FSRequestTrailer                trailer;
1781    } FSReqNotificationSubscribe, *FSReqNotificationSubscribePtr;
1782
1783
1784    /*
1785     * FSReqNotificationUnsubscribe remove any subscription which the given Notification
1786     * Queue might have to the type of change indicated which have the given scope.
1787     * If theScope is nil, then all subscriptions to the type of change are removed.
1788     * If theChange is nil, then all subscriptions are removed.
1789     */
1790    typedef struct FSReqNotificationUnsubscribe {
1791        FSRequestHeader                 header;  // header.prmCommandID = kFSNotificationUnsubscribe
1792        // the target
1793        NotificationObjID               theQueue;
1794        // the outputs
1795        // the inputs
1796        FSChangeEvent                   theChange;
1797        FSChangeReportScope             theScope;
1798        VolumeObjID                     theVolume;
1799        DirectoryNum                    theDirectory;
1800        //
```

```
1801              trailer;
1802   } FSReqNotificationUnsubscribe, *FSReqNotificationUnsubscribePtr;
1803
1804   /*
1805    * FSReqNotificationGetEvent removes the top change report from the queue, and returns a
1806    * pointer to the next change report (which is now at the top).
1807    */
1808
1809   typedef struct FSReqNotificationGetEvent {
1810       FSRequestHeader            header;   // header.prmCommandID = kFSNotificationGetEvent
1811       // the target
1812       NotificationObjID
1813       // the outputs
1814       struct {
1815           FSChangeReport         theQueue;
1816       }                          theChange;
1817       // the inputs                         theReply;
1818       //
1819       FSRequestTrailer           trailer;
1820   } FSReqNotificationGetEvent, *FSReqNotificationGetEventPtr;
1821
1822   /*----------------------------------------------------------------------
1823    * Access Methods Interfaces
1824    * While the new File Manager interface is fairly rich, inevitably Apple and Third
1825    * Party developers will want to add new functionality to the interface which is
1826    * available under specific circumstances. This may include, but is not limited to,
1827    * providing access to special features of particular volume formats, and new
1828    * access methods. The following requests provide half of the mechanism to do this.
1829    * They essentially allow new kinds of requests to be defined and sent through the
1830    * Filer Manager. The other half of the mechanism allows code to be installed in
1831    * the file manager to handle requests which are not handled by FSAgents.
1832    *
1833    * While the details of the contents of these messages are under the control of the
1834    * service developer, these messages become a part of the File Manager Interface
835     * and therefore will be processed by FSDispatch. It is neccessary that they follow
1836    * the same rules as all other File Manager requests. While violations of these
1837    * rules may appear to work for any specific version, Apple makes no guarantee that
1838    * they will continue to work for all versions of the file manager. The rules are:
1839    *
1840    * 1) All requests must begin with a FSRequestHeader structure, and end with a
1841    *    FSRequestTrailer structure, followed by any variable length data.
1842    *
1843    * 2) All data (input and output) which is neccessary for processing the request
1844    *    must be able to be identified by FSDispatch. For this reason, all of these
1845    *    requests make use of arrays of BufferDescriptor's to identify all data
1846    *    related to the request which is NOT in the message proper. The use of data
1847    *    outside of the message which is not referenced by one of these descriptors
1848    *    is strictly forbidden.
1849    *
1850    * 3) All fixed length input data, and all small variable length input data should
```

```
1851     be included in the message itself (this is actually a performance issue).
1852   *
1853   * 4) All variable length data which is a part of the message should be stored
1854   *    after the FSRequestTrailer, but refered to (by offset) by fields before the
1855   *    trailer using M_VaribleDataPtr.
1856   *
1857   * 5) No mixed input-and-output parameters are allowed. If a given parameter's
1858   *    value is changes by a request, then its value must not be used as input as
1859   *    well. In cases where this is desired, have two parameters which may refer to
1860   *    the same pieces of data, but are clearly separate parameters.
1861   *
1862   * In order to make the use of these rules more reasonable, all of these requests
1863   * have the same basic structure for their parameters. The first two parameters
1864   * always indicate the Extension the request is to be directed to (as identified
1865   * by a 4 character code), and what specific Action that Extension is being
1866   * requested to perform.
1867   *
1868   * Following that, there is the ID of the File Manager entity to which the request
1869   * is directed, the "Target" of the request. This can be a Path, or a Volume or (if
1870   * nil) the File Manager as a whole.
1871   *
1872   * Following that, there is a single pointer to a longword which is used as a
1873   * simple output parameter. This is provided because most requests only require a
1874   * sangle 4 byte output, and the use of a BufferDescriptor for it would be overkill.
1875   *
1876   * Following that, there is a description of all of the data, outside of the message
1877   * itself, which is used to process the request. All of this data is described by
1878   * BufferDescriptor's. This list is further divided into those pieces of data which
1879   * are changed by the request (the "outputs"), and those which are only read by the
1880   * request (the "inputs"). A count of each type is given, followed by an array of
1881   * BufferDescriptor's. In the array, all output parameters come first, followed by
1882   * any input parameters.
1883   *
1884   * Following that, there are the other fixed length inputs which are included in
1885   * the message itself. If there are any variable length input fields which are to be
1886   * included in the message, their values should be stored after the trailer, but
1887   * offsets to their locations in the variable portion of message buffer array should be stored here.
1888   *
1889   * Following that is the FSRequestTrailer, and the variable data array which form
1890   * the end of the message.
1891   */
1892
1893   /*
1894   * FSReqExtendedRequest, an extended request for the File Manager as a whole.
1895   * Note: while theTarget is usually 0, if the sender knows the ObjectID of a
1896   * specific FSAgent, that value can be passed here, and the request will be
1897   * dispatched to that Agent rather than having the File Manager handle it.
1898   */
1899   typedef struct FSReqExtendedRequest {
1900       FSRequestHeader    header;  // header.prmCommandID = kExtendedRequest
```

```
1901       OSType         // header.prmCommandID
1902       uint32         extensionID;         // What extension should handle this
1903       // the target
1904       ObjectID       actionCode;          // What should it do
1905       // the output
1906       uint32*        theTarget;           // usually 0
1907       // the extenal inputs and outputs (those not in the message proper)
1908       uint16         outputCount;         // the number of outputs
1909       uint16         inputCount;          // the number of inputs not in message
1910       //** BufferDescriptor                // a list of the remaining external outputs and inputs
1911                      externalParams[0];
1912       // the other fixed length inputs
1913       uint32         inputParams[0];      // the fixed length input parameters
1914       //
1915       FSRequestTrailer trailer;            // MUST be 32 bit aligned!
1916       } FSReqExtendedRequest, *FSReqExtendedRequestPtr;
1917       /*
1918        * FSReqExtendedVolumeMount, an extended request to mount a volume. Actually, a
1919        * more correct interpretation of this request is an "extended request to generate
1920        * a VolumeObjID". It is not necessary that a volume actually be mounted in a
1921        * traditional sense. For an FSAgent to handle this request, it must have registered
1922        * itself with the given extensionID.
1923        */
1924       typedef struct FSReqExtendedVolumeMount {
1925       FSRequestHeader header;              // header.prmCommandID = kExtendedVolumeMount
1926       OSType         extensionID;          // What extension should handle this
1927       uint32         actionCode;           // What should it do
1928       // the target
1929       VolumeObjID*   theVolume;
1930       // the output
1931       uint32*        theOutput;            // the one, cheap, output
1932       // the extenal inputs and outputs (those not in the message proper)
1933       uint16         outputCount;          // the number of outputs
1934       uint16         inputCount;           // the number of inputs not in message
1935       //** BufferDescriptor                 // a list of the remaining external outputs and inputs
1936                      externalParams[0];
1937       // the other fixed length inputs
1938       uint32         inputParams[0];       // the fixed length input parameters
1939       //
1940                      trailer;              // MUST be 32 bit aligned!
1941       } FSReqExtendedVolumeMount, *FSReqExtendedVolumeMountPtr;
1942       /*
1943        * FSReqExtendedVolumeUnmount, an extended request to unmount a volume. Actually, just
1944        * dispose of and clean up after a VolumeObjID created by a FSReqExtendedVolumeMount
1945        * request.
1946        */
1947       typedef struct FSReqExtendedVolumeUnmount {
1948       FSRequestHeader header;              // header.prmCommandID = kExtendedVolumeUnmount
1949       OSType         extensionID;          // What extension should handle this
1950       uint32         actionCode;           // What should it do
```

```
1951              VolumeObjID     theVolume;          // the one, cheap, output
1952        //    the output
1953        uint32*               theOutput;          // the one, cheap, output
1954        //    the extenal inputs and outputs (those not in the message proper)
1955        uint16                outputCount;        // the number of outputs
1956        uint16                inputCount;         // the number of inputs not in message
1957        //**  BufferDescriptor externalParams[0]; // a list of the remaining external outputs and inputs
1958        //    the other fixed length inputs
1959        uint32                inputParams[0];     // the fixed length input parameters
1960        //
1961        FSRequestTrailer      trailer;            // MUST be 32 bit aligned!
1962        } FSReqExtendedVolumeUnmount, *FSReqExtendedVolumeUnmountPtr;
1963
1964        /*
1965         * FSReqExtendedVolumeRequest, an extended request for a volume. The given VolumeObjID
1966         * may or may not have been created with a FSReqExtendedVolumeMount request, depending
1967         * on the specific Extension involved.
1968         */
1969        typedef struct FSReqExtendedVolumeRequest {
1970        FSRequestHeader       header;   // header.prmCommandID = kExtendedVolumeRequest
1971        OSType                extensionID;        // What extension should handle this
1972        uint32                actionCode;         // What should it do
1973        //    the target
1974        VolumeObjID           theVolume;
1975        //    the output
1976        uint32*               theOutput;          // the one, cheap, output
1977        //    the extenal inputs and outputs (those not in the message proper)
1978        uint16                outputCount;        // the number of outputs
1979        uint16                inputCount;         // the number of inputs not in message
1980        //**  BufferDescriptor externalParams[0]; // a list of the remaining external outputs and input
1981        //    the other fixed length inputs
1982        uint32                inputParams[0];     // the fixed length input parameters
1983        //
1984        FSRequestTrailer      trailer;            // MUST be 32 bit aligned!
1985        } FSReqExtendedVolumeRequest, *FSReqExtendedVolumeRequestPtr;
1986
1987        /*
1988         * FSReqExtendedPathOpen, an extended request to open a path. Actually, a
1989         * more correct interpretation of this request is an "extended request to generate
1990         * a PathObjID". It is not neccessary that a path actually be mounted in a
1991         * traditional sense.
1992         */
1993        typedef struct FSReqExtendedPathOpen {
1994        FSRequestHeader       header;   // header.prmCommandID = kExtendedPathOpen
1995        OSType                extensionID;        // What extension should handle this
1996        uint32                actionCode;         // What should it do
1997        //    the target
1998        PathObjID*            thePath;
1999        //    the output
2000
```

```
2001        uint32*         theOutput;              // the one, cheap, output
2002        // the extenal inputs and outputs (those not in the message proper)
2003        uint16          outputCount;            // the number of outputs
2004        uint16          inputCount;             // the number of inputs not in message
2005   //** BufferDescriptor externalParams[0];     // a list of the remaining external outputs and inputs
2006        // the other fixed length inputs
2007   //** uint32          inputParams[0];         // the fixed length input parameters
2008        //
2009        FSRequestTrailer trailer;
2010   } FSReqExtendedPathOpen, *FSReqExtendedPathOpenPtr;
2011
2012   /*
2013    * FSReqExtendedPathClose, an extended request to close a path. Actually, just
2014    * dispose of and clean up after a PathObjID created by a FSReqExtendedPathOpen
2015    * request.
2016    */
2017   typedef struct FSReqExtendedPathClose {
2018       FSRequestHeader header;     // header.prmCommandID = kExtendedPathClose
2019       OSType          extensionID;           // What extension should handle this
2020       uint32          actionCode;            // What should it do
2021       // the target
2022       PathObjID       thePath;
2023       // the output
2024       uint32*         theOutput;             // the one, cheap, output
2025       // the extenal inputs and outputs (those not in the message proper)
2026       uint16          outputCount;           // the number of outputs
2027       uint16          inputCount;            // the number of inputs not in message
2028   //** BufferDescriptor externalParams[0];    // a list of the remaining external outputs and inputs
2029       // the other fixed length inputs
2030   //** uint32          inputParams[0];        // the fixed length input parameters
2031       //
2032       FSRequestTrailer trailer;              // MUST be 32 bit aligned!
2033   } FSReqExtendedPathClose, *FSReqExtendedPathClosePtr;
2034
2035   /*
2036    * FSReqExtendedPathRequest an extended request for a path. The given PathObjID
2037    * may or may not have been created with a FSReqExtendedPathOpen request, depending
2038    * on the specific Extension involved.
2039    */
2040   typedef struct FSReqExtendedPathRequest {
2041       FSRequestHeader header;     // header.prmCommandID = kExtendedPathRequest
2042       OSType          extensionID;           // What extension should handle this
2043       uint32          actionCode;            // What should it do
2044       // the target
2045       PathObjID       thePath;
2046       // the output
2047       uint32*         theOutput;             // the one, cheap, output
2048       // the extenal inputs and outputs (those not in the message proper)
2049       uint16          outputCount;           // the number of outputs
2050       uint16          inputCount;            // the number of inputs not in message
```

```
2051  //** BufferDescriptor          externalParams[0];  // a list of the remaining external outputs and inputs
2052  // the other fixed length inputs
2053  //** uint32                     inputParams[0];     // the fixed length input parameters
2054  //
2055  FSRequestTrailer              trailer;             // MUST be 32 bit aligned!
2056  } FSReqExtendedPathRequest, *FSReqExtendedPathRequestPtr;
2057
2058  /*
2059   * Backing Store Requests
2060   */
2061
2062  /*
2063   * FSReqBackingStoreCreate creates a BackingObjectID which can be used to map
2064   * the indicated fork.
2065   */
2066  typedef struct FSReqBackingStoreCreate {
2067      FSRequestHeader           header;  // header.prmCommandID = kBackingStoreCreate
2068      // the target & output
2069      BackingObjectID*          theStore;
2070      // the inputs
2071      FSSpecification           theFile;
2072      ForkNum                   theFork;
2073      uint32                    options;
2074      //
2075      FSRequestTrailer          trailer;
2076  } FSReqBackingStoreCreate, *FSReqBackingStoreCreatePtr;
2077
2078  /*
2079   * FSReqBackingStoreDispose Disposes of a BackingObjectID which was provided by the
2080   * File Manager.
2081   */
2082  typedef struct FSReqBackingStoreDispose {
2083      FSRequestHeader           header;  // header.prmCommandID = kBackingStoreDispose
2084      // the target & output
2085      BackingObjectID           theStore;
2086      //
2087      FSRequestTrailer          trailer;
2088  } FSReqBackingStoreDispose, *FSReqBackingStoreDisposePtr;
2089
2090  /*
2091   *
2092   */
2093  typedef union {
2094      FSRequestHeader           header;
2095      FSReqPathOpen             PathOpen;
2096      FSReqPathClose            PathClose;
2097      FSReqPathRead             PathRead;
```

```
2101    FSReqPathWrite          PathWrite;
2102    FSReqPathLockRange      PathLockRange;
2103    FSReqPathUnlockRange    PathUnlockRange;
2104    FSReqPathGetPosition    PathGetPosition;
2105    FSReqPathSetPosition    PathSetPosition;
2106    FSReqPathGetEOF         PathGetEOF;
2107    FSReqPathSetEOF         PathSetEOF;
2108    FSReqPathAllocate       PathAllocate;
2109    FSReqPathRelease        PathRelease;
2110
2111    FSReqForkFlush          ForkFlush;
2112    FSReqFileFlush          FileFlush;
2113    FSReqVolumeFlush        VolumeFlush;
2114    //..    FSReqCacheAdvise    CacheAdvise;
2115
2116    FSReqIteratorCreate     IteratorCreate;
2117    FSReqIteratorDispose    IteratorDispose;
2118    FSReqIterate            Iterate;
2119    FSReqSearch             Search;
2120    FSReqAttributesGet      AttributesGet;
2121    FSReqAttributesSet      AttributesSet;
2122    FSReqAttributesGetBulk  AttributesGetBulk;
2123    FSReqAttributesGetSize  AttributesGetSize;
2124    FSReqAttributesGetBulkFiltered  AttributesGetBulkFiltered;
2125    FSReqTestEntity         TestEntity;
2126    FSReqEntityType         EntityType;
2127
2128    FSReqVolumeCreate           VolumeCreate;
2129    FSReqVolumeGetCapability    VolumeGetCapability;
2130    FSReqVolumeMount            VolumeMount;
2131    FSReqVolumeUnmount          VolumeUnmount;
2132    FSReqVolumeEject            VolumeEject;
2133    FSReqVolumeOffline          VolumeOffline;
2134    FSReqVolumeGetRemountSize   VolumeGetRemountSize;
2135    FSReqVolumeGetRemountData   VolumeGetRemountData;
2136    FSReqVolumeRemount          VolumeRemount;
2137
2138
2139    FSReqDirectoryCreate    DirectoryCreate;
2140
2141    FSReqFileCreate         FileCreate;
2142    FSReqForkAttributesGet      ForkAttributesGet;
2143    FSReqForkAttributesSet      ForkAttributesSet;
2144    FSReqForkAttributesGetSize  ForkAttributesGetSize;
2145    FSReqForkCreate         ForkCreate;
2146    FSReqForkDelete         ForkDelete;
2147
2148    FSReqFileClassAttributesGet     FileClassAttributesGet;
2149    FSReqFileClassAttributesSet     FileClassAttributesSet;
2150    FSReqFileClassAttributesGetSize FileClassAttributesGetSize;
```

```
2151    FSReqFileClassIteratorCreate        FileClassIteratorCreate;
2152    FSReqFileClassIteratorDispose       FileClassIteratorDispose;
2153    FSReqFileClassIterate               FileClassIterate;
2154
2155    FSReqDelete                         Delete;
2156    FSReqExchange                       Exchange;
2157    FSReqMoveRename                     MoveRename;
2158    FSReqCopyRename                     CopyRename;
2159    FSReqDirectoryGetCurrent            DirectoryGetCurrent;
2160    FSReqDirectorySetCurrent            DirectorySetCurrent;
2161    FSReqGetFilesystemVersion           GetFilesystemVersion;
2162
2163    FSReqPermissionIteratorCreate       PermissionIteratorCreate;
2164    FSReqPermissionIteratorDispose      PermissionIteratorDispose;
2165    FSReqPermissionsIterate             PermissionsIterate;
2166    FSReqPermissionSearch               PermissionSearch;
2167    FSReqPermissionAdd                  PermissionAdd;
2168    FSReqPermissionChange               PermissionChange;
2169    FSReqPermissionDelete               PermissionDelete;
2170    FSReqPermissionGet                  PermissionGet;
2171    FSReqPermissionGetNative            PermissionGetNative;
2172    FSReqPermissionSetNative            PermissionSetNative;
2173
2174    FSReqFileGetIDFromFSSpec            FileGetIDFromFSSpec;
2175    FSReqFileGetFSSFromID               FileGetFSSFromID;
2176    FSReqPathnameResolve                PathnameResolve;
2177
2178    FSReqNotificationQueueCreate        NotificationQueueCreate;
2179    FSReqNotificationQueueDispose       NotificationQueueDispose;
2180    FSReqNotificationSubscribe          NotificationSubscribe;
2181    FSReqNotificationUnsubscribe        NotificationUnsubscribe;
2182    FSReqNotificationGetEvent           NotificationGetEvent;
2183
2184    FSReqExtendedRequest                ExtendedRequest;
2185    FSReqExtendedVolumeMount            ExtendedVolumeMount;
2186    FSReqExtendedVolumeUnmount          ExtendedVolumeUnmount;
2187    FSReqExtendedVolumeRequest          ExtendedVolumeRequest;
2188    FSReqExtendedPathOpen               ExtendedPathOpen;
2189    FSReqExtendedPathClose              ExtendedPathClose;
2190    FSReqExtendedPathRequest            ExtendedPathRequest;
2191
2192    FSReqBackingStoreCreate             BackingStoreCreate;
2193    FSReqBackingStoreDispose            BackingStoreDispose;
2194
2195    } FSRequest, *FSRequestPtr;
2196
2197    #endif // __FSREQUESTS__
```

Attorney Docket No. P1305:064

APPENDIX B

"FSTypes.h", May 1994

```
1   /*
2        File:       FSTypes.h
3
4        Contains:   All types and constants which are part of the public File Manager API
5
6        Copyright:  © 1992-1994 by Apple Computer, Inc., all rights reserved.
7
8   */
9
10  #ifndef __FSTYPES__
11  #define __FSTYPES__
12
13  #ifndef __MORETYPES__
14  #include <MoreTypes.h>
15  #endif
16  #ifndef __KernelTypes__
17  #include <KernelTypes.h>
18  #endif
19
20  /*-----------------------------------------------------------------------*/
21  /* CONSTANTS:                                                             */
22  /*-----------------------------------------------------------------------*/
23  // The following are all of the constant which are used in this API design.
24
25  /*
26   * PositionMode is used do describe how the posOffset field in a
27   * ForkPositionDescriptor is to be interpreted.
28   */
29  typedef enum {
30      kFSAtMark           = 0,            // ignore offset, use current position
31      kFSFromStart        = 1,            // offset relative to start of file
32      kFSFromLEOF         = 2,            // offset relative to end of file
33      kFSFromMark         = 3             // offset relative to current position
34  };
35  typedef uint16 PositionMode;
36
37  /*
38   *      Path lock options
39   */
40  enum {
41      kFSRangeLockMask    = 0x00000001,   // 1 = write lock, 0 = read lock
42      kFSRangeReadLock    = 0x00000000,
43      kFSRangeWriteLock   = 0x00000001
44  };
45
46  /*
47   * AllocationMode is used to indicate how new disk space should be
48   * allocated to a Fork when it grows.
49   */
50  typedef enum {
```

```
51      kFSAllocAny                 = 0,    // allocate new blocks anywhere
52      kFSAllocContiguous          = 1     // allocate blocks only if contiguous
53    };
54    typedef uint16 AllocationMode;
55
56    /*
57     * CacheOperation is used to indicate what action is to be performed
58     * on a set of cache entries and/or to indicate how the user expects
59     * to use a range of entries in the future.
60     */
61    typedef enum {
62      kFSCacheWrite               = 0,    // write entry out at earliest convenience
63      kFSCacheInvalidate,                 // invalidate entry without writing
64      kFSCacheRelease,                    // entries will not be used again soon
65      kFSCacheMaintain                    // entries will be used again soon
66    };
67    typedef uint16 CacheOperation;
68
69    /*
70     * CachePriority is used to indicate how important it is for the Filesystem
71     * to keep specific data in memory. There are three steps, based on how
72     * likely it is that the data will be accessed again.
73     */
74    typedef enum {
75      kFSCacheWillNeedAgain       = 0x01, // The data is likely to be needed again
76      kFSCacheMayNeedAgain        = 0x00, // It is undetermined if the data will be needed again.
77      kFSCacheWillNotNeedAgain    = 0x11  // The data is not expected to be needed again
78    };
79    typedef uint16 CachePriority;
80
81    /*
82     * Used to indicate the type of an entity in the filesystem.
83     */
84    typedef enum {
85      kFSIsAFile                  = 0x01, // Entity is a File
86      kFSIsADirectory             = 0x02, // Entity is a Directory
87      kFSIsAVolume                = 0x3,  // Entity is a Mounted Volume
88      kFSIsTheMetaRoot            = 0x4,  // Entity is the Metaroot
89      kFSEntityMask               = 0x7   // Entity is a 3 bit datum merged into other datums
90    };
91    typedef uint16 FSEntityType;
92
93    /*
94     * FSIterationOperation is used to indicate how a Filesystem Iterator
95     * is to be moved within the filesystem.
96     */
97    typedef enum {
98      //
99      // Absolute locations
```

```
101 //
102 kFSIterFMRoot            = 0xFF01,   // go to the filesystem "meta" root
103 //
104 kFSIterBootVolume        = 0xFF11,   // go to Boot Volume
105 kFSIterSystemFolder      = 0xFF12,   // go to Boot Volume's System Folder
106 kFSIterAppleMenuFolder   = 0xFF13,   // go to Boot Volume's Apple Menu Folder
107 kFSIterControlPanelFolder = 0xFF14,  // go to Boot Volume's Control Panel Folder
108 kFSIterExtensionFolder   = 0xFF15,   // go to Boot Volume's Extension Folder
109 kFSIterFontsFolder       = 0xFF16,   // go to Boot Volume's Fonts Folder
110 kFSIterPreferencesFolder = 0xFF17,   // go to Boot Volume's Preferences Folder
111 kFSIterPrintMonitorDocsFolder = 0xFF18, // go to Boot Volume's Print Monitor Docs Folder
112 kFSIterStartupFolder     = 0xFF19,   // go to Boot Volume's Startup Folder
113 //
114 kFSIterVolumeRoot        = 0xFF31,   // go to this volume's root
115 kFSIterDesktopFolder     = 0xFF32,   // go to this volume's Desktop Folder
116 kFSIterTemporaryFolder   = 0xFF33,   // go to this volume's Temporary Folder
117 kFSIterTrashFolder       = 0xFF34,   // go to this volume's Trash Folder
118 kFSIterWhereToEmptyTrashFolder = 0xFF35, // go to this volume's "Where To Empty Trash" Folder
119 //
120 // "Upward" movement
121 //
122 kFSIterParent            = 0x0100,   // go to parent of current entity
123 //
124 // "Downward" movement
125 //
126 kFSIterFirstChild        = 0x1100,   // go to first child of current entity
127 kFSIterFirstChildFile    = (kFSIterFirstChild | kFSIsAFile),       // first file
128 kFSIterFirstChildDir     = (kFSIterFirstChild | kFSIsADirectory),  // first directory
129 kFSIterLastChild         = 0x1200,   // go to last child of current entity
130 kFSIterLastChildFile     = (kFSIterLastChild | kFSIsAFile),        // last file
131 kFSIterLastChildDir      = (kFSIterLastChild | kFSIsADirectory),   // last directory
132 //
133 // Lateral movement
134 //
135 kFSIterNextSibling       = 0x2100,   // go to next entity in same directory
136 kFSIterNextFile          = (kFSIterNextSibling | kFSIsAFile),      // next file
137 kFSIterNextDir           = (kFSIterNextSibling | kFSIsADirectory), // next directory
138 kFSIterPrevSibling       = 0x2200,   // go to previous entity in same directory
139 kFSIterPrevFile          = (kFSIterPrevSibling | kFSIsAFile),      // previous file
140 kFSIterPrevDir           = (kFSIterPrevSibling | kFSIsADirectory), // previous directory
141 //
142 // Aggregate movement
143 //
144 kFSIterChildren          = 0x8100,   // Start iteration over all objects with a child relationship to
145                                      //   the current node. The order is not guaranteed.
146 kFSIterChildrenFile      = (kFSIterChildren | kFSIsAFile),      // only file entities
147 kFSIterChildrenDir       = (kFSIterChildren | kFSIsADirectory), // only directory entities
148
149 kFSIterSubtree           = 0x8200,   // Start iteration over all objects in the subtree below
150                                      //   the current node. The order is not guaranteed.
```

```
151     kFSIterSubtreeFile      = (kFSIterSubtree | kFSIsAFile),       // only file entities
152     kFSIterSubtreeDir       = (kFSIterSubtree | kFSIsADirectory),  // only directory entities
153
154     kFSIterContinue         = 0x0001    // move to next entity along the route specified by the previous
                                            //    operation
156     };
157 typedef uint16 FSIterationOperation;
158
159 /*
160  * ClassIterationOperation is use to indicate how a FileClass Iterator
161  * is to be moved through the database of FileClass'
162  */
163
164 typedef enum {
165     kFSClassOpThis          = 1,    // go here
166     kFSClassOpFirst,                // go to first class which has any attributes
167     kFSClassOpNext,                 // go to next class
168     kFSClassOpNextSameType,         // go to next class with same type
169     kFSClassOpNextSameCreator       // go to next class with same creator
170
171     };
172 typedef uint16 ClassIterationOperation;
173
174 /*
175  * PermissionOperation is used to indicate how a Permission
176  * Iterator is to be moved within a list of permissions.
177  */
178 typedef enum {
179     kFSPermOpThis           = 1,    // stay on current entry
180     kFSPermOpDefault,               // go to the default permissions entry
181     kFSPermOpFirst,                 // go to the first entry in the list
182     kFSPermOpFirstUser,             // go to the first individual user entry
183     kFSPermOpFirstGroup,            // go to the first group entry
184     kFSPermOpNext,                  // go to the next entry in the list
185     kFSPermOpNextUser,              // go to the next individual user entry
186     kFSPermOpNextGroup              // go to the next group entry
187     };
188 typedef uint16 PermissionOperation;
189
190 /*
191  * FormatOperationMask is used to indicate which operations
192  * are to be performed by a NewVolume call.
193  */
194 typedef enum {
195     kFSFormatDisk           = 0x01, // do a raw format of the volume
196     kFSVerifyDisk           = 0x02, // verify the format of a volume
197     kFSZeroDisk             = 0x04, // erase the contents of a volume
198     kFSInitializeDisk       = 0xff  // do a complete initialization
199     };
200 typedef uint16 FormatOperationMask;
```

```
    kFMMetaRootID                   = 0,         // Metaroot's volume object ID
    kFMMetaRoot                     = 1,         // Metaroot's directory number
    kFSPathNameSeparator            = 0x003A     // ':'
};

/*
 * FSAttribute Constants:
 * Used to indicate an attribute of a filesystem object. Attributes
 * include both the standard information (available by GetInfo calls)
 * and any extended information which has been added to the filesystem.
 * Values which contain lower case letters are reserved by Apple,
 * and values which contain nil characters are illegal.
 *
 * The structure of an FSAttribute is two OSTypes. The "high order"
 * OSType defines the service which "owns" the attribute, and the
 * low order OSType specifies which of that services attributes it is.
 */

/* FSAttribute Services */
typedef enum {
    kSpecialAttribute           = '\0\0\0\1',    // chosen for its illegality for real attributes
    kAnyServiceID               = '****',        // Wild card to match any service ID
    kFileManagerAttribute       = 'fmgr',
    kFinderAttribute            = 'fndr',
    kHFSAttribute               = 'hfs ',
    kPermissionsAttribute       = 'perm',
    kFileShareAttribute         = 'fshr'         // File Share (i.e. AppleShare PDS)
};

/* FSAttribute Attributes, by service */
typedef enum {
    /* kSpecialAttribute attributes */
    /* the following three "attributes" are not attributes at all, but can be */
    /* requested like attributes to get detailed information about errors */
    /* encountered getting a list of attributes. Each is a bit map, starting with */
    /* the msb, of information about each attribute requested in the list */
    kAttrOverrun                = 'over',        // Bit Map of Attributes which are
                                                 // longer than buffer
    kAttrUnderflow              = 'undr',        // Bit Map of Attributes which are
                                                 // shorter than buffer
    kAttrNotFound               = 'nfnd',        // Bit Map of Attributes which are
                                                 // not found
    kAttrReadOnly               = 'ronl',        // Bit Map of Attributes which
                                                 // attempted to change "read-only"
                                                 // attribute.

/* kFileManagerAttribute ('fmgr') attributes */
    kAnyServiceAttribute        = '****',        // Wild card to match any service attribute
```

```
251  kFSDriveID                          = 'DrvN',
252  kFSPartitionID                      = 'PrtN',
253  kFSVolumeBlockSize                  = 'VBSz',
254  kFSTotalFiles                       = 'TFil',
255  kFSTotalDirectories                 = 'TDir',
256  kFSNumberOfFiles                    = 'NFil',
257  kFSNumberOfDirectories              = 'NDir',
258  kFSCreationDate                     = 'CrDt',
259  kFSModificationDate                 = 'MdDt',
260  kFSBackupDate                       = 'BkDt',
261  kFSName                             = 'Name',
262  kFSParentID                         = 'PrID',
263  kFSDirectoryNum                     = 'DrID',
264  kFSFileNum                          = 'FlID',
265  kFSType                             = 'Type',
266  kFSCreator                          = 'Crtr',
267  kFSForkType                         = 'FKTy',
268  kFirstAllocationBlock               = 'FBlk',
269  kFSLogicalSize                      = 'Size',
270  kFSPhysicalSize                     = 'Stor',
271  kFSKind                             = 'kind',
272  kFSLoginName                        = 'logn',
273  kFSLoginMethod                      = 'lmtd',
274  kAppleMenuFolderDirNum              = 'amnu',
275  kControlPanelFolderDirNum           = 'ctrl',
276  kDesktopFolderDirNum                = 'desk',
277  kExtensionFolderDirNum              = 'extn',
278  kPreferencesFolderDirNum            = 'pref',
279  kPrintMonitorDocsFolderDirNum       = 'prnt',
280  kWhereToEmptyTrashFolderDirNum      = 'empt',
281  kTrashFolderDirNum                  = 'trsh',
282  kStartupFolderDirNum                = 'strt',
283  kSystemFolderDirNum                 = 'macs',
284  kTemporaryFolderDirNum              = 'temp',
285  kFSSpecification                    = 'fspc',
286  kFSVersionNumber                    = 'Ver#',
287
288  /* kFinderAttribute ('fndr') attributes */
289  kFSComment                          = 'Cmt',
290  kFSApplInfo                         = 'ApIn',
291  kFSIconTypes                        = 'ITps',
292  kFSIconList                         = 'icn#',
293  kFS4BitIcon                         = 'icl4',
294  kFS8BitIcon                         = 'icl8',
295  kFSSmallIconList                    = 'ics#',
296  kFS4BitSmallIcon                    = 'ics4',
297  kFS8BitSmallIcon                    = 'ics8',
298  kFSCommentID                        = 'CtID',
299  kFSIconID                           = 'IcID',
300  kFSPutAwayDirectory                 = 'PtDr',
```

```
301   kFSLocation                                      = 'Locn',
302   kFSDirectoryRect                                 = 'DrRt',
303   kFSDirectoryView                                 = 'View',
304   kFSFinderFlags                                   = 'FFlg',
305   kFSExtendedFinderFlags                           = 'XFFg',
306   kFSScriptFlag                                    = 'sflg',
307   kFSDirectoryScrollPos                            = 'DrSP',
308   kFSDirectoryOpenChain                            = 'DrOC'
309   };
310   /* kHFSAttribute ('hfs') attributes */
311   kFSVolumeBitmapBlock                             = 'VBbl',   // Returns back a short
312   kFSNextAllocationBlock                           = 'NAbl',   // Returns back a short
313   kFSNumAllocationBlocks                           = 'NAnb',   // Returns back a short
314   kFSAllocationBlockSize                           = 'AblS',   // Returns back a long
315   kFSDefaultClumpSize                              = 'CpSz',   // Returns back a long
316   kFSVolumeBlockmapBlock                           = 'VBmb',   // Returns back a short
317   kFSNextCatalogNodeID                             = 'NCNq',   // Returns back a long
318   kFSFreeAllocationBlocks                          = 'NUAb',   // Returns back a short
319   kFSVolumeSignature                               = 'VlSg',   // Returns back a short
320   kFSDriveNumber                                   = 'DvNm',   // Returns back a short
321   kFSDriverReferenceNum                            = 'DrvN',   // Returns back a short
322   kFSFileSystemID                                  = 'FSID',   // Returns back a short
323   kFSVolumeSequenceNum                             = 'VSqN',   // Returns back a short
324   kFSWriteCount                                    = 'WrCt',   // Returns back a long
325   kFSVolumeAttribute                               = 'VAtr',   // Returns back a short
326   };
327
328   /*
329   * Currently defined ForkNum's
330   */
331   typedef enum {
332   kFSResourceFork                                  = 'rsrc',
333   kFSDataFork                                      = 'data'
334   };
335
336   /*
337   * Currently defined Fork Formats
338   */
339   typedef enum {
340   kFSResourceFormat                                = 'rsrc',
341   kFSStreamFormat                                  = 'strm',
342   kFSBTreeFormat                                   = 'btre'
343   };
344
345   /*
346   * FSSearchOperator
347   */
348   typedef enum {
349   kFSNot                                           = 0x8000,   // Unary Operator
350
```

```
351     kFSAnd                  = 0x0001,
352     kFSNand                 = 0x8001,
353     kFSOr                   = 0x0002,
354     kFSNor                  = 0x8002,
355     kFSEqual                = 0x0011,
356     kFSNotEqual             = 0x8011,
357     kFSGreaterThan          = 0x0012,
358     kFSLessOrEqual          = 0x8012,
359     kFSLessThan             = 0x0013,
360     kFSGreaterOrEqual       = 0x8013,
361     kFSContains             = 0x0024,
362     kFSDoesntContain        = 0x8024,
363     kFSStartsWith           = 0x0025,
364     kFSDoesntStartWith      = 0x8025,
365     kFSEndsWith             = 0x0026,
366     kFSDoesntEndsWith       = 0x8026,
367     kFSExists               = 0x0031,   // Unary Operator, FSAttribute as paramter
368     kFSDoesntExist          = 0x8031,   // Unary Operator, FSAttribute as paramter
369     };
370     /*
371     * modifiers for FSSearchOperators
372     */
373
374     typedef enum {
375         kIgnoreCase             = 0x0800,
376         kIgnoreDiacriticals     = 0x0400
377     };
378
379     typedef uint16 FSSearchOperator;
380
381     /*
382     * FSDataType
383     */
384     enum {
385         kFSNoDataType           = 0,
386
387     //** bitfields would be nice, but what grammar
388
389         kFSDTuint8,
390         kFSDTuint8,
391         kFSDTuint16,
392         kFSDTuint16,
393         kFSDTuint32,
394         kFSDTuint32,
395         kFSDTuint64,
396         kFSDTuint64,
397         kFSDTPStr,
398         kFSDTCStr,
399         kFSDTUniStr,            // 255 is maximum length
400         kFSDTUniStr,
```

```
401     kFSDTDirectoryNum,
402     kFSDTFileNum,
403     kFSDTForkNum,
404     kFSDTFSName,
405     kFSDTFSDate,
406     kFSDTFileSystemKind,
407     kFSDTFSPermission,     //... needed? How would I Search for all files I can delete older than some date?
408
409     kFSDataTypeMask                 = 0x7F,
410     kFSOperandIsAttribute           = 0x80
411 };
412 typedef uint8 FSDataType;
413
414 /*
415  * FSChangeEvent defines the types of changes which can happen to the filesystem.
416  */
417 typedef enum {
418     kFSSubscriptionChanged          = 0x00,
419     kFSFileCreated                  = 0x01,
420     kFSFileDeleted                  = 0x02,
421     kFSFileMoved                    = 0x03,
422     kFSFileRenamed                  = 0x04,
423     kFSFileMoveRenamed              = 0x05,
424     kFSFileRead                     = 0x06,
425     kFSFileWritten                  = 0x07,
426     kFSFileSizeChanged              = 0x08,
427     kFSFilePermChanged              = 0x09,
428     kFSFileInfoChanged              = 0x0A,
429     kFSDirCreated                   = 0x11,
430     kFSDirDeleted                   = 0x12,
431     kFSDirMoved                     = 0x13,
432     kFSDirRenamed                   = 0x14,
433     kFSDirMoveRenamed               = 0x15,
434     kFSDirContentsSeen              = 0x16,
435     kFSDirContentsChanged           = 0x17,
436     kFSDirPermChanged               = 0x19,
437     kFSDirInfoChanged               = 0x1A,
438     kFSVolMounted                   = 0x21,
439     kFSVolUnmounted                 = 0x22,
440     kFSVolInfoChanged               = 0x2A,
441     kFSVolOnline                    = 0x2B,
442     kFSVolOffline                   = 0x2C
443 };
444 #define kMaxChangeEvent kFSVolOffline
445 typedef uint16 FSChangeEvent;
446
447 /*
448  * NTReportScope defines the scope of how changed can be reported.
449  * A change to a file or a directory can be reported on the object
450  * itself, on the directory which contains the object, or on the
```

```
451    * volume which contains the object.
452    */
453   typedef enum {
454       kFSReportOnObject          = 0x1000,
455       kFSReportOnDirectory       = 0x2000,
456       kFSReportOnVolume          = 0x4000
457   };
458   typedef uint16 FSChangeReportScope;
459
460   /*
461    *   Notification subscribe options
462    */
463   enum {
464       kCollapseNotification      = 0x00000001    // 1 = collapse, 0 = all events
465   };
466
467   /*----------------------------------------------------------------------
468    * BTree Access Constants
469    */
470
471   /*
472    * BTSetRecordMode is used do describe how a record is to be set in a BTree.
473    * Currently, the only options control how the call reacts to the presence
474    * or absense of a record already in the BTree with the same key. If the
475    * requested state is NOT true, then an exception is raised.
476    */
477   typedef enum {
478       kFSRecordMustExist         = 0x01,
479       kFSRecordMayExist          = 0x02,
480       kFSRecordMustNotExist      = 0x03
481   };
482   typedef uint16 BTSetRecordMode;
483
484   /*----------------------------------------------------------------------
485    * Access Control Constants
486    * The following types are used to control access to objects in the filesystem.
487    */
488
489   /*
490    * CommonPermissions is used to describe those permissions which are common
491    * to all entities in the filesystem.
492    */
493   typedef enum {
494       kFSVisible                 = 0x01,    // can be seen
495       kFSCanDelete               = 0x02,    // can be deleted
496       kFSChangePath              = 0x04,    // can change its location
497       kFSChangeName              = 0x08,    // can change its name
498       kFSChangePerm              = 0x10,    // can change permissions
499       kFSChangeInfo              = 0x20,    // can change its other info
500   };
```

```
typedef   uint8   CommonPermissions;

/*
 * FilePermissions is used to describe those permissions which are
 * particular to files. It is employed both to maintain the persistent
 * permissions of a file and the access rights associated with a Path.
 */
typedef enum {
    kFSRead         = 0x01,    // can read data in file
    kFSWrite        = 0x02,    // can write data to file
    kFSExtend       = 0x04,    // can increase allocation of file
    kFSTruncate     = 0x08,    // can decrease allocation of file
    kFSExecute      = 0x10     // can execute code from file
};
typedef   uint8   FilePermissions;

/*
 * DirectoryPermissions is used to describe those permissions which are
 * particular to directories. In general, these are transitive permissions
 * which are applied to the contents of the directory. Thus to move a file
 * from one directory to another, you must have kFSChangePath permission
 * on the file itself, kFSRemoveEntity on its current directory, and
 * kFSAddEntity on the directory you are moving it to.
 */
typedef enum {
    kFSSeeFiles        = 0x01,    // can see files inside
    kFSSeeDirectories  = 0x02,    // can see folders inside
    kFSAddEntity       = 0x04,    // can add new entities
    kFSRemoveEntity    = 0x08,    // can remove existing entities
    kFSRenameEntity    = 0x10     // can rename an entity
};
typedef   uint8   DirectoryPermissions;

/*
 * VolumePermissions is used to describe those permissions which are
 * particular to volumes. It is only employed to maintain access rights
 * associated with a mounted volume (i.e.there is no persistent meaning of
 * volume permissions). Some explaination of volume structures is needed. These
 * are the structures which makes a datastore a volume format. For HFS, this
 * would be information stored in the MDB, Volume BitMap, Catalog File, Extents
 * File, etc.
 */
//.........
// I don't like the suffix 'VolumeStructures'. Does anyone have a better suffix?
//.........
typedef enum {
    kFSReadEntities         = 0x01,    // allow non-distructive entity messages
    kFSWriteEntities        = 0x02,    // allow change entity messages
    kFSReadVolumeStructures = 0x04,    // allow messages which read structures that makes a device a volume
    kFSWriteVolumeStructures = 0x08,   // allow messages which modify structures that makes a device a
```

```
552     kFSVolUnavailable              = 0x10      // allow messages which makes volume unavailable
553   };
554   typedef  uint8 VolumePermissions;
555
556   /*-----------------------------------------------------------------------------------*/
557   /* TYPES:                                                                            */
558   /*-----------------------------------------------------------------------------------*/
559
560
561   /*------------------*
562    * Foundation Types
563    *------------------*/
564
565   typedef EventNotification *EventNotificationPtr;   // get NuKernel to add this
566
567   /*
568    * FileSystemKind is used to indicate a type of filesystem.
569    * Apple reserves values with all lower case letters, and
570    * those whose first two bytes are nil (for compatibility
571    * with old FSID's)
572    */
573   typedef OSType FileSystemKind;
574
575   /*
576    * FSAgentObjID is used to indicate a specific registered FS Agent.
577    * This value is not persistent across rebooting the machine or
578    * re-registering the given agent. It is in fact an object ID to
579    * which requests for the given agent should be sent.
580    */
581   typedef ObjectID FSAgentObjID;
582
583   /*
584    * VolumeObjID is used to indicate a specific mounted volume.
585    * This value is not persistent across rebooting the machine
586    * or remounting a given volume. It is in fact an object ID to
587    * which requests for the given volume should be sent.
588    */
589   typedef ObjectID VolumeObjID;
590
591   /*
592    * PathObjID is used to indicate a specific access path to a
593    * specific fork of a file. This value is session relative and
594    * not persistent between invocations of an application. It is
595    * in fact an object ID to which requests for the given path
596    * should be sent.
597    */
598   typedef ObjectID PathObjID;
599
600   /*
```

```
601  /*
602   * BTreeObjID is used to indicate a access path using the
603   * BTree access method to a specific fork of a file. This value
604   * is session relative and not persistent between invocations of
605   * an application. It is in fact an object ID to which requests
606   * for the given path should be sent.
607   */
608  typedef ObjectID BTreeObjID;
609
610  /*
611   * FSAccessIdentity is used to indicate the persistent identity of
612   * a specific user or of a defined group of users.
613   */
614  typedef   uint32 FSAccessIdentity;
615
616  /*
617   * DirectoryNum is used to indicate a specific Directory within a
618   * particular volume. This is a persistent value, relative to
619   * the particular volume.
620   */
621  typedef   uint32 DirectoryNum;
622
623  /*
624   * FileNum is used to indicate a specific File within a particular
625   * volume. This is a persistent value, relative to the particular
626   * volume.
627   */
628  typedef   uint32 FileNum;
629
630  /*
631   * ForkNum is used to indicate a specific Fork within a
632   * particular File. This is a persistent value, relative to the
633   * particular file.
634   */
635  typedef   OSType ForkNum;
636
637  //   This dates need to be thought out. What is the correct size of the
638  //:  datum? Should it be scalar? What is the epoch of the date? What is
639  //*  the precision of the date (e.g. seconds since epoch)?
640
641  typedef uint32 FSDate;
642
643  /*
644   * NotificationObjID is the ID by which a NotificatioQueue is referenced
645   */
646  typedef ObjectID NotificationObjID;
647
648  /*
649   * FSAttribute is used to indicate an attribute of a filesystem object.
650   * The structure of an FSAttribute is two OSTypes. The "high order"
```

```
651  * OSType defines the service which "owns" the attribute, and the
652  * low order OSType specifies which of that services attributes it is.
653  */
654
655  typedef struct FSAttribute{
656      OSType          service;
657      OSType          attribute;
658  }FSAttribute, *FSAttributePtr;
659
660  /*
661   * FSAttributeDescriptor is used to describe a single attribute which is
662   * to be transferred into or out of a part of a user's buffer.
663   */
664
665  typedef struct FSAttributeDescriptor {
666      FSAttribute     attribute;
667      uint32          length;
668      uint32          offset;
669  }FSAttributeDescriptor, *FSAttributeDescriptorPtr;
670
671  /*----------------------------------------------------------------
672   * File Specification Types
673   */
674
675  /*
676   * FSObjectInfo is used to get generic information about an object in
677   * a filesystem.
678   */
679
680  typedef struct {
681      unsigned int    entityType:3;       // use FSEntityType constants
682      unsigned int    isVolumeRoot:1;     // true if it is the root of a volume
683      unsigned int    isFMRoot:1;         // true if it is the FileManager's "meta" root
684      unsigned int    isBoot:1;           // true if it is (or is on) the Boot Volume
685      unsigned int    reserved:26;
686  } FSObjectInfo;
687
688  /*
689   * FSName is used to indicate the name of a File or Directory.
690   */
691  typedef UniChar FSName[32], *FSNamePtr;
692
693  /*
694   * FSPath is used to indicate a complete or partial pathname of
695   * a File or Directory.
696   */
697  typedef UniChar* FSPath;
698
699  /*
700   * FSSpecification is used to indicate a particular File or Directory.
```

```
701  /*
702   * A proper FSSpecification has only a single name in its name field.
703   */
704  typedef struct FSSpecification {
705      VolumeObjID      volume;
706      DirectoryNum     parentDirectory;
707      FSName           name;
708  } FSSpecification, *FSSpecificationPtr;
709  /*
710   * PathSpecification is used to indicate a particular File or Directory using
711   * a partial or complete pathname. A PathSpecification must be converted into a
712   * FSSpecification before it can be used by most requests. The 512 character
713   * limit implied by the definition of an FSPath, is a limit only to the size
714   * of this datatype. Users may in fact allocate larger structures with longer
715   * paths and the filesystem will handle them correctly.
716   */
717  typedef struct PathSpecification{
718      VolumeObjID      volume;
719      DirectoryNum     parentDirectory;
720      FSPath           name;
721  } PathSpecification, *PathSpecificationPtr;
722  /*
723   * FSIterator is used to iterate over Files and Directories in the filesystem.
724   * Since the first element of this structure is an FSSpecification, it can be
725   * used in all places where FSSpecification's can be used.
726   */
727  typedef struct {
728      FSSpecification  specification;
729      FSObjectInfo     info;
730      void *           reserved;     // the iterator object ID
731  } FSIterator, *FSIteratorPtr;
732  /*
733   * FileClass is used to specify a class of files which may share some common
734   * attributes.
735   */
736  typedef struct {
737      OSType           type;
738      OSType           creator;
739  } FileClass, *FileClassPtr;
740  /*
741   * FileClassIterator is used to iterate over those FileClasses which have
742   * defined attributes. Other file classes may exist in the system which are
743   * unreachable by a FileClassIterator because they are undistinguished.
744   */
745  typedef struct {
746      FileClass        class;
747      void*            reserved;
748  
749  
750  
```

```
751     ) FileClassIterator, *FileClassIteratorPtr;
752
753
754   /*-----------------------------------------------------------------
755    * Permission and Access Types
756    */
757
758   /*
759    * IOPermission is used to describe the requested and/or actual access rights
760    * of an Access Path to a Fork. The thisPath field specifies what permissions
761    * are associated with the Path itself; and the other fields specify what
762    * access other Paths associated with the same Fork) are allowed to have at
763    * the same time.
764    */
765   typedef struct {
766       FilePermissions     thisPath;          // what this path can do
767       FilePermissions     thisTask;          // what this task can do
768       FilePermissions     thisTeam;          // what other paths in same team can do
769       FilePermissions     thisAddressSpace;  // what other paths in same address space can do
770       FilePermissions     others;            // what anyone else can do.
771   } IOPermission;
772
773   /*
774    * MountPermission is used to describe the requested and/or actual access rights
775    * of a mounted volume.
776    */
777   typedef struct {
778       uint8               reserved;
779       VolumePermissions   thisTask;          // set to NULL
780       VolumePermissions   thisTeam;          // what this task can do
781       VolumePermissions   others;            // what other tasks in same team can do
782   } MountPermission;                         // what anyone else can do.
783
784   /*
785    * FSPermission is used to describe what kinds of actions a particular user or
786    * defined group of users can perform on a particular filesystem object.
787    */
788   typedef struct {
789       CommonPermissions   comPerms;
790       union {
791           FilePermissions      filePerms;
792           DirectoryPermissions dirPerms;
793       )                         entity;
794   } FSPermission;
795
796   /*
797    * PermissionSpecPtr is used to describe a particular permission which is
798    * associated with a File or Directory. The permission field defines what
799    * permission is granted, and the identity field defines what individual user
800    * or defined group received that permission.
```

```
801  typedef struct PermissionSpec {
802      FSAccessIdentity     identity;
803      FSPermission         permission;
804  } PermissionSpec, *PermissionSpecPtr;
805
806  /*
807   * PermissionIterator is used to iterate over the permissions which have been
808   * associated with a File or Directory. Since the first element of this
809   * structure is a PermissionSpec, it can be used in all places where
810   * PermissionSpec's can be used.
811   */
812  typedef struct PermissionIterator {
813      PermissionSpec       permission;
814      uint32               options;
815      void *               reserved;            //** need enum for isGroup
816  } PermissionIterator, *PermissionIteratorPtr;
817
818  /*--------------------------------------------------------------------------
819   * Basic I/O Types
820   */
821
822  /*
823   * ForkPositionDescriptor is used to describe a particular position in a Fork.
824   * In order to support files larger than 4GigaByte, the field posOffsetHigh is
825   * the high order 32 bits of the offset, and posOffsetLow is the low order 32
826   * bits.
827   */
828  typedef struct ForkPositionDescriptor {
829      int64                posOffset;
830      PositionMode         posMode;
831      uint16               filler1;             // because PositionMode is uint16
832  } ForkPositionDescriptor, *ForkPositionDescriptorPtr;
833
834  /*
835   * BufferDescriptor is used to describe an application's buffer for the purposes
836   * of reading and writing
837   */
838  typedef struct BufferDescriptor {
839      uint32               length;
840      void*                buffer;
841  } BufferDescriptor, *BufferDescriptorPtr;
842
843  /*
844   * FSElementDescriptor is used to describe an element within a buffer.
845   */
846  typedef struct {
847      uint32               length;              //** need a better name
848      uint32               offset;
849  } FSElementDescriptor, *FSElementDescriptorPtr;
850
```

```
851  /*
852   * IOOptions is used to define variations on read and write requests. Each option is
853   * commented (in brackets) to indicate if it is applicable to Reads [R], Writes [W],
854   * or Both [RW].
855   */
856  typedef struct IOOptions {
857      unsigned int    cachePriority:2;       // [RW] the priority of the data after the operation
858      unsigned int    forceFlush:1;          // [W] force the data to be written out of cache
859      unsigned int    verifyWrite:1;         // [W] force the flush and then read it back and compare
860      unsigned int    terminatorMode:1;      // [R] reads are terminated by a terminator character
861      unsigned int    unicodeTerminator:1;   // [R] The terminator character is 16 bits
862      unsigned int    reserved:10;           // [R] reserved for future use
863      unsigned int    terminatorChar:16;     // [R] The terminator character (lower 8 bits if not unicode)
864  } IOOptions, *IOOptionsPtr;
865
866  /*
867   * ProgressReport is used by Agents to provide feedback to the user on the
868   * Agent's progress completing a request. There is an optional pointer to one
869   * of these structures in every request header.
870   */
871  typedef struct ProgressReport {
872      uint32          totalEffort;           // a unitless quantity set to how much
873                                             // effort the Agent thinks this request
874                                             // will take. This should be intialized
875                                             // to 0 when the request is sent to the
876                                             // File Manager, and the Agent should set
877                                             // it to the appropriate value as soon as
878                                             // it gets the request. A value of 0xffffffff
879                                             // indicates that the request is of unknown
880                                             // duration, and therefore progress can not
881                                             // reported
882      uint32          effortComplete;        // relative to totalEffort, how much of
883                                             // the request has been completed.
884
885      EventNotification  updateEvent;        // an event which is invoked when the Agent
886                                             // first sets totalEffort, and whenever it
887                                             // changes effortComplete. If updateEvent
888                                             // is all nil's, no action is taken (it is
889                                             // assumed that the user is polling the
890                                             // effortComplete locations.
891
892  } ProgressReport, *ProgressReportPtr;
893
894  /*------------------------------------------------------------------------
895   * BTree Access Method Types
896   */
897
898  /*
899   * BTHint is used to indicate a starting point for BTree Searches.
```

```
901  */
902  typedef struct BTHint {
903      uint32                  reserved[4];
904  } BTHint, *BTHintPtr;
905
906  /*
907   * BTreeKeyDescriptor is used to indicate how keys for a particular B*Tree
908   * are to be compared.
909   */
910  typedef char BTreeKeyDescriptor[26], *BTreeKeyDescriptorPtr;
911
912  /*
913   * BTreeInformation is used to describe the public information about a BTree
914   */
915
916  typedef struct BTreeInformation{
917      uint16              NodeSize;
918      uint16              MaxKeyLength;
919      uint16              Depth;
920      uint32              NumRecords;
921      uint32              NumNodes;
922      uint32              NumFreeNodes;
923      uint32              ClumpSize;
924      BTreeKeyDescriptor  KeyDescriptor;
925  } BTreeInformation, *BTreeInformationPtr;
926
927  /*-----------------------------------------------------------------------
928   * Information Types
929   * The following types are used to convey information about
930   * objects in the filesystem.
931   */
932
933  /*
934   * VolumeFunctionality is used to describe what functionality is supported by
935   * a particular volume. This includes such things as number of forks,
936   * permissions model, and the like.
937   */
938  typedef struct VolumeFunctionality {
939      unsigned int        supportsNotification        :1;
940      unsigned int        supportsAFPPermissions      :1;
941      unsigned int        supportsACLPermissions      :1;
942      unsigned int        supportsBTree               :1;
943      unsigned int        supportsRangeLocking        :1;
944      unsigned int        supportsFileNums            :1;
945      unsigned int        supportsAttributes          :1;
946      unsigned int        supportsUserAttributes      :1;
947      unsigned int        supportsShortNames          :1;
948      unsigned int        supportsMoveRename          :1;
949      unsigned int        supportsCopyRename          :1;
950      unsigned int        supportsAccessDeny          :1;
```

```
        unsigned int        supportsBooting     :1;
        unsigned int        supportsSystem      :1;
        unsigned int        supportsDesktop     :1;
        unsigned int        reserved            :16;
} VolumeFunctionality, *VolumeFunctionalityPtr;

/*
 * VolumeROInformation is used to describe the read only characteristics of a
 * particular Volume.
 */
typedef struct VolumeROInformation {
        int32               driveID;
        int32               partitionID;
        int32               volumeBlockSize;
        int32               numFiles;
        int32               numDirectories;
} VolumeROInformation, *VolumeROInformationPtr;

/*
 * VolumeRWInformation is used to describe the read/write characteristics of a
 * particular Volume.
 */
typedef struct VolumeRWInformation {
        int16               attributes;
        FSDate              createDate;
        FSDate              modifyDate;
        FSDate              backupDate;
        FSName              volumeName;
} VolumeRWInformation, *VolumeRWInformationPtr;

/*
 * DirectoryROInformation is used to describe the read only characteristics of
 * a particular Directory.
 */
typedef struct DirectoryROInformation {
        int32               parentID;
        int32               DirectoryNum;
} DirectoryROInformation, *DirectoryROInformationPtr;

/*
 * DirectoryRWInformation is used to describe the read/write characteristics
 * of a particular Directory.
 */
typedef struct DirectoryRWInformation {
        FSName              fileName;
        FSDate              createDate;
        FSDate              modifyDate;
        FSDate              backupDate;
} DirectoryRWInformation, *DirectoryRWInformationPtr;
```

```
1001  /*
1002   * FileROInformation is used to describe the read only characteristics of
1003   * a particular File.
1004   */
1005  typedef struct FileROInformation {
1006      int32         parentID;
1007      int32         FileNum;
1008  } FileROInformation, *FileROInformationPtr;
1009
1010  /*
1011   * FileRWInformation is used to describe the read/write characteristics of
1012   * a particular File.
1013   */
1014  typedef struct FileRWInformation {
1015      FSName        fileName;
1016      FSDate        createDate;
1017      FSDate        modifyDate;
1018      FSDate        backupDate;
1019      OSType        fileType;
1020      OSType        fileCreator;
1021  } FileRWInformation, *FileRWInformationPtr;
1022
1023  /*
1024   * ForkROInformation is used to describe the read only characteristics of
1025   * a particular Fork.
1026   */
1027  typedef struct ForkROInformation {
1028      int32         forkType;
1029      int64         logicalEOF;
1030      int64         physicalEOF;
1031  } ForkROInformation, *ForkROInformationPtr;
1032
1033  /*
1034   * ForkRWInformation is used to describe the read/write characteristics of
035    * a particular Fork.
1036   */
1037  typedef struct ForkRWInformation {
1038      OSType        format;
1039  } ForkRWInformation, *ForkRWInformationPtr;
1040
1041  /*
1042   * PathROInformation is used to describe the read only characteristics of
1043   * a particular Path. This includes such things as cache characteristics
1044   * and permissions.
1045   */
1046  typedef struct PathROInformation {
1047      TaskID        taskID;
1048      int32         userID;
1049      FSPermission  accessPrivs;
1050  } PathROInformation, *PathROInformationPtr;
```

```
1051    /*
1052     * PathRWInformation is used to describe the read/write characteristics of
1053     * a particular Path.  This includes such things as cache characteristics
1054     * and permissions.
1055     */
1056    typedef struct PathRWInformation {
1057        int64           mark;
1058    } PathRWInformation, *PathRWInformationPtr;
1059
1060    /*
1061     * Following are Finder file and directory info structs.
1062     */
1063
1064    #if defined(powerc) || defined (__powerc)
1065    #pragma options align=mac68k
1066    #endif
1067    struct FinderFileInfo {
1068        OSType          fdType;         /*the type of the file*/
1069        OSType          fdCreator;      /*file's creator*/
1070        unsigned short  fdFlags;        /*flags ex. hasbundle,invisible,locked, etc.*/
1071        Point           fdLocation;     /*file's location in folder*/
1072        short           fdFldr;         /*folder containing file*/
1073    };
1074    #if defined(powerc) || defined (__powerc)
1075    #pragma options align=reset
1076    #endif
1077
1078    typedef struct FinderFileInfo FinderFileInfo;
1079
1080    #if defined(powerc) || defined (__powerc)
1081    #pragma options align=mac68k
1082    #endif
1083    struct FinderXFileInfo {
1084        short           fdIconID;       /*Icon ID*/
1085        short           fdUnused[3];    /*unused but reserved 6 bytes*/
1086        char            fdScript;       /*Script flag and number*/
1087        char            fdXFlags;       /*More flag bits*/
1088        short           fdComment;      /*Comment ID*/
1089        long            fdPutAway;      /*Home Dir ID*/
1090    };
1091    #if defined(powerc) || defined (__powerc)
1092    #pragma options align=reset
1093    #endif
1094
1095    typedef struct FinderXFileInfo FinderXFileInfo;
1096
1097    #if defined(powerc) || defined (__powerc)
1098    #pragma options align=mac68k
1099    #endif
```

```
1101  struct FinderDirInfo {
1102      Rect              frRect;         /*folder rect*/
1103      unsigned short    frFlags;        /*Flags*/
1104      Point             frLocation;     /*folder location*/
1105      short             frView;         /*folder view*/
1106  };
1107  #if defined(powerc) || defined (__powerc)
1108      #pragma options align=reset
1109  #endif
1110
1111  typedef struct FinderDirInfo FinderDirInfo;
1112
1113  #if defined(powerc) || defined (__powerc)
1114      #pragma options align=mac68k
1115  #endif
1116  struct FinderXDirInfo {
1117      Point     frScroll;       /*scroll position*/
1118      long      frOpenChain;    /*DirID chain of open folders*/
1119      char      frScript;       /*Script flag and number*/
1120      char      frXFlags;       /*More flag bits*/
1121      short     frComment;      /*comment*/
1122      long      frPutAway;      /*DirID*/
1123  };
1124  #if defined(powerc) || defined (__powerc)
1125      #pragma options align=reset
1126  #endif
1127
1128  typedef struct FinderXDirInfo FinderXDirInfo;
1129
1130  /*------------------------------------------------------------
1131   * Search Types
1132   */
1133
1134  /*
1135   * FSComparisonDescriptor is used to describe a comparison between an attribute
1136   * and value or two attributes.
1137   *
1138   * Operand1Type, Operand2Type, operand1Length, and operand2Length are NULL when
1139   * there is no comparision required for operator (e.g. kFSAnd, kFSExists).
1140   */
1141  typedef struct {
1142      FSSearchOperator   operator;
1143      FSDataType         operand1Type;
1144      FSDataType         operand2Type;
1145      uint16             operand1Length;    //.. so we could support mixed types of "type"
1146      uint16             operand2Length;    // how many instances of "type"
1147  } FSComparisonDescriptor, *FSComparisonDescriptorPtr;
1148
1149  /*
1150   * FSSearchElement is used to describe part of a FSSearchCriteria. A Search
```

```
1151   /*
1152    * Criteria is essentially a prefix expression stack. Therefore, each element
1153    * of the expression is either an operator, or an attribute specification
1154    * followed by a pointer to a buffer descriptor which contains a value for
1155    * that attribute.
1156    */
1157   typedef union FSSearchElement {
1158       FSComparisonDescriptor    op;
1159       FSAttribute               attr;
1160       FSElementDescriptor       val;           // describes position and length within valBuffer
1161   } FSSearchElement, *FSSearchElementPtr;
1162
1163   /*
1164    * FSSearchCriteria is used to describe what kinds of files the user is
1165    * searching for. As noted above it is a prefix expression stack.
1166    */
1167   typedef struct FSSearchCriteria {
1168       int32                     count;         // the number of elements in the operator
1169   //** uint32                    valBuffer[0];  // THIS A VARIABLE LENGTH ARRAY
1170   search elements                                                                 // WHICH IS FOLLOWED BY THIS VARIABLE LENGTH ARRAYthe data for
1171   } FSSearchCriteria, *FSSearchCriteriaPtr;
1172
1173   /*
1174    * FSSimpleSearchCriteria is a simplified structure for the most simple
1175    * and most common sorts of searches. It still needs to be cast into a
1176    * FSSearchCriteria before it can be passed to FSReqSearch.
1177    */
1178   typedef struct FSSimpleSearchCriteria {
1179       int32                     count;
1180       FSComparisonDescriptor    op;            // MUST BE = 3
1181       FSAttribute               attr;          // usually = kFSEqual
1182       FSElementDescriptor       val;
1183   //** uint32                    valBuffer[0];  // the data for 'val' search elements
1184   } FSSimpleSearchCriteria, *FSSimpleSearchCriteriaPtr;
1185
1186   /*-----------------------------------------------------------------
1187    * Notification Types
1188    * The following types are used to control notification of events
1189    * in the filesystem.
1190    */
1191
1192   /*
1193    * NTChangeReport is used to describe specific change to the filesystem.
1194    * If the scope of the change is on the Directory of Volume, the 'it' field
1195    * is nil and should be ignored. If the scope of the change is on the
1196    * Volume, the oldDir and newDir fields are nil and should be ignored.
1197    */
1198   typedef struct {
1199       int16                     count;         // the number of reports
1200                                                // which have been colapsed
```

```
1201    FSChangeEvent                               // into this message
1202    VolumeObjID         change;                 // What happened to "it"?
1203    VolumeObjID         oldVol;                 // What volume was "it" on?
1204    DirectoryNum        newVol;                 // What volume IS "it" on now?
1205    DirectoryNum        oldDir;                 // What dir WAS "it" in?
1206                        newDir;                 // What dir IS "it" in now?
1207
1208    uint32              oldIt;                  // "it's" ID before the change
1209                                                //   (either a FileNum for a file, or a
1210                                                //   DirectoryNum for a dir or a
1211                                                //   VolumeObjID for a volume.
1212                                                //   You can tell which by the
1213                                                //   value of the change field
1214
1215    uint32              newIt;                  // "it's" ID after the change
1216    } FSChangeReport , *FSChangeReportPtr;
1217
1218
1219
1220    #endif // __FSTYPES__
```

What is claimed is:

1. In a computer including an operating system, at least one storage media, interface means for interfacing between callers sending requests for access to said at least one storage media and the operating system, and a plurality of agent modules for interfacing between the operating system and the storage media, each agent module corresponding to one of at least one file system formats, a method for handling and processing said requests for access to said at least one storage media comprising the steps of:

storing, in a store, at least one first identifier for identifying said plurality of agent modules, second identifiers for identifying a plurality of objects to which requests can be sent, and mapping information for mapping between said second and first identifiers;

receiving a request from said interface means at a request processing module; and forwarding the request to said at least one agent module responsive to said mapping information in said store.

2. The method according to claim 1, further comprising the steps of executing a plurality of threads of execution for receiving and forwarding requests concurrently.

3. The method according to claim 2, further comprising the step of performing maintenance operations.

4. The method according to claim 2, wherein said request processing module comprises a port and said plurality of objects are associated with said agent control blocks, said volume control blocks, said path control blocks, and said iterator control blocks, said plurality of objects being assigned to said port and adapted to receive messages corresponding to said requests, and wherein said method further comprises the step of retrieving said messages from said objects through said port to process said requests.

5. The method according to claim 4, wherein said step of processing requests comprises the step of forwarding said requests from said objects to said at least one agent module based on the identifier identifying the object at which said messages were received.

6. The method according to claim 5, wherein said step of forwarding based on the identifier comprises the steps of:

if the request is sent to an object associated with a volume,
retrieving a volume control block based on information retrieved from the volume object;
retrieving an agent control block based on information retrieved from said volume control block;
forwarding the request to one of said agent modules based on information retrieved from said agent control block; and
replying to said interface means in accordance with a reply received from said agent module.

7. The method according to claim 5, wherein said step of forwarding based on the identifier comprises the steps of:

if the request is sent to an object associated with a path,
retrieving a volume control block based on information retrieved from the path object;
retrieving an agent control block based on information retrieved from said path control block;
forwarding the request to one of said agent modules based on information retrieved from said agent control block; and
replying to said interface means in accordance with a reply received from said agent module.

8. The method according to claim 5, wherein said step of forwarding based on the identifier comprises the steps of:

if the request is sent to an object associated with an iterator,
retrieving a volume control block based on information retrieved from the iterator object;
retrieving an agent control block based on information retrieved from said iterator control block;
forwarding the request to one of said agent modules based on information retrieved from said agent control block;
if the iterator needs to be moved to a different volume, moving the iterator control block to a new volume control block and forwarding the request to one of the agent modules based on information retrieved from the agent control block; and
replying to said interface means in accordance with a reply received from said agent module.

9. The method according to claim 4, wherein said objects comprise a file manager object for receiving a request from said interface means and wherein said method further comprises the step of forwarding said request from said file manager object to said at least one agent module based on information provided in said request.

10. The method according to claim 9, wherein said step of forwarding based on the information provided in said request comprises the steps of:

if the request is a multiple volume request,
determining which volumes are affected by said request;
retrieving volume control blocks for those volumes based on information retrieved from the message sent to the file manager object;
retrieving agent control blocks based on information retrieved from the volume control blocks;
if the agent modules associated with the agent control blocks are the same, forwarding the request to one of said agent modules based on information retrieved from said agent control block;
if the agent modules are not the same, constructing requests and forwarding the constructed requests for each of said the volumes in succession;
forwarding the request to one of said agent modules based on information retrieved from said agent control block;
replying to said interface means in accordance with a reply received from said agent module.

11. The method according to claim 9, wherein said step of forwarding based on information provided in said request the comprises the steps of:

if the request is a mount volume request,
constructing a predetermined message; and
sending the predetermined message to the agent modules in succession until one of the agent modules is capable of mounting the volume;
forwarding the request to one of said agent modules based on information retrieved from said agent control block;
replying to said interface means in accordance with a reply received from said one of said agent modules.

12. The method according to claim 9, wherein said step of forwarding based on information provided in said request the comprises the steps of:

if the request is a pathname resolve request,
determining a volume from a partial specification in said message;
retrieving an agent control block from information retrieved from the volume control block associated with said determined volume;
forwarding the request to one of said agent modules based on information retrieved from said agent control block;

replying to said interface means in accordance with a reply received from said one of said agent modules.

13. The method according to claim 1, wherein said step of storing said mapping information comprises the steps of:

storing at least one agent control block;

storing at least one volume control block connected to said at least one agent control block;

storing at least one path control block connected to said at least one volume control block and said at least one agent control block; and storing at least one iterator control block connected to said at least one volume control block and said at least one agent control block.

14. In a computer including at least one caller which requests access to a storage media, each of the storage media being organized according to one of at least one file system format, a method for handling requests for access to the storage media, said method comprising the steps of:

storing, in a storing means at least one first identifier for identifying at least one format agent means, second identifiers for identifying a plurality of objects assigned to a dispatcher port, and mapping information for mapping between said second and first identifiers;

receiving a request from a caller at an interface means;

outputting the request from the interface means;

receiving the request from said interface means in a dispatch means containing said dispatcher port;

forwarding the request to an appropriate one of said format agent means responsive to said mapping information in said storing means; and processing requests to access the storage media via one of said format agent means corresponding to said file system format.

15. The method according to claim 14, further comprising the step of translating said requests to messages.

16. The method according to claim 15, further comprising the step of receiving said messages from said port.

17. The method according to claim 15, wherein said objects comprise a file manager object for receiving a request from said interface means, said method further comprising the step of forwarding said request from said file manager object to said format agent means based on information provided in said request.

18. The method according to claim 17, further comprising the step of executing a plurality of threads of execution for receiving and forwarding requests concurrently.

19. The method according to claim 17, further comprising the step of performing maintenance operations.

20. The method according to claim 14, wherein the step of storing the mapping information comprises the steps of:

storing at least one agent control block;

storing at least one volume control block connected to said at least one agent control block;

storing at least one path control block connected to said at least one volume control block and said at least one agent control block; and storing at least one iterator control block connected to said at least one volume control block and said at least one agent control block.

21. In a computer including at least one caller which requests access to a storage media, each of the storage media being organized according to one of at least one file system format, a method for handling requests for access to the storage media, said method comprising the steps of:

storing, in a storing means at least one first identifier for identifying at least one format agent means, second identifiers for identifying a plurality of objects assigned to a dispatcher port, and mapping information for mapping between said second and first identifiers;

receiving a request from a caller at an interface means;

outputting the request from the interface means;

receiving the request from said interface means in a dispatch means containing said dispatcher port;

forwarding the request to an appropriate one of said format agent means responsive to contents of the received request and said mapping information in said storing means; and processing requests to access the storage media via one of said format agent means corresponding to said file system format.

22. In a computer including at least one caller adapted to request access to a storage media, the storage media being organized according to one of at least one file system format, a system for handling requests for access to the storage media, said system comprising:

interface means for receiving a request from a caller and outputting the request;

format agent means, corresponding to said file system format, for processing requests to access the storage media;

storing means for storing at least one first identifier for identifying said format agent means, second identifiers for identifying objects assigned to a dispatch port, and mapping information for mapping between said second and first identifiers; and dispatch means containing said dispatcher port for receiving the request from said interface means and forwarding the request to said format agent means responsive to contents of the received request and said mapping information.

23. In a computer including at least one caller adapted to request access to a storage media, the storage media being organized according to one of at least one file system format, a system for handling requests for access to the storage media, said system comprising:

interface means for receiving a request from a caller, and outputting the request;

format agent means, corresponding to said file system format, for processing requests to access the storage media;

storing means for storing at least one first identifier for identifying said format agent means, second identifiers for identifying a plurality of objects assigned to a dispatcher port, and mapping information for mapping between said second and first identifiers; and dispatch means containing said dispatcher port for receiving the request from said interface means and forwarding the request to said format agent means responsive to said mapping information.

24. The system according to claim 23, wherein said interface means comprises means for translating said requests to messages.

25. The system according to claim 24, wherein said dispatch means comprises means for receiving said messages from said port.

26. The system according to claim 24, wherein said objects comprise a file manager object for receiving a request from said interface means and wherein said dispatch means comprises means for forwarding said request from said file manager object to said format agent means based on information provided in said request.

27. The system according to claim 23, wherein said mapping information comprises a plurality of control blocks.

28. The system according to claim 27, wherein said plurality of control blocks comprise:
   at least one agent control block; and
   at least one volume control block connected to said at least one agent control block.

29. The system according to claim 28, wherein said plurality of control blocks further comprise at least one path control block connected to said at least one volume control block and said at least one agent control block.

30. The system according to claim 28, wherein said plurality of control blocks further comprise at least one iterator control block connected to said at least one volume control block and said at least one agent control block.

31. The system according to claim 23, wherein said dispatch means comprises means for executing a plurality of threads of execution for receiving and forwarding requests concurrently.

32. The system according to claim 23, wherein said dispatch means comprises a thread of execution for performing maintenance operations for said system.

33. A file manager comprising:
   at least one caller which requests access to a storage media, the storage media being organized according to one of at least one file system format;
   a plurality of interface modules for receiving a request from a caller and outputting the request;
   at least one format agent module, corresponding to said file system format, for processing requests to access the storage media;
   a store for storing at least one first identifier for identifying said at least one format agent module, second identifiers for identifying a plurality of objects assigned to a dispatcher port, and mapping information for mapping between said second and first identifiers; and
   a dispatch module containing said dispatcher port for receiving the request from said interface modules and forwarding the request to said at least one format agent module responsive to said mapping information.

34. The file manager according to claim 33, wherein said interface modules comprise means for translating said requests to messages.

35. The file manager according to claim 34, wherein said dispatch module comprises means for receiving said messages from said port.

36. The file manager according to claim 34, wherein said objects comprise a file manager object for receiving a request from said interface modules and wherein said dispatch module comprises means for forwarding said request from said file manager object to said at least one format agent module based on information provided in said request.

37. The file manager according to claim 34, wherein said dispatch module comprises means for executing a plurality of threads of execution for receiving and forwarding requests concurrently.

38. The file manager to claim 34, wherein the dispatch module further comprises a thread of execution for performing maintenance operations for said system.

39. The file manager according to claim 33, wherein said mapping information comprises a plurality of control blocks comprising:
   at least one agent control block;
   at least one volume control block connected to said at least one agent control block;
   at least one path control block connected to said at least one volume control block and said at least one agent control block; and
   at least one iterator control block connected to said at least one volume control block and said at least one agent control block.

40. In a computer including an operating system, at least one storage media, interface means for interfacing between callers sending requests for access to said at least one storage media and the operating system, and a plurality of agent modules for interfacing between the operating system and the storage media, each agent module corresponding to one of at least one file system formats, a dispatcher for receiving and processing said requests for access to at least one storage media, said dispatcher comprising:
   a store for storing at least one first identifier for identifying said at least one agent module, second identifiers for identifying a plurality of objects to which requests can be sent, and mapping information for mapping between said second and first identifiers; and
   a request processing module for receiving a request from said interface means and forwarding the request to said at least one agent module responsive to said mapping information.

41. The dispatcher according to claim 40, further comprising means for executing a plurality of threads of execution for receiving and forwarding requests concurrently.

42. The dispatcher according to claim 41, further comprising means for performing maintenance operations.

43. The dispatcher according to claim 40, wherein said mapping information comprises a plurality of control blocks comprising:
   at least one agent control block;
   at least one volume control block connected to said at least one agent control block;
   at least one path control block connected to said at least one volume control block and said at least one agent control block; and
   at least one iterator control block connected to said at least one volume control block and said at least one agent control block.

44. The dispatcher according to claim 43, further comprising:
   a port, said plurality of objects being assigned to said port and adapted to receive messages corresponding to said requests;
   said objects being associated with said agent control blocks, said volume control blocks, said path control blocks, and said iterator control blocks; and
   means for retrieving said messages from said objects through said port to process said requests.

45. The dispatcher according to claim 44, wherein said request processing module comprises means for forwarding said requests from said objects to said at least one agent module based on the identifier identifying the object at which said messages were received.

46. The dispatcher according to claim 44, wherein said objects comprise a file manager object for receiving a request from said interface means and wherein said request processing module comprises means for forwarding said request from said file manager object to said at least one agent module based on information provided in said request.

* * * * *